United States Patent
Lacey et al.

(10) Patent No.: US 11,354,859 B2
(45) Date of Patent: *Jun. 7, 2022

(54) TESSELLATION HARDWARE SUBDIVISION OF PATCHES INTO SUB-PATCHES

(71) Applicant: Imagination Technologies Limited, Kings Langley (GB)

(72) Inventors: Peter Malcolm Lacey, Buckinghamshire (GB); Simon Fenney, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/198,038

(22) Filed: Mar. 10, 2021

(65) Prior Publication Data

US 2021/0233309 A1 Jul. 29, 2021

Related U.S. Application Data

(63) Continuation of application No. 16/376,655, filed on Apr. 5, 2019, now Pat. No. 10,977,860.

(30) Foreign Application Priority Data

Apr. 5, 2018 (GB) .................................... 1805670

(51) Int. Cl.
*G06T 17/20* (2006.01)
*G06T 1/20* (2006.01)
(Continued)

(52) U.S. Cl.
CPC ................ *G06T 17/20* (2013.01); *G06T 1/20* (2013.01); *G06T 15/005* (2013.01); *G06T 17/10* (2013.01); *G06T 2200/28* (2013.01)

(58) Field of Classification Search
CPC .......... G06T 17/20; G06T 1/20; G06T 15/005; G06T 17/10; G06T 2200/28
See application file for complete search history.

(56) References Cited

U.S. PATENT DOCUMENTS 5,995,109 A 11/1999 Goel et al.
8,471,852 B1 6/2013 Bunnell
(Continued)

FOREIGN PATENT DOCUMENTS

EP 0663651 A1 7/1995
GB 2533443 A 6/2016
GB 2539042 A 12/2016

OTHER PUBLICATIONS

Tariq, "D3D11 Tessellation," retrieved from the Internet: URL:http://developer.download.nvidia.com/presentations/2009/GDC/GDC09_D3D11Tessellation.pdf.

*Primary Examiner* — Chong Wu
(74) *Attorney, Agent, or Firm* — Potomac Law Group, PLLC; Vincent M DeLuca

(57) ABSTRACT

Hardware tessellation units include a sub-division logic block that comprises hardware logic arranged to perform a sub-division of a patch into two (or more) sub-patches. The hardware tessellation units also include a decision logic block that is configured to determine whether a patch is to be sub-divided or not and one or more hardware elements that control the order in which tessellation occurs. In various examples, this hardware element is a patch stack that operates a first-in-last-out scheme and in other examples, there are one or more selection logic blocks that are configured to receive patch data for more than one patch or sub-patch and output the patch data for a selected one of the received patches or sub-patches.

20 Claims, 34 Drawing Sheets

(51) Int. Cl.
*G06T 15/00* (2011.01)
*G06T 17/10* (2006.01)

(56) References Cited

U.S. PATENT DOCUMENTS 10,977,860 B2 * 4/2021 Lacey .................... G06T 17/10
2004/0113909 A1 6/2004 Fenney et al.

* cited by examiner

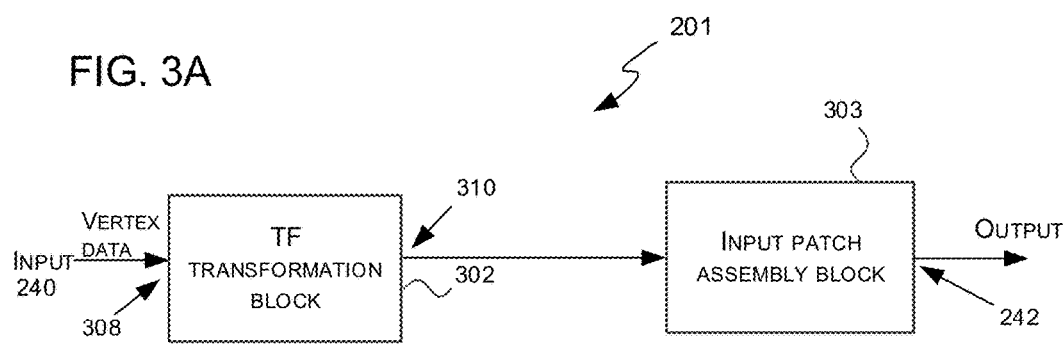
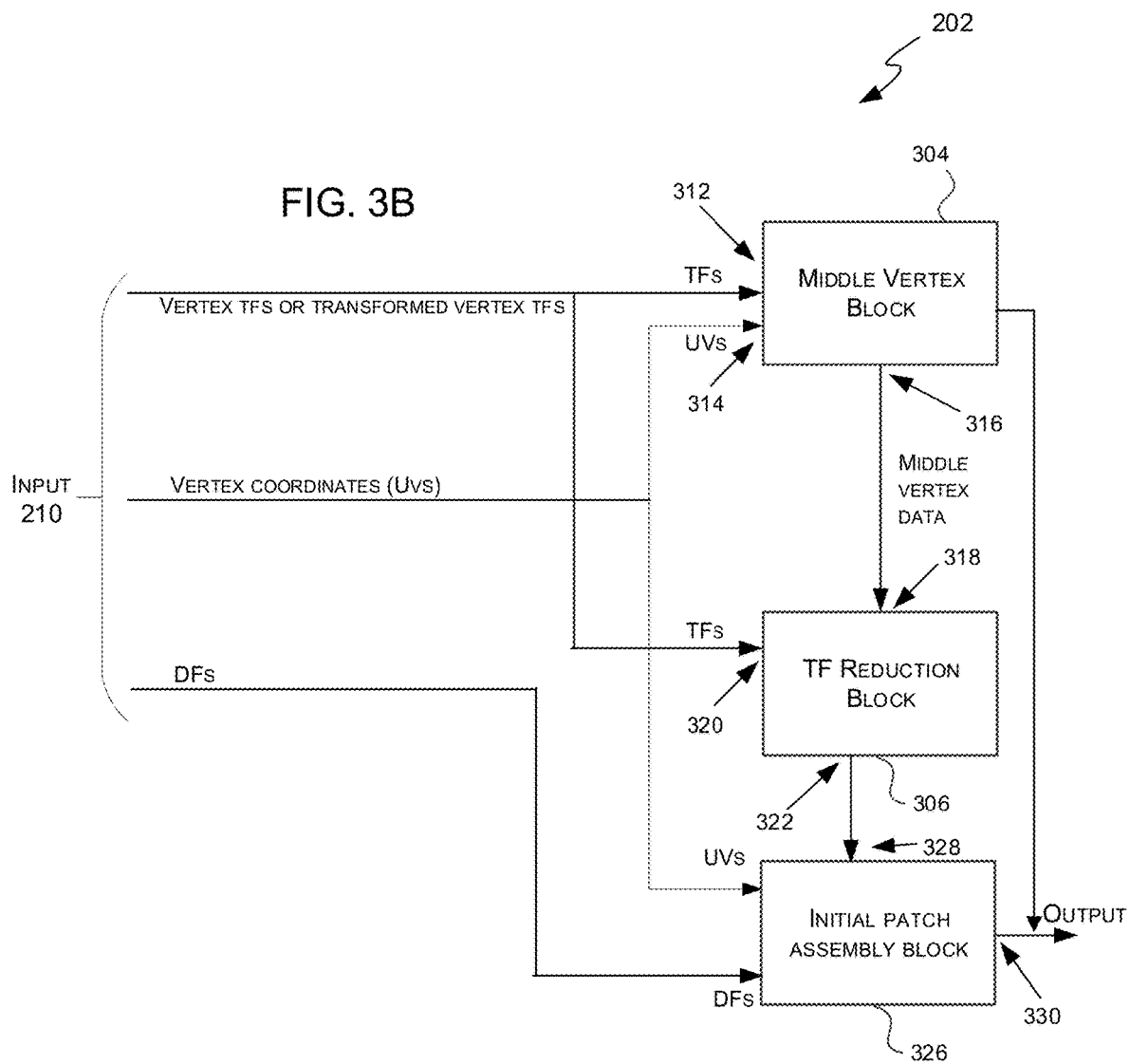

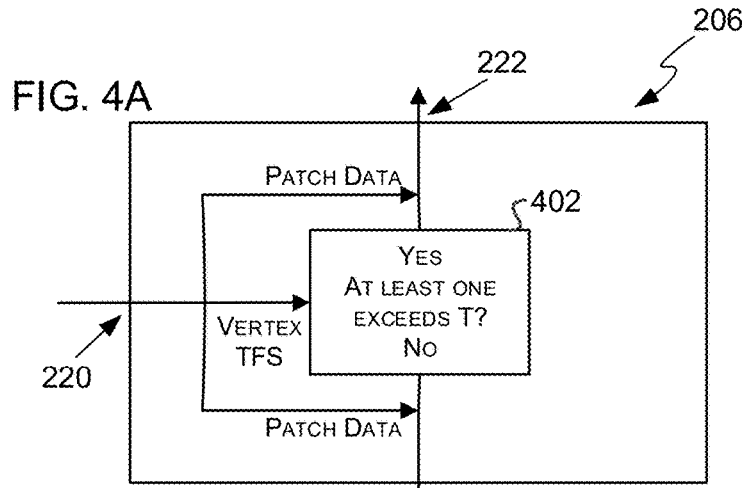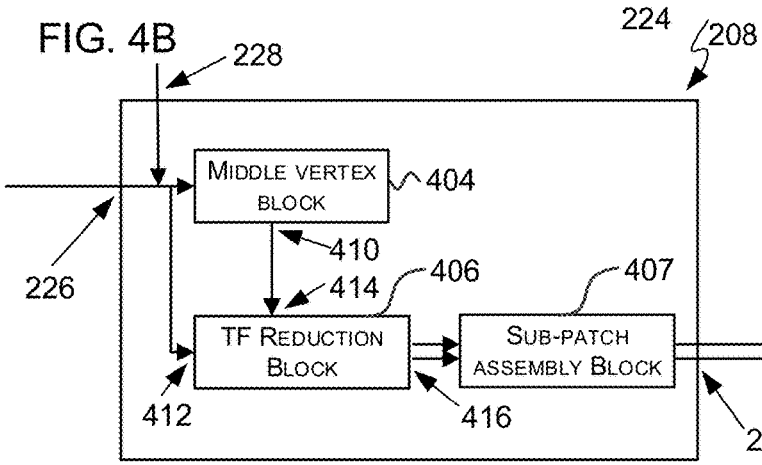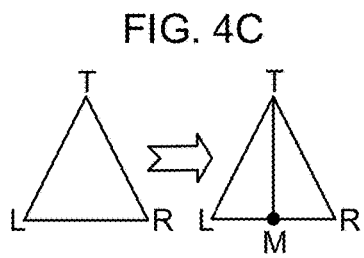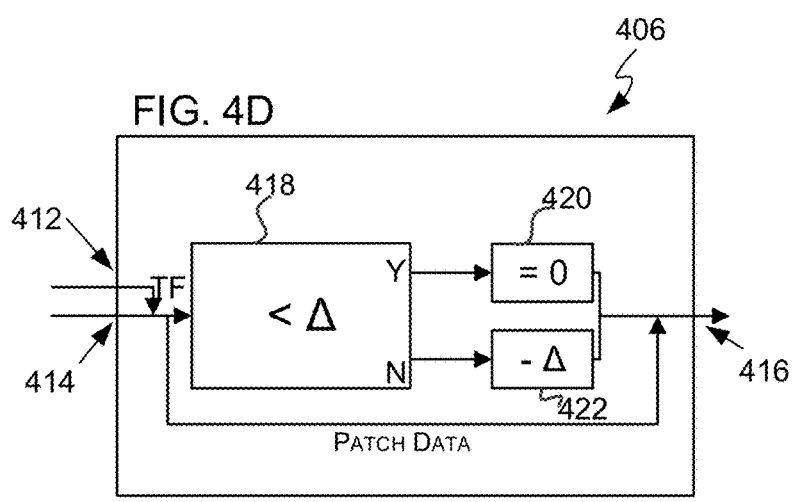

| | Process / Decision |
| --- | --- |
| | Data |
| ---- | Vertex Tessellation Factor |
| —— | Tess Vertex (UV, TF, Index) |
| ▬▬ | Tri Patch (3 Tess Vertices) |
| ----- | Index |
| ········ | Primitive (3 Indices) |
| ·········· | Domain Vertex (UV, MumUV, DadUV, DF) |
| | Displacement Factor |
| – – – | UV Coordinate |
| —— | Decision Box Signal |

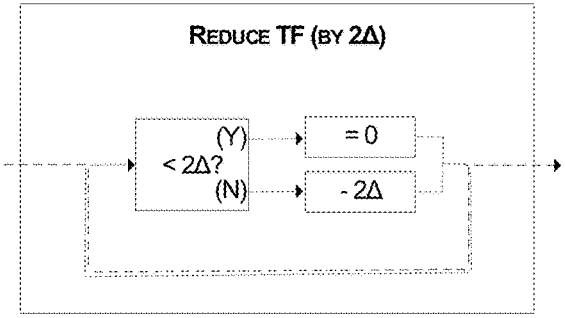
FIG. 19A
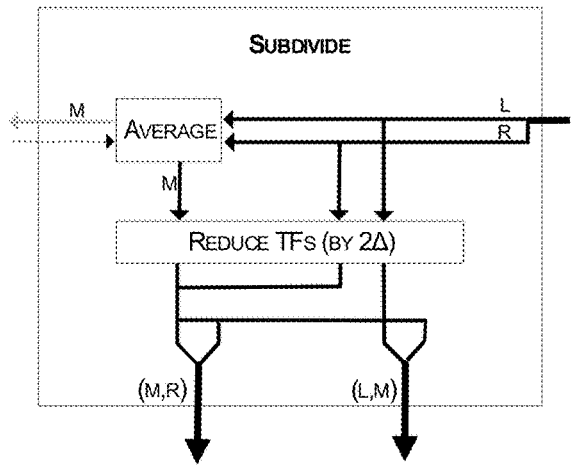
FIG. 19B
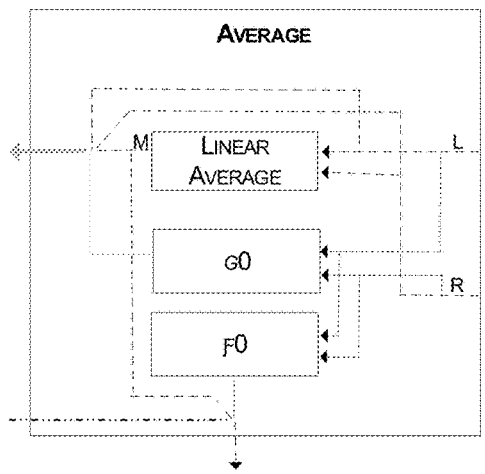
FIG. 19C
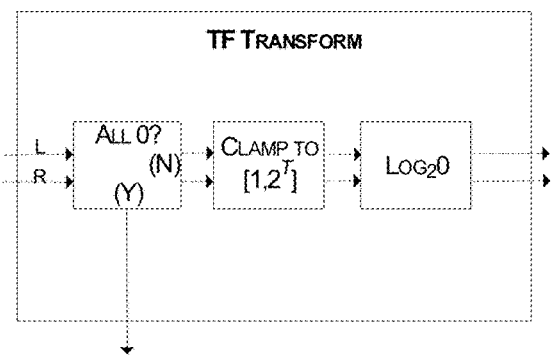
FIG. 19D
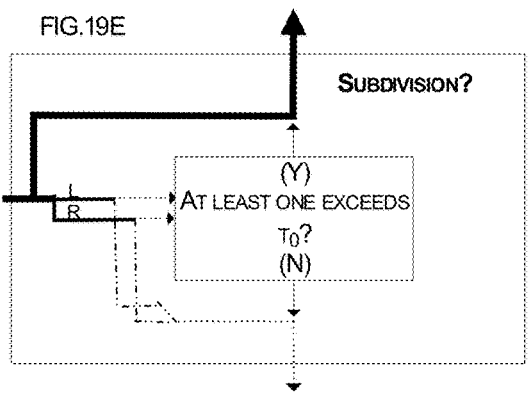
FIG. 19E
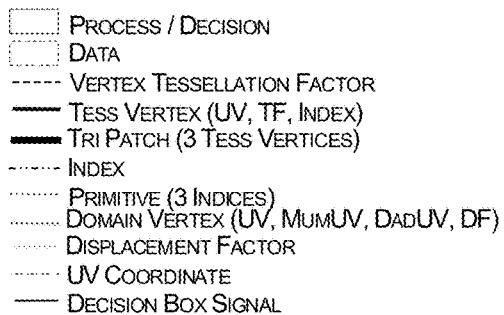

| PROCESS/DECISION | INPUT | #INPUTS | OUTPUT | #OUTPUTS | MAX # CALLS PER DOMAIN | MAX # CALLS, $T = 6$ |
|---|---|---|---|---|---|---|
| TF TRANSFORM | TESSELLATION FACTOR | 1 | TESSELLATION FACTOR | 1 | | |
| DF = 1 | DOMAIN VERTEX | 1 | DOMAIN VERTEX | 1 | 4 | 4 |
| CORNER VERTEX ID? | DOMAIN VERTEX/ID | 4/1 | DOMAIN VERTEX | 1 | 5 | 5 |
| MIDDLE VERTEX | TESSELLATION FACTOR | 4 | TESS VERTEX | 1 | 1 | 1 |
| MIDDLE VERTEX ID? | DOMAIN VERTEX/ID | 1/1 | DOMAIN VERTEX | 1 | 1 | 1 |
| REDUCE TF | TESS VERTEX | 1 | TESS VERTEX | 1 | 4 | 4 |
| INITIAL TRIANGLE PATCH? | TRI PATCH/10 | 4 | TRI PATCH | 1 | 1 | 1 |
| END OF ID? | TRI PATCH/ID | 1 | TRI PATCH XOR PRIMITIVE | 1/1 | $2T$ | 12 |
| SUBDIVIDE | TRI PATCH | 1 | TRI PATCH XOR OUT VERTEX | 2/1 | $2T$ | 12 |
| FLIP ORDER | TRI PATCH | 2 | TRI PATCH | 2 | $2T-1$ | 11 |
| SUB-PATCH? | TRI PATCH/ID | 2 | TRI PATCH | 1 | $2T-1$ | 11 |

| CACHE | CACHE TYPE | ENTRY TYPE | ENTRY FORMAT | ENTRY SIZE, BITS | MAX ENTRIES | MAX SIZE BITS, $T = 6$ |
|---|---|---|---|---|---|---|
| CORNER UVs, INDICES | STATIC | UV | 2A | $2(T+1)$ | 4 | 56 |

FIG. 22-2

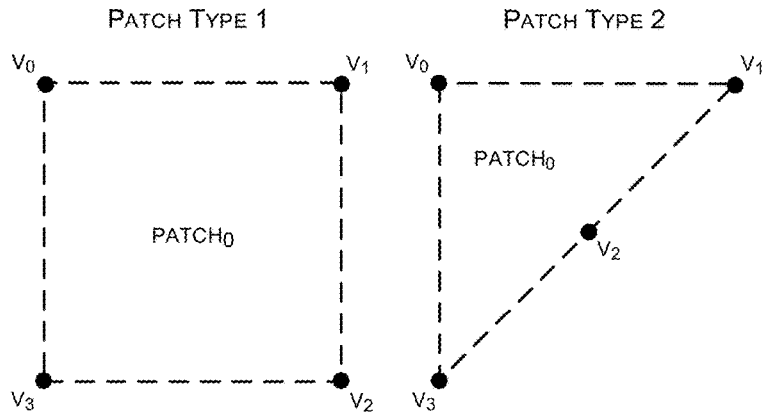
FIG. 23A
FIG. 23B
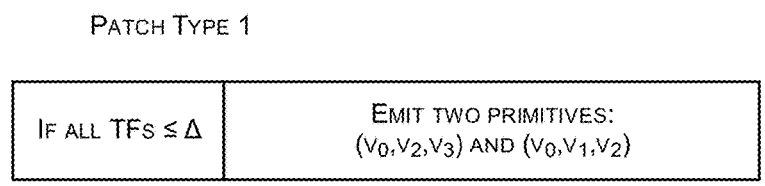
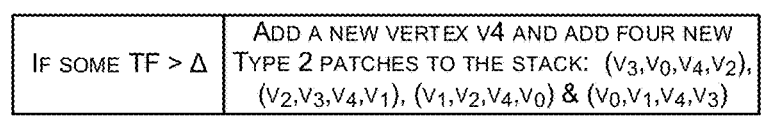
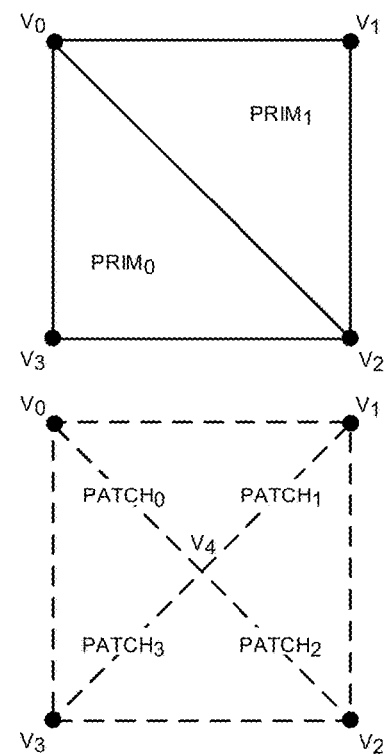

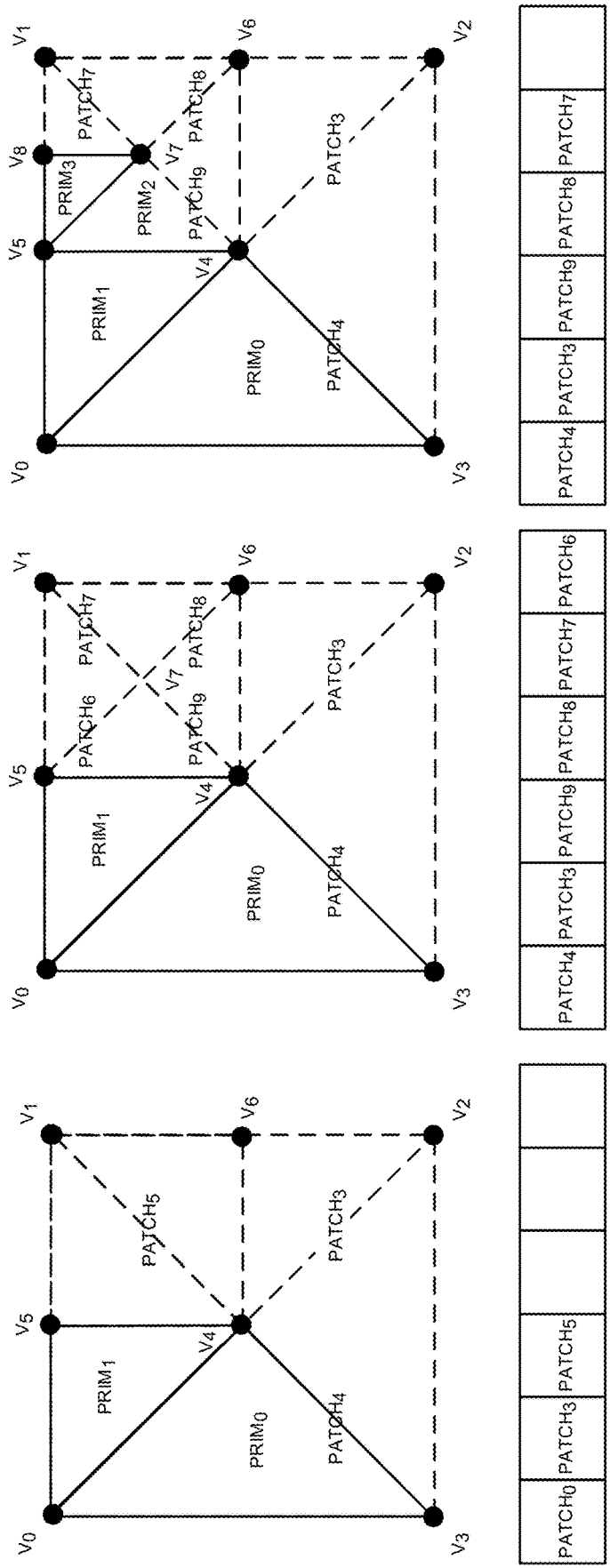

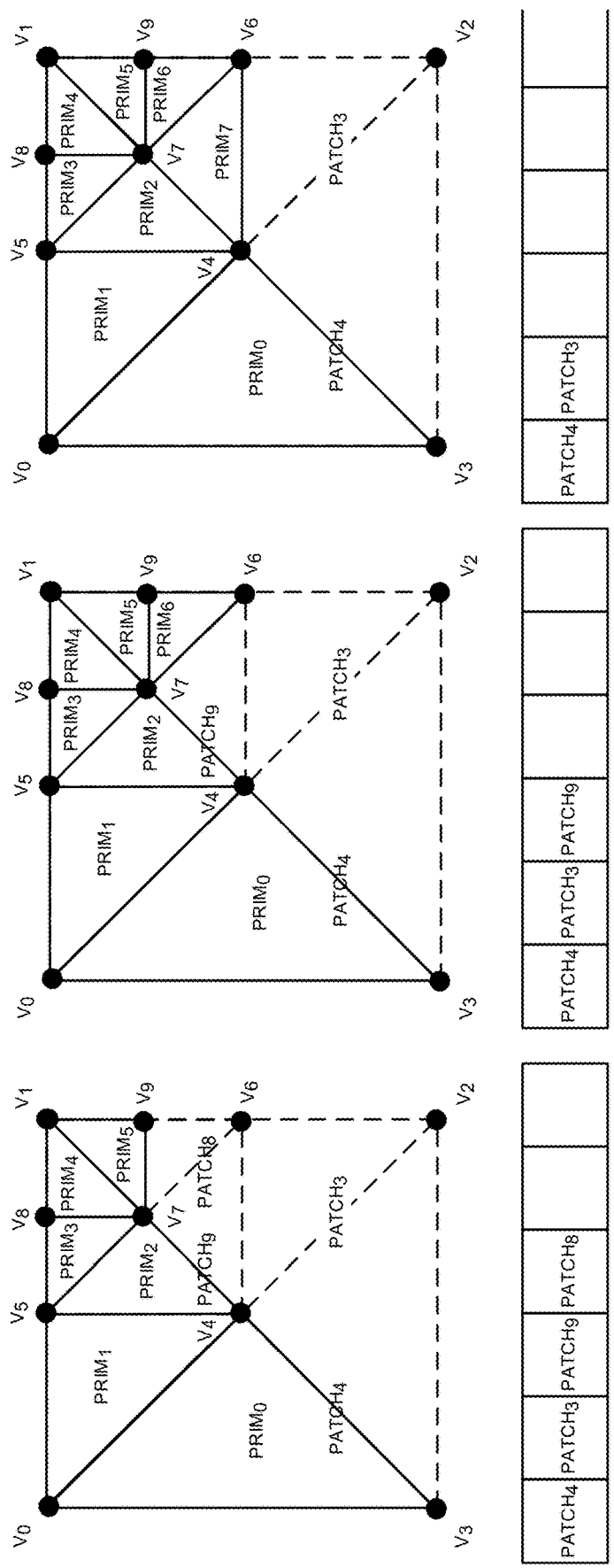

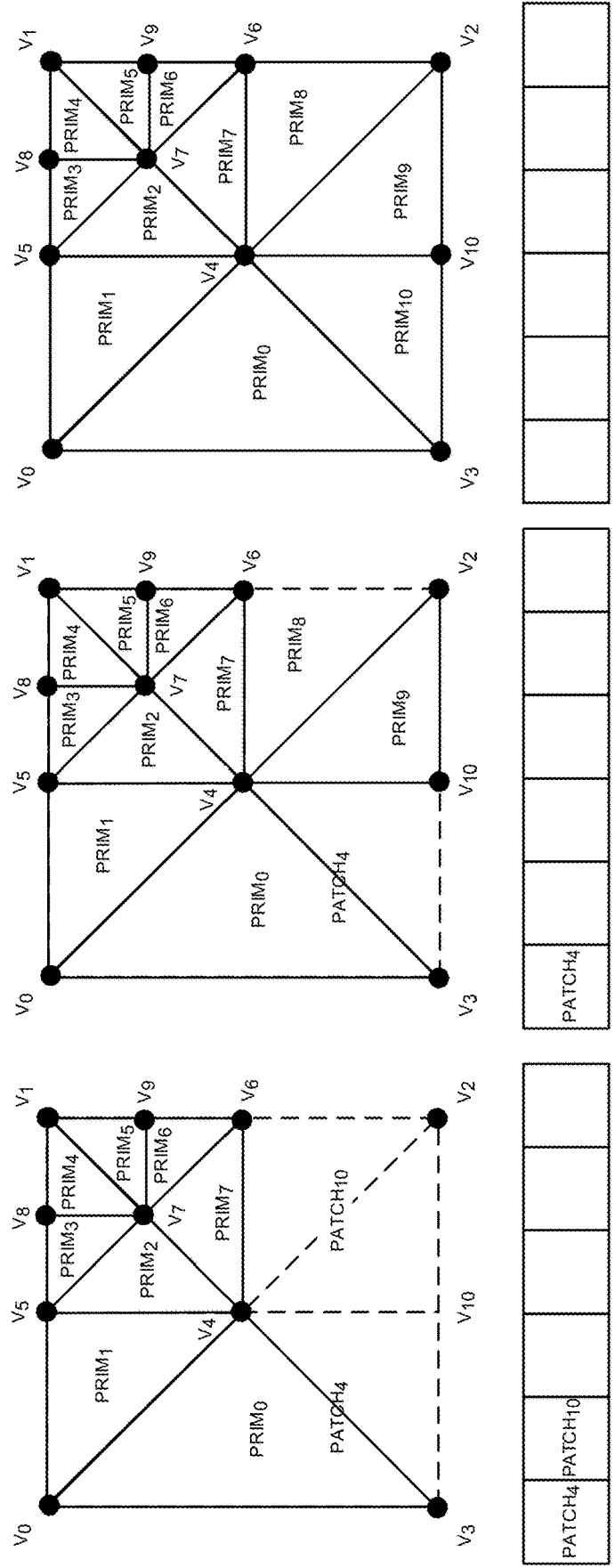

| Current Primitive Index | Domain vertex stack $2T + 2$ entries | | | | | | | # Verts Output | 3 Vert IDs of Output Primitive | UV Primitive Queue (Represented here as 3 Vertex IDs) $2^{2T-3}$ Entries | | | | | |
|---|---|---|---|---|---|---|---|---|---|---|---|---|---|---|---|
| Initially | 19 | 7 | 3 | | | | | 2 | - | | | | | | |
| 0 | 19 | 7 | 3 | 2 | | | | 3 | (2,0,1) | | | | | | |
| 1 | 19 | 7 | 3 | | | | | 4 | (2,3,0) | | | | | | |
| 2 | 19 | 7 | 4 | | | | | 5 | (4,0,3) | | | | | | |
| 3 | 19 | 7 | 5 | | | | | 6 | (5,0,4) | | | | | | |
| 4 | 19 | 7 | 6 | | | | | 7 | (6,5,4) | | | | | | |
| 5 | 19 | 7 | | | | | | 8 | (6,7,5) | | | | | | |
| 6 | 19 | 11 | 5 | 8 | | | | 9 | (8,5,7) | | | | | | |
| 7 | 19 | 11 | 5 | 9 | | | | 10 | (9,5,8) | | | | | | |
| 8 | 19 | 11 | 5 | | | | | 10 | - | (9,8,11) | | | | | |
| 9 | 19 | 11 | 10 | 9 | | | | 10 | - | (9,8,11) | (9,11,10) | | | | |
| 10 | 19 | 11 | 10 | | | | | 11 | - | (9,8,11) | (9,11,10) | (9,10,5) | | | |
| 11 | 19 | 11 | | | | | | 12 | (10,0,5) | (9,8,11) | (9,11,10) | (9,10,5) | | | |
| 12 | 19 | 13 | 10 | | | | | 12 | - | (10,13,0) | | | | | |
| 13 | 19 | 13 | 12 | | | | | 13 | - | (10,13,0) | (12,13,10) | | | | |
| 14 | 19 | 13 | | | | | | 14 | (12,10,11) | (10,13,0) | (12,13,10) | | | | |
| 15 | 19 | 16 | 12 | 14 | | | | 15 | (14,12,11) | | | | | | |
| 16 | 19 | 16 | 12 | | | | | 15 | - | (14,16,12) | | | | | |
| 17 | 19 | 16 | 15 | | | | | 16 | - | (14,16,12) | (15,12,16) | | | | |
| 18 | 19 | 16 | | | | | | 17 | (15,13,12) | (14,16,12) | (15,12,16) | | | | |
| 19 | 19 | 17 | 15 | | | | | 17 | - | (15,17,13) | | | | | |
| 20 | 19 | 17 | | | | | | 18 | (15,16,17) | (15,17,13) | | | | | |
| 21 | 19 | 18 | | | | | | 19 | (18,17,16) | | | | | | |
| 22 | 19 | | | | | | | 20 | (18,19,17) | | | | | | |
| 23 | 22 | 13 | 21 | 17 | 20 | | | 21 | (20,17,19) | | | | | | |
| 24 | 22 | 13 | 21 | 17 | | | | 21 | - | (20,21,17) | | | | | |
| 25 | 22 | 13 | 21 | | | | | 22 | (17,21,13) | (20,21,17) | | | | | |
| 26 | 22 | 13 | | | | | | 22 | - | (21,22,13) | | | | | |
| 27 | 22 | | | | | | | 23 | (13,22,0) | (21,22,13) | | | | | |
| 28 | | | | | | | | 23 | (22,1,0) | | | | | | |

FIG. 26

| Current Primitive Index | Domain vertex stack 4T + 5 entries | | | | | | | | | | | | | | | #Verts Output | 3 Vert IDs Indices of Output Primitive |
|---|---|---|---|---|---|---|---|---|---|---|---|---|---|---|---|---|---|
| Initially | 2 | 19 | 2 | 7 | 2 | 3 | 2 | | | | | | | | | 1 | - |
| 0 | 2 | 19 | 2 | 7 | 2 | 3 | 1 | 2 | 1 | | | | | | | 3 | (1,2,0) |
| 1 | 2 | 19 | 2 | 7 | 2 | 3 | 1 | | | | | | | | | 4 | (1,3,2) |
| 2 | 2 | 19 | 2 | 7 | 4 | 2 | 4 | | | | | | | | | 5 | (4,2,3) |
| 3 | 2 | 19 | 2 | 7 | 5 | 4 | 5 | | | | | | | | | 6 | (5,2,4) |
| 4 | 2 | 19 | 2 | 7 | 6 | 5 | 6 | | | | | | | | | 7 | (6,5,4) |
| 5 | 2 | 19 | 2 | 7 | 6 | | | | | | | | | | | 8 | (6,7,5) |
| 6 | 2 | 19 | 10 | 2 | 5 | 10 | 8 | 5 | 8 | | | | | | | 9 | (8,5,7) |
| 7 | 2 | 19 | 10 | 2 | 5 | 10 | 9 | 8 | 9 | | | | | | | 10 | (9,5,8) |
| 8 | 2 | 19 | 10 | 2 | 5 | 10 | 9 | | | | | | | | | 11 | (9,8,10) |
| 9 | 2 | 19 | 10 | 2 | 11 | 5 | 9 | 11 | 9 | | | | | | | 12 | (9,10,11) |
| 10 | 2 | 19 | 10 | 2 | 11 | 5 | 9 | | | | | | | | | 12 | (9,11,5) |
| 11 | 2 | 19 | 10 | 2 | 11 | | | | | | | | | | | 12 | (11,2,5) |
| 12 | 2 | 19 | 12 | 10 | 11 | 12 | 11 | | | | | | | | | 13 | (11,12,2) |
| 13 | 2 | 19 | 12 | 10 | 13 | 11 | 13 | | | | | | | | | 14 | (13,12,11) |
| 14 | 2 | 19 | 12 | 10 | 13 | | | | | | | | | | | 14 | (13,11,10) |
| 15 | 2 | 19 | 15 | 12 | 13 | 15 | 14 | 13 | 14 | | | | | | | 15 | (14,13,10) |
| 16 | 2 | 19 | 15 | 12 | 13 | 15 | 14 | | | | | | | | | 16 | (14,15,10) |
| 17 | 2 | 19 | 15 | 12 | 16 | 13 | 16 | | | | | | | | | 17 | (16,13,15) |
| 18 | 2 | 19 | 15 | 12 | 16 | | | | | | | | | | | 17 | (16,12,13) |
| 19 | 2 | 19 | 17 | 15 | 16 | 17 | 16 | | | | | | | | | 18 | (16,17,12) |
| 20 | 2 | 19 | 17 | 15 | 16 | | | | | | | | | | | 18 | (16,15,17) |
| 21 | 2 | 19 | 18 | 17 | 18 | | | | | | | | | | | 19 | (18,17,15) |
| 22 | 2 | 19 | 18 | | | | | | | | | | | | | 20 | (18,19,17) |
| 23 | 22 | 2 | 12 | 22 | 21 | 12 | 17 | 21 | 20 | 17 | 20 | | | | | 21 | (20,17,19) |
| 24 | 22 | 2 | 12 | 22 | 21 | 12 | 17 | 21 | 20 | | | | | | | 22 | (20,21,17) |
| 25 | 22 | 2 | 12 | 22 | 21 | 12 | 17 | | | | | | | | | 22 | (17,21,12) |
| 26 | 22 | 2 | 12 | 22 | 21 | | | | | | | | | | | 23 | (21,22,12) |
| 27 | 22 | 2 | 12 | | | | | | | | | | | | | 23 | (12,22,2) |
| 28 | 22 | | | | | | | | | | | | | | | 23 | (22,0,2) |

FIG. 27

TESSELLATION HARDWARE SUBDIVISION OF PATCHES INTO SUB-PATCHES

CROSS-REFERENCE TO RELATED APPLICATIONS AND CLAIM OF PRIORITY

This application is a continuation under 35 U.S.C. 120 of copending application Ser. No. 16/376,655 filed Apr. 5, 2019, which claims foreign priority under 35 U.S.C. 119 from United Kingdom Application No. 1805670.5 filed Apr. 5, 2018.

BACKGROUND

Tessellation is a technique used in computer graphics to divide up a set of surfaces representing objects in a scene into a number of smaller and simpler pieces, (referred to as primitives), typically triangles, which are more amenable to rendering. The resulting tessellated surface is generally an approximation to the original surface, but the accuracy of this approximation can be improved by increasing the number of generated primitives, which in turn usually results in the primitives being smaller. The amount of tessellation/sub-division is usually determined by a level of detail (LOD). An increased number of primitives is therefore typically used where a higher level of detail is required, e.g. because an object is closer to the viewer and/or the object has a more intricate shape. However, use of larger numbers of triangles increases the processing effort required to render the scene.

The sub-division into triangle primitives is typically performed on patches which are square or triangular in shape (i.e. a quad or a triangle) and which may be curved to fit to the surface of the object they represent (and hence may be referred to as 'surface patches') and/or have displacement mapping applied. The sub-division, however, is not performed on curved patches but is instead performed in the domain of the patch (e.g. as if the patch is planar rather than being defined by, for example, a polynomial equation) which may be defined in terms of (u,v) parameters and referred to as 'parametric space'. This means that the tessellation process is independent of any curvature present in the final surface.

Tessellation may be performed ahead of time (e.g. to compute a number of different views of a scene at different levels of detail and/or from different viewpoints) or may be performed on the fly (e.g. to provide continuous or view-dependent levels of detail). With some existing tessellation methods, a user can experience undesirable visual artefacts where, although the requested level of detail is changed smoothly, the resulting tessellation changes in a discontinuous fashion.

The embodiments described below are provided by way of example only and are not limiting of implementations which solve any or all of the disadvantages of known methods and apparatus for performing tessellation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described herein are a number of different hardware tessellation units. All of the hardware tessellation units described herein comprise a sub-division logic block that comprises hardware logic arranged to perform a sub-division of a patch into two (or more) sub-patches. All of the hardware tessellation units described herein also comprise a decision logic block that is configured to determine whether a patch is to be sub-divided or not and one or more hardware elements that control the order in which tessellation occurs. In various examples, this hardware element is a patch stack that operates a first-in-last-out scheme and in other examples, there are one or more selection logic blocks that are configured to receive patch data for more than one patch or sub-patch and output the patch data for a selected one of the received patches or sub-patches.

A first aspect provides a hardware tessellation unit comprising a patch stack, a sub-division decision logic block and a sub-division logic block, wherein: the patch stack is arranged to store patch data describing one or more initial patches and a plurality of sub-patches and to output the patch data, via an output according to a first-in-last-out scheme, the patch stack comprising a first input configured to receive patch data describing initial patches and a second input configured to receive patch data describing sub-patches; the sub-division decision logic block comprises: (i) an input configured to receive patch data from the patch stack, (ii) hardware logic arranged to determine, from the patch data, whether the initial patch or sub-patch for which patch data is received is to be sub-divided, (iii) a first output configured to output the patch data to the sub-division logic block in response to determining that the initial patch or sub-patch is to be sub-divided, and (iv) a second output configured to output the patch data in response to determining that the initial patch or sub-patch is not to be sub-divided; and the sub-division logic block comprises: (i) an input configured to receive patch data from the sub-division decision logic block, (ii) hardware logic arranged to sub-divide the initial patch or sub-patch for which patch data is received, and (iii) an output configured to output patch data for each of the sub-patches formed by the sub-division to the patch stack.

The hardware tessellation unit may further comprise: a domain vertex queue arranged to store vertex data received from the sub-division logic block and to output the vertex data, via an output according to a first-in-last-out scheme.

A second aspect provides a hardware tessellation unit comprising: an initial patch selection logic block comprising: (i) a first input configured to receive patch data for a plurality of initial patches, (ii) a second input arranged to receive an ID, (iii) hardware logic arranged to select a patch data for one of the initial patches based on one or more bits of the ID, and (iv) an output configured to output the selected patch data; a sub-division logic block comprising: (i) an input configured to receive patch data, (ii) hardware logic arranged to sub-divide the initial patch or sub-patch for which patch data is received, and (iii) an output configured to output patch data for each of the sub-patches formed by the sub-division; a sub-patch selection logic block comprising: (i) a first input configured to receive patch data for a plurality of sub-patches formed by sub-division in the sub-division logic block, (ii) a second input configured to receive an ID, (iii) hardware logic arranged to select patch data for one of the sub-patches based on one or more bits of the ID, and (iv) an output configured to output the selected patch data; and an end of ID logic block comprising: (i) a first input configured to receive patch data for an initial patch from the initial patch selection logic block, (ii) a second input arranged to receive patch data for the selected sub-patches from the sub-patch selection logic block, (iii) hardware logic arranged to determine, from an ID for the patch or sub-patch, whether the initial patch or sub-patch is to be sub-divided, (iv) a first output configured to output the patch data in response to determining that the initial patch or sub-patch is to be sub-divided, and (v) a second output configured to output the patch data in response to determining that the initial patch or sub-patch is not to be sub-divided.

A third aspect provides a method comprising: receiving, in a patch stack, patch data describing initial patches patch data describing sub-patches formed by subdivision of the initial patches or other sub-patches; storing, in the patch stack, patch data describing one or more initial patches and a plurality of sub-patches; outputting, from the patch stack, the patch data according to a first-in-last-out scheme; determining, in a sub-division decision logic block, whether the initial patch or sub-patch for which patch data is received is to be sub-divided and in response to determining that the initial patch or sub-patch is to be sub-divided, outputting the data to a sub-division logic block; sub-dividing, in the sub-division logic block the initial patch or sub-patch for which patch data is received and outputting patch data for each of the sub-patches formed by the sub-division to the patch stack.

A fourth aspect provides a method comprising: receiving and ID and patch data for a plurality of initial patches; selecting patch data for one of the initial patches based on one or more bits of the ID; sub-dividing the initial patch or sub-patch for which patch data is received; receiving, in a sub-division selection logic block, the ID and patch data for a plurality of sub-patches formed by sub-division; selecting, in the sub-division selection logic block, patch data for one of the sub-patches based on one or more bits of the ID; and in response to determining, determining that the initial patch or sub-patch is not to be sub-divided, to output the patch data.

The hardware tessellation units described herein (or a graphics pipeline comprising such a tessellation unit) may be embodied in hardware on an integrated circuit. There may be provided a method of manufacturing, at an integrated circuit manufacturing system, a tessellation unit as described herein. There may be provided an integrated circuit definition dataset that, when processed in an integrated circuit manufacturing system, configures the system to manufacture a tessellation unit as described herein. There may be provided a non-transitory computer readable storage medium having stored thereon a computer readable description of an integrated circuit that, when processed, causes a layout processing system to generate a circuit layout description used in an integrated circuit manufacturing system to manufacture a tessellation unit as described herein.

There may be provided an integrated circuit manufacturing system comprising: a non-transitory computer readable storage medium having stored thereon a computer readable integrated circuit description that describes the tessellation unit as described herein; a layout processing system configured to process the integrated circuit description so as to generate a circuit layout description of an integrated circuit embodying a tessellation unit as described herein; and an integrated circuit generation system configured to manufacture a tessellation unit as described herein according to the circuit layout description.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 3A is a schematic diagram of an example structure of the set-up block shown in FIG. 2;

FIG. 3B is a schematic diagram of an example structure of the pre-processing block shown in FIG. 2;

FIGS. 4A, 4B and 4D show schematic diagrams of example implementations of elements in FIG. 2;

FIG. 4C is a schematic diagram showing sub-division of a patch;

FIGS. 19A-19E are schematic diagrams showing example implementations of elements in FIG. 18;

FIG. 22-2 is a table showing inputs and outputs of processes/decisions of the tessellation unit of FIG. 22-1

FIG. 26 is a table showing a Domain Vertex Stack and UV primitive queue; and

FIG. 27 is a table showing an example of the operation of the hardware tessellator 1000 of FIG. 10.

Figure 1A:
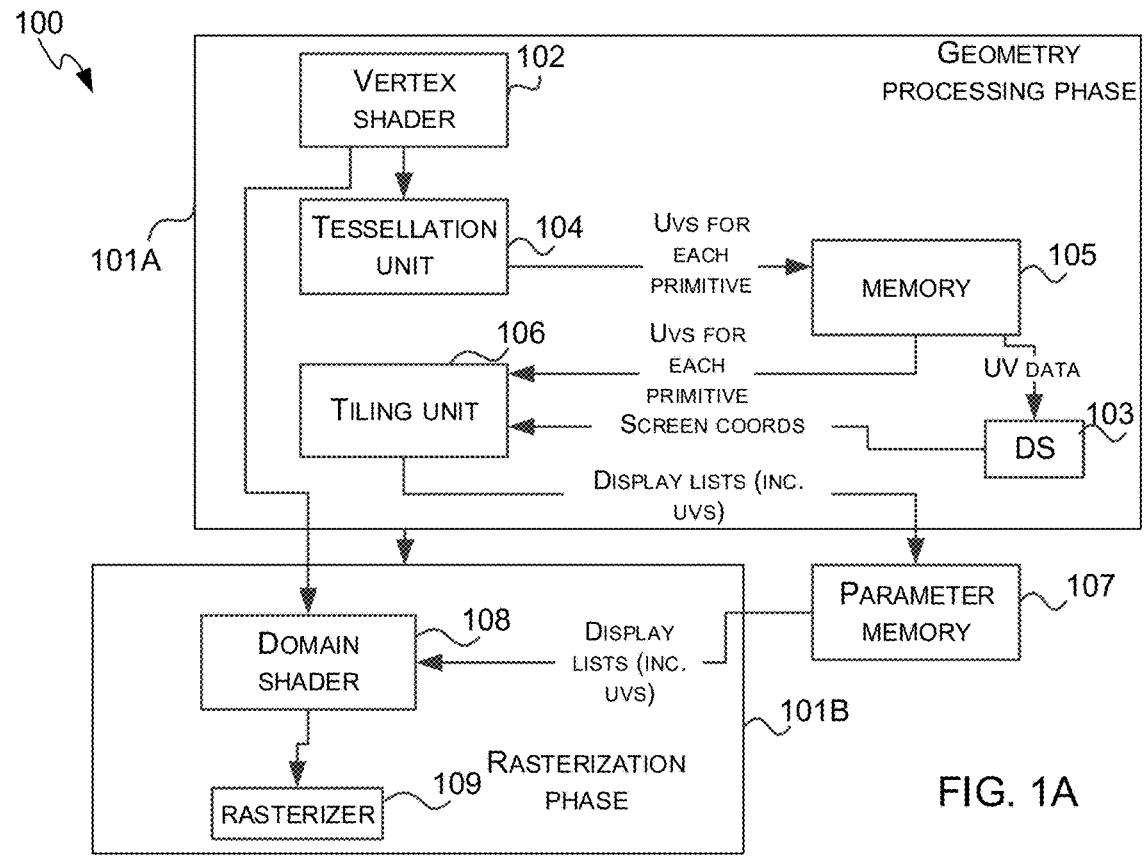
FIGS. 1A and 1B show schematic diagrams of example GPU pipelines.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As described above, tessellation involves the selective sub-division of patches, which are typically square or triangular in shape, into smaller triangular patches. The determination as to whether a patch should be sub-divided or not is often made based on one or more tessellation factors (TFs), e.g. by comparing one or more TFs to each other and/or to a threshold value. In some examples edge tessellation factors are used, with each edge of a patch having an edge tessellation factor, and the edge tessellation factor defining how many times the particular edge (and hence the patch which it is part of) should be sub-divided. In other examples (such as in the methods described in GB2533443 and GB2533444) vertex tessellation factors are used, with each vertex (or corner) of a patch having a vertex tessellation factor.

The term 'surface patch' is used herein to refer to a, usually finite, N-dimensional surface (or in the case of an isoline, an N-dimensional curve segment) which is the result of applying a parametric mapping function to a bounded 2D domain, which is either a quadrilateral or a triangle, (or in the case of an isoline, a 1D line segment). The resulting surface or isoline can be considered N-dimensional as it may include not only 3 (or 4) dimensions for Cartesian (or homogeneous) spatial positioning, but also other parameters such as texture coordinates. As described above, surface patches may be curved to fit to the surface of the object they represent and/or have displacement mapping applied. Tessellation (i.e. the sub-division of patches), however, is not performed in 'world space' (i.e. it is not performed on curved surface patches) but is instead performed in domain space (which may also be referred to as parametric space or parameter space or UV space) in which any position in the domain can be described by two coordinates (u,v) known as the domain space coordinates, which means that the tessellation process is independent of any curvature present in the final surface.

The term 'patch' is used herein to refer to an ordered set of two, three or four vertices (for an isoline, triangle or quad respectively) which bound a domain. The term 'domain' therefore refers to the two-dimensional space bounded by the vertices of a patch. The term 'input patch' is used to refer to a patch which is input to a tessellation unit. In examples where the tessellation unit performs a pre-processing stage which sub-divides the input patch before repeatedly applying a tessellation algorithm to patches formed by the pre-processing stage, the patches formed in the pre-processing stage are referred to herein as 'initial patches'. Patches which are formed by the sub-division of initial patches are referred to herein as 'sub-patches'. The term 'primitive' is used herein to refer to a patch (e.g. an initial patch or sub-patch) that is output by the tessellation unit because it requires no further sub-division. Whilst input, initial patches and sub-patches are often triangles and the examples below show triangles, in other examples, the input, initial patches and/or sub-patches may be isolines, quadrilaterals or any form of polygon.

The term 'vertex' is used generally to describe a location plus other attributes, where these attributes differ depending upon the context. For example, input control points and output vertices from a domain shader comprise a 3D position plus other parameters such as the normal, tangent, texture, etc. (referred to as a world space vertex), whereas the vertices within the tessellator comprise a domain space coordinate and a vertex tessellation factor (referred to as Tessellator vertices). These vertices within the tessellator are therefore not the same as the input control points or the resulting N-dimensional vertices that form the final triangles. The term 'domain vertex' is used herein to refer to the output structure of each vertex from the Tessellator, describing its state in the domain and this this is the structure output to the output vertex buffer. In many examples, the domain vertex is a UV coordinate and in other examples it may additionally comprise a weight and optionally the UV coordinates of one or more neighbouring vertices. In particular this weight may be a displacement factor and these neighbouring vertices may be two or three parent vertices as described in GB2533443 and GB2533444.

Described herein are a number of different hardware tessellation units that may be used to provide real-time tessellation (i.e. tessellation that can be executed at a per-frame rate) or alternatively the hardware tessellation units may be used in slower systems or as part of an offline pre-process. Many of the hardware tessellation units described herein include a patch stack. The patch stack may be implemented in various different ways; however, in all examples using a patch stack, the patch stack implements a first-in-last-out (FILO) policy. Whilst the patch stack is described as a 'stack' it may be any data structure that can operate as a FILO or may be implemented on a CPU or any other element that can model recursion. The patch stack stores patch data, i.e. data relating to initial patches and/or sub-patches, and for a given patch (i.e. an initial patch or a sub-patch) the data may comprise three tessellator vertices (as defined above) and optionally additional parameters.

By using a patch stack, as described herein, the efficiency of the hardware tessellation unit is increased and the overall memory requirements for storing primitive data are reduced. Furthermore, the use of a patch stack enables multiple levels of subdivision to be performed with the same subdivision block and in various examples multiple sub-division blocks may be provided, enabling sub-division of multiple patches within the same clock cycle.

Also described herein is a single vertex/primitive hardware tessellation unit that is configured to receive, as an input, a vertex or primitive ID and then to generate, based on the received ID, either one or more (e.g. three) domain vertices (e.g. one domain vertex in response to receiving a vertex ID and three domain vertices in response to receiving a primitive ID). This single vertex/primitive hardware tessellation unit provides an efficient way of generating a single vertex or primitive and avoids the need to perform a full tessellation that generates lots of primitive and vertex data that is then discarded.

In the following description, primitives, patches and sub-patches are all described as being triangular in shape, in other examples, they may be isolines or comprise more than three sides (e.g. quads or polygons with more than four sides).

Figure 1B:
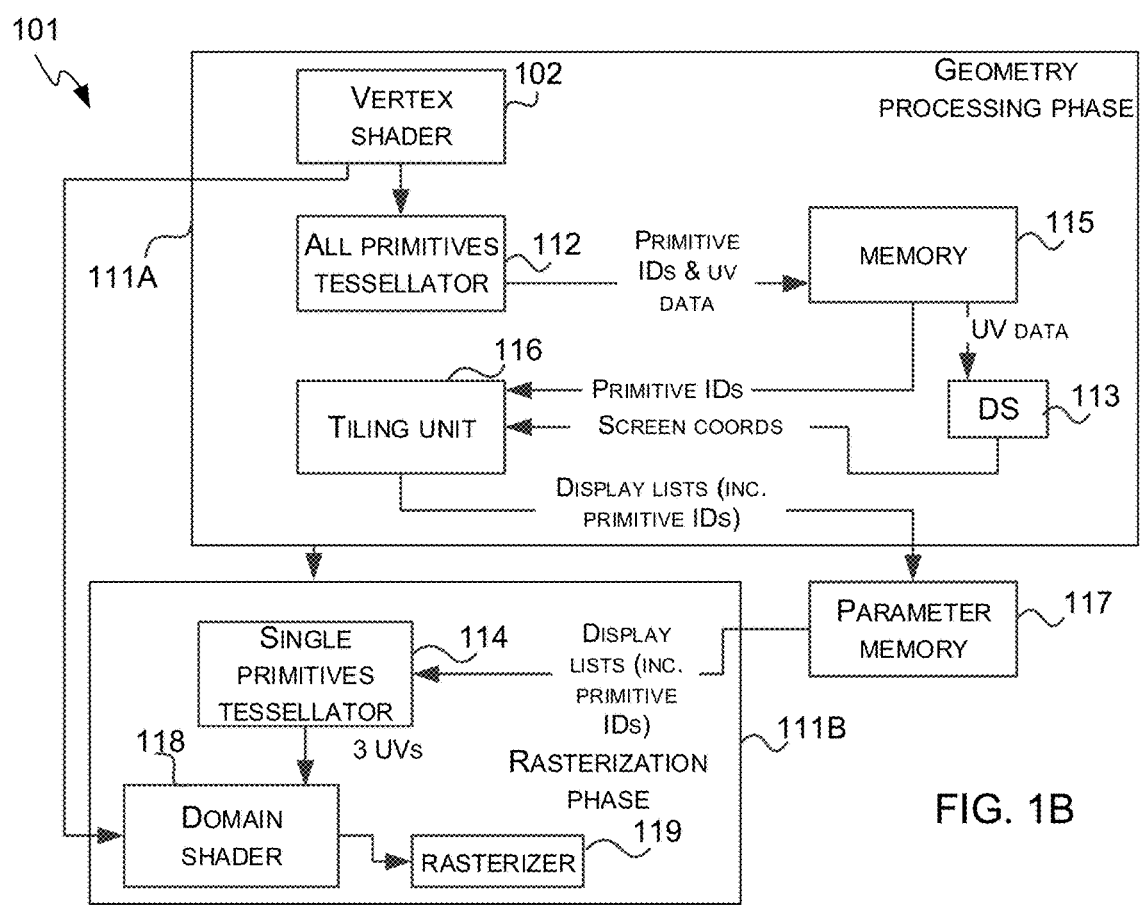

The hardware tessellation units described herein may be part of a GPU pipeline and two example pipelines are shown in FIGS. 1A and 1B.

FIG. 1A shows a schematic diagram of an example graphics processing unit (GPU) pipeline 100 which may be implemented in hardware within a GPU and which uses a tile-based rendering approach. As shown in FIG. 1A, the pipeline 100 comprises a geometry processing phase 101A and a rasterization phase 101B. The geometry processing phase 101A comprises the tessellation unit 104 and a vertex shader 102 which is responsible for performing per-vertex calculations. The vertex shader 102 has no knowledge of the mesh topology and performs per-vertex operations so that it only has information of the current vertex that is being processed. Between the vertex shader 102 and the tessellation unit (or tessellator) 104 there may be one or more optional hull shaders, not shown in FIG. 1A. The geometry processing phase 101A further comprises a geometry specific domain shader (DS) 103, a tiling unit 106 and may also comprise other elements, such as a memory 105 and/or other elements not shown in FIG. 1A.

Unlike the vertex shader, the hardware tessellation unit 104 (and any optional hull shaders) operates per-patch and not per-vertex. The tessellation unit 104 outputs primitives and in systems which use vertex indexing, an output primitive takes the form of three vertex indices and a buffer of vertex data (e.g. for each vertex, a UV coordinate and in various examples, other parameters such as a displacement factor and optionally parent UV coordinates). Where indexing is not used, an output primitive takes the form of three domain vertices, where a domain vertex may comprise only a UV coordinate or may comprise a UV coordinate plus other parameters (e.g. a displacement factor and optionally, parent UV coordinates). The data output by the tessellator 104 may be stored in memory 105.

The geometry specific domain shader 103 in the geometry processing phase 101A generates the projected positions of the corners of the primitives. The tiling unit 106 reads the data generated by the tessellator 104 from memory 105 and uses this data, along with the projected positions generated by the geometry specific domain shader 103, to generate per-tile display lists. The display lists are then output to the parameter memory 107. Each per-tile display list identifies, for a particular tile, those primitives which are at least partially located within that tile. These display lists may be generated by the tiling unit 106 using a tiling algorithm. Subsequent elements within the GPU pipeline, such as the rasterization phase 101B, can then read the data from parameter memory 107.

Although FIG. 1A shows use of a geometry specific domain shader 103 to calculate the projected positions of the new primitives in screen space (referred to as the 'screen coordinates'), in other examples, a full domain shader (similar to domain shader 108) or alternative dedicated hardware may be used to perform these calculations of screen coordinates for the primitives. In other examples which do not comprise a geometry specific domain shader 103, hardware may be provided that is arranged to estimate the screen coordinates of the new primitives.

The domain shader 108, which is part of the rasterization phase 101B, acts as a second vertex shader for vertices produced by the tessellator 104 and is executed once per vertex per primitive per tile, although caching may be used to enable reuse of shaded vertices. The domain shader is supplied with a domain space location (u,v) and is given all patch information and outputs a full vertex structure. The domain shader uses the patch control points and the domain space coordinates to build the new vertices and applies any displacement mapping (e.g. by sampling a height map encoded in a texture). The domain shading (in the domain shader 108) is left as late as possible in the GPU pipeline 100 because it greatly enlarges vertex sizes (e.g. in terms of the size required to store each vertex). After the domain shader 108 has run for each generated vertex of each patch, the data for each tile is further processed in the rasterizer 109 and some or all of the primitives are rendered.

In order that the vertex data is available for rendering (e.g. for the domain shader 108 and rasterizer 109), the vertex data generated by the tessellator 104 may be stored according to a tiling storage scheme. In a first example scheme, the vertex data may be stored in the lists of primitives for each group (or tile) generated by the tiling unit 106, e.g. where the primitives are output in the form of triples of vertex UVs, and in another example scheme, the vertex data may be stored together and the lists of primitives may comprise references to this data. Alternatively, the vertex data (e.g. the contents of the buffer of vertex UVs in memory 105) may be discarded (e.g. after the tiling unit 106) and only primitive identifiers may be retained in the display lists (and stored in memory 107). When the vertex data is needed (e.g. by the domain shader 108), the tessellation process may be re-run and data for those primitives which are not required (e.g. which are not included in a particular display list) is discarded. Storing the vertex data (e.g. the UV coordinates and in some examples, additional vertex attributes) in the display lists (and hence in memory 107) uses a large amount of storage and bandwidth (e.g. between the GPU and the system memory) and so discarding the vertex data and subsequently regenerating it, saves on both storage and bandwidth; however, regenerating the vertex data by rerunning the tessellation for all primitives is inefficient.

FIG. 1B shows a schematic diagram of a second example GPU pipeline 101 which may be implemented in hardware within a GPU and which also uses a tile-based rendering approach. Like the example shown in FIG. 1A, the GPU pipeline 101 shown in FIG. 1B comprises a geometry processing phase 111A and a rasterization phase 111B. Unlike the GPU pipeline 100 shown in FIG. 1A, however, the tessellation unit 112 in the geometry processing phase 111A of the GPU pipeline 101 shown in FIG. 1B generates identifiers (IDs) for primitives that encode information about how the primitive was generated, rather than simply indicating the order in which the primitive was output from the tessellation unit. Consequently the vertex data can be discarded and not stored in the display lists (thereby saving both storage and bandwidth) and instead of rerunning the full tessellation in the rasterization phase 111B, the primitive ID can be used to generate the vertex data, e.g. in the single primitives tessellator 114 in the rasterization phase 111B. To distinguish it from the single primitives tessellator 114, the tessellation unit 112 in the geometry processing phase may be referred to as an 'all primitives tessellator'.

The geometry processing phase 111A comprises a vertex shader 102 which is responsible for performing per-vertex calculations. As described above with reference to FIG. 1A, the vertex shader 102 has no knowledge of the mesh topology and only knows the current vertex that has been fed into it. The geometry processing phase 111A also comprises the All Primitives Tessellator 112, memory 115, a geometry-specific domain shader (DS) 113 and a tiling unit 116. Between the vertex shader 102 and the All Primitives Tessellator 112 there may be one or more optional hull shaders, not shown in FIG. 1B.

Unlike the vertex shader 102, the All Primitives Tessellator 112 (and any optional hull shaders) operates per-patch and not per-vertex.

The All Primitives Tessellator 112 is configured to perform the initial, full tessellation and to generate the primitives and their IDs as well as the vertex data. In various examples, the All Primitives Tessellator 112 outputs a list of primitives (e.g. in the form of a UV buffer and an index buffer where indexing is used, or a primitive buffer of UV triples if indexing is not used). An ID buffer (that matches the primitive order) is also generated by the All Primitives Tessellator 112 and the primitive list and ID buffer may be stored in memory 115.

The geometry-specific domain shader 113 in the improved GPU pipeline 101 generates the projected positions (i.e. the screen coordinates) of the corners of the primitives.

The tiling unit 116 then uses the projected positions of the new primitives (as generated by the geometry-specific domain shader 113) to determine which primitives are at least partially located in each tile and to generate corresponding per-tile display lists. The primitive IDs or references to these IDs (dependent upon the tiling storage scheme used) are stored in respective display lists (e.g. in parameter memory 117 i.e. in the list of primitives partially visible in each tile) rather than the UV coordinates that may then be discarded. The primitive IDs are more compact than the three UV coordinates and hence this saves memory (and hence the size of parameter memory 117 may be much smaller than the corresponding parameter memory 107 in the GPU pipeline 100 shown in FIG. 1A and such an arrangement would use less power). References to the surface patch control points (including tessellation factors) are also stored (e.g. in parameter memory 117).

Although the description above and FIG. 1B shows use of a geometry-specific domain shader 113 to calculate the projected positions of the new primitives in screen space (referred to as the 'screen coordinates'), in other examples, a full domain shader (similar to domain shader 118) or alternative dedicated hardware may be used to perform these calculations of screen coordinates for the primitives. In other examples which do not comprise a geometry specific domain shader 113, hardware may be provided that is arranged to estimate the screen coordinates of the new primitives.

When a tile is to be rasterized (in the rasterization phase 111B), each primitive ID in the display list for the tile is transformed into a triple of UV coordinates (which may be abbreviated to 'a triple of UVs') using a Single Primitives Tessellator 114. The Single Primitives Tessellator 114 is configured to generate vertex data from an input primitive ID and whilst this is shown as part of the rasterization phase 111B (because this is where it is positioned in the data flow), it may be physically close to, or integrated with the tessellation unit 112, e.g. such that logic can be reused between the tessellation unit 112 and the Single Primitives Tessellator 114. The two tessellators 112, 114, where they are physically co-located or integrated may be referred to collectively as an improved tessellation unit.

The domain shader 118 in the rasterization phase 111B acts as a second vertex shader for vertices produced by the single primitives tessellator 114 and is executed once per vertex per primitive per tile, although caching may be used to enable reuse of shaded vertices. The domain shader 118 is supplied with a domain space location (u,v) and is given all patch information and outputs a full vertex structure. The domain shader uses the patch control points and the domain space coordinates to build the new vertices and applies any displacement mapping (e.g. by sampling a height map encoded in a texture). The domain shading (in the domain shader 118) is left as late as possible in the GPU pipeline 101 because it greatly enlarges the size (e.g. of memory) required to store each vertex. Where the domain shader 118 and the geometry specific domain shader 113 are implemented separately, the domain shader 118 may be larger in size (e.g. larger in terms of silicon area) than the geometry specific domain shader 113 because it may also be configured to process other side band data in addition to the geometry data.

After the domain shader 118 has run for each generated vertex of each patch, the data for each tile is further processed in the rasterization phase 101B and some or all of the primitives are rendered.

The hardware tessellation units described herein may be used in GPU pipelines such as those shown in FIGS. 1A and 1B. They may also be used in other GPU architectures, such as non tiled-based renderers, and it will be appreciated that they may be used in a GPU pipeline that comprises other shaders in addition to, or instead of, a vertex shader 102, an optional hull shader and a domain shader 118.

Although not described above, the geometry data may be compressed when stored in memory (e.g. in memory 105 and/or parameter memory 107 in FIG. 1A and in memory 115 and/or parameter memory 117 in FIG. 1B).

Figure 2:
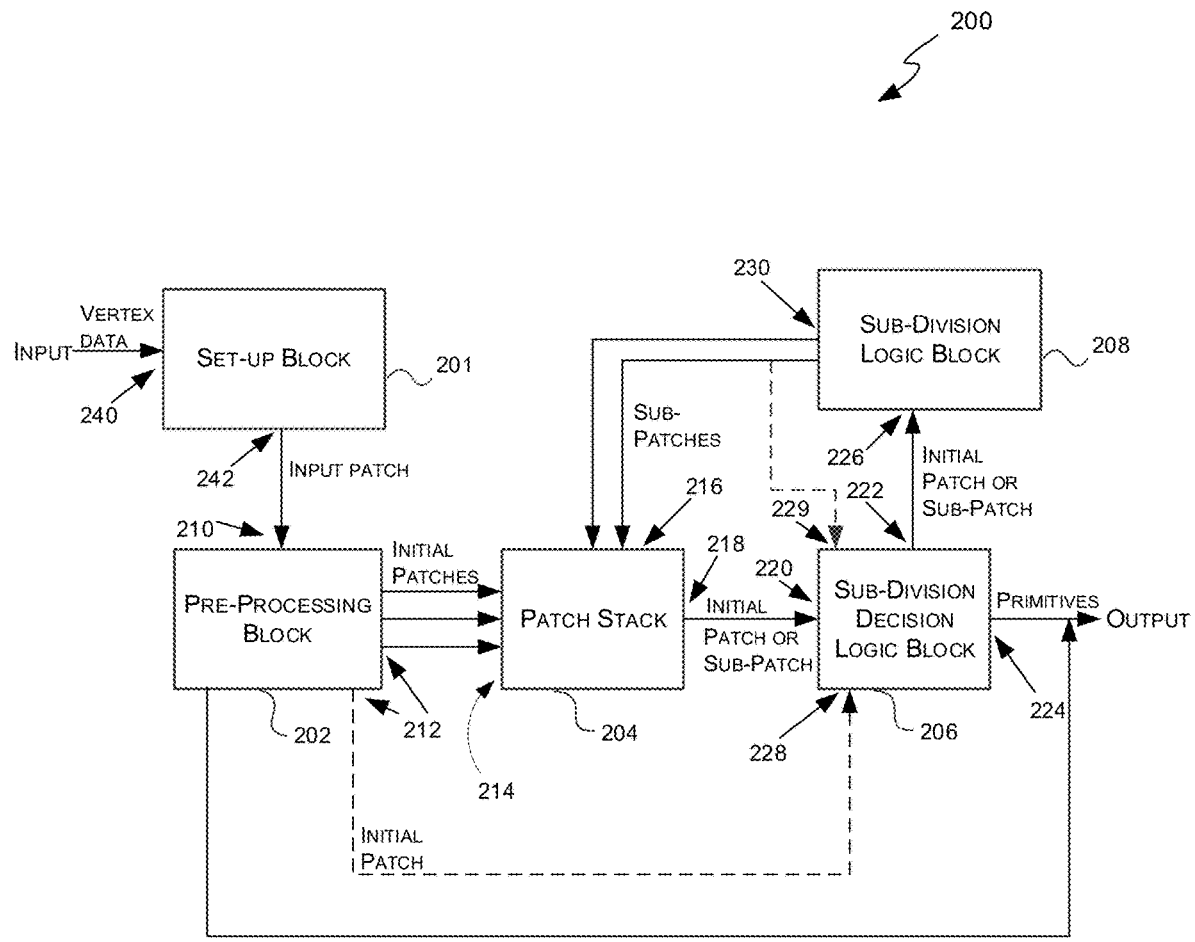
FIG. 2 is a schematic diagram of a first example hardware tessellation unit.

FIG. 2 is a schematic diagram of a first example hardware tessellation unit 200. Such a hardware tessellation unit 200 does not generate primitive IDs and so is not suitable for use in the GPU pipeline 101 shown in FIG. 1B; however, it may be used as the tessellation unit 104 in the GPU pipeline 100 shown in FIG. 1A, or in the tessellation stages of a non-tiled based renderer.

As shown in FIG. 2, the hardware tessellation unit 200 comprises a set-up block 201, a pre-processing block 202, a patch stack 204, a sub-division decision logic block 206 and a sub-division logic block 208. The pre-processing block 202 and the sub-division logic block 208 both perform sub-division of patches—in the case of the pre-processing block 202, it is an input patch that is sub-divided and in the case of the sub-division logic block 208, it is an initial patch or a sub-patch (as formed by sub-division of the initial patch or another sub-patch) that is sub-divided. The sub-division decision logic block 206 determines whether a patch (e.g. an initial patch or a sub-patch) requires sub-division by the sub-division logic block 208 and if not, outputs the patch.

As shown in FIG. 2, the output of the set-up block 201 is received by the pre-processing block 201. The output of the pre-processing block 202 is received by the patch stack 204 and in various examples also by the sub-division decision logic block 206 (although in that case, different data is output to both the patch stack 204 and the sub-division decision logic block 206). The sub-division decision logic block 206 receives data for patches from the patch stack 204 (and optionally the pre-processing block 202 and/or sub-division logic block 208) and the output of the sub-division decision logic block 206 is either output from the tessellation unit or input to the sub-division logic block 208, dependent upon the decision made by the sub-division decision logic block 206 (i.e. whether the decision is made to sub-divide the patch or not). The output from the sub-division logic block 208 is received by the patch stack 204 (or optionally by the sub-division decision logic block 206).

As described above an input patch may be a quad, triangle, isoline or other polygon. In all cases a set-up block 201 is used to assemble all vertices of the input patch from the input vertex data (e.g. Tessellation Factors) as well as predefined UV coordinates (e.g. (0,0), (0,1), (1,0) and (1,1)). In all cases, except for where the input patch is an isoline, a pre-processing operation is performed by the pre-processing block 202 to sub-divide the input patch into a plurality of polygons with the same number of sides, e.g. a plurality of triangles, and these are referred to as 'initial patches'. The pre-processing stage is used to ensure tessellation is independent of orientation and as a result is not required for an isoline patch (as the algorithm works symmetrically and so there is no orientation dependence of any resulting tessellation). An example of a pre-processing operation and the associated tessellation method, is described in GB253343 and in the methods described the pre-processing operation sub-divides a quad input patch into four triangular initial patches, which can then be separately tessellated, and sub-divides a triangle input patch into three triangular initial patches.

The set-up block 201 comprises an input 240 configured to receive vertex data from some subset of the vertices of the surface patch and an output 242 configured to output an input patch to the pre-processing block 202. Each vertex of the input patch comprises a domain space coordinate (UV) and a vertex tessellation factor (TF) and may comprise other data (such as a displacement factor (DF)). The domain space coordinates, and optionally displacement factors, for each vertex are not retrieved from the surface patch but are instead stored as fixed data within the tessellation unit. The displacement factors are often assigned a default value of 1. The set-up block 201 comprises hardware logic arranged to perform an optional TF transformation operation (e.g. by taking a logarithm base 2) and to assemble all vertices of the input patch (e.g. to assign all the tessellation factors given as an input as well as all other attributes to the vertices of the input patch and to output the vertices in the correct order, e.g. clockwise). The set-up block 201 outputs the assembled input patch to the pre-processing block 210 via output 242.

An example structure of the set-up block 201 is shown in FIG. 3A. As described above, it comprises an optional TF transformation block 302 comprising hardware logic arranged to perform a TF transformation operation and an input patch assembly block 303 comprising hardware logic arranged to assemble all vertices of an input patch.

The TF transformation logic block 302, where provided, comprises an input 308 configured to receive the vertex TFs for some subset of the vertices of the surface patch (e.g. its corner vertices) and hardware logic arranged to transform those vertex TFs, e.g. using a base 2 logarithm. This transformation improves the efficiency of later blocks in the process (in terms of hardware area) by simplifying operations. In other examples the TFs may be manipulated differently or, as described above, this logic block may be omitted. These transformed TFs are then output via an output 310 from the TF transformation logic block 302 and input to the input patch assembly block 303.

The pre-processing block 202 comprises an input 210 configured to receive an input patch from the set-up block 201. The vertex data comprises TFs or optionally transformed TFs where the set-up block 201 performs a TF transformation operation. The pre-processing block 202 also comprises hardware logic arranged to sub-divide the input patch into a plurality of initial patches, or pass through the input patch as an initial patch when no pre-processing is required (e.g. for an isoline input patch) and the pre-processing block 202 further comprises an output 212 configured to output the newly formed initial patches, where the data for each initial patch comprises three tessellator vertices and optionally other parameters. As described below, if subdivision occurs then the sub-division involves the generation of at least one new vertex.

An example structure of the pre-processing block 202 is shown in FIG. 3B. As described above, the pre-processing block 202 performs a sub-division of the input patch and so the structure of this logic block may, in various examples, be similar to the sub-division logic block 208. The pre-processing block 202 comprises a middle vertex logic block 304, a TF reduction logic block 306 and an initial patch assembly block 326. Although FIG. 3B shows the presence of a middle vertex logic block 304 and TF reduction block 306, these may be omitted if initial subdivision does not occur (as indicated from the second output from the middle vertex logic block 304 in FIG. 3B and also by the arrow from the pre-processing block 202 to the output of the sub-division decision logic block 206).

The middle vertex logic block 304 comprises a first input 312 configured to receive either the original TFs or transformed TFs from the set-up block 201 (dependent upon whether the set-up block 201 comprises a TF transformation block 302 or not) and a second input 314 configured to receive the UVs and optionally DFs for each vertex in the input patch. The middle vertex logic block 304 comprises hardware logic arranged to calculate the parameters for a middle vertex of the input patch and hence performs the sub-division of the input patch (because all the initial patches include the newly formed middle vertex and two of the original vertices of the input patch). Data for the middle vertex (e.g. in the form of a tessellator vertex, comprising its UV, TF and optionally DF and the UVs of its zero or more parent vertices) is output, via output 316, to the TF reduction logic block 306. A method of calculating the parameters (e.g. the TF and optionally DF) for the middle vertex is described in GB253343. The UVs of its parents are fixed constants (e.g. as they are corners of the domain and can therefore only take the form (0,0), (0,1), (1,0) and (1,1)) and hence may be built into the system (e.g. stored in a small amount memory in the tessellation unit) rather than calculated. A vertex may, for example, have zero parents if the vertex is unaffected by any other vertices in the blending (e.g. where the DF is one) and may have two parents where it is formed by subdividing an edge and may have three parents where it is formed by subdivision of a triangle input patch.

The TF reduction logic block 306 comprises a first input 318 configured to receive the data for the middle vertex generated by the middle vertex logic block 304 and a second input 320 configured to receive the UVs and DFs for each vertex in the input patch. The TF reduction logic block 306 comprises hardware logic arranged to reduce the TFs (e.g. by subtracting a fixed value from them) of each of the vertices in each of the initial patches formed from the input patch and then the TF reduction logic block 306 outputs, via output 322, tessellator vertices for each initial patch to the initial primitive assembly block 326.

The initial patch assembly block 326 comprises an input 328 configured to receive the tessellator vertices output by the TF reduction logic block 306. The initial patch assembly block 326 comprises hardware logic arranged to assemble the vertices of the input patch and the middle vertex into the initial patches and these are then output via the output 330.

The initial patch data output by the pre-processing block 202 (i.e. the tessellator vertices for each vertex in the initial patches and optionally other parameters) is stored in the patch stack 204. In various examples, the initial patch data for all of the plurality of initial patches generated in the pre-processing block 202 may be input to the patch stack 204. In other examples, the initial patch data for one of the plurality of initial patches generated by the pre-processing block 202 may bypass the patch stack and be input directly to the sub-division decision logic block 206 and the remainder of the plurality of initial patches are input to the patch stack 202. This reduces the maximum number of patches that are required to be stored in the patch stack 204. Similarly, in various examples, the first sub-patch of the sub-patches formed by the sub-division logic block 208 may bypass the patch stack and be input directly into the sub-division decision logic block 206.

The patch stack 204 is a data structure that stores patch data and operates a FILO system. It comprises a first input 214 configured to receive patch data from the pre-processing block 202 and a second input 216 configured to receive patch data from the sub-division logic block 208 (e.g. the inputs 214, 216 receive data that is pushed onto the stack by the pre-processing block 202 and sub-division logic block 208 respectively). The patch data received from the pre-processing block 202 relates to initial patches and the patch data received from the sub-division logic block 208 relates to sub-patches, and in both cases, the patch data for a particular patch or sub-patch is in the form of two, three or more tessellator vertices and optionally other parameters. The patch stack 204 comprises storage elements for storing the patch data according to the FILO scheme and an output 218 configured to output the most recently received patch data to the sub-division decision logic block 206 (e.g. to output data that is popped off the stack). As the data stored in the patch stack 204 may relate to an initial patch or a sub-patch, the data output to the sub-division decision logic block 206 may relate to an initial patch or a sub-patch.

The sub-division decision logic block 206 comprises a first input 220 configured to receive patch data from the patch stack 204 (e.g. data that is popped off the stack) and two outputs: a first output 222 connected to an input of the sub-division logic block 208 and a second output 224 that is the output of the tessellation unit 200. The sub-division decision logic block 206 may also comprise a second input 228 configured to receive patch data for one of the initial patches directly from the pre-processing block 202 (as described above) and a third input 229 configured to receive patch data for one of the subpatches directly from the sub-division logic block 208. The sub-division decision logic block 206 comprises hardware logic arranged to determine, from the patch data input via either input 220, 228 or 229, whether the patch is to be sub-divided or not. In response to the hardware logic determining from the patch data that the patch is to be sub-divided, the patch data is output via the first output 222 and in response to the hardware logic determining from the patch data that the patch is not to be sub-divided, the patch data is output via the second output 224. The hardware logic may, for example, implement one of the tessellation algorithms described in either of GB2533443 and GB2533444 in order to determine whether to sub-divide a patch based on the patch data for that patch.

In various examples, as shown in FIG. 4A, the hardware logic 402 in the sub-division decision logic block 206 is configured to compare the vertex TFs for a subset of the vertices in the patch to a threshold value, T, and if any of the vertex TFs for the subset of vertices exceed the threshold, then it is determined that the patch is to be sub-divided and the patch data is output via the first output 222. If, however, none of the vertex TFs for the subset of vertices exceed the threshold, then it is determined that the patch is not to be sub-divided and the patch data is output via the second output 224. If, alternatively, edge TFs are used instead of vertex TFs, the edge TFs for a subset of the edges in the patch are compared to a threshold value in the hardware logic 402. In the event that patch data is output via the second output 224, the patch may be referred to as a primitive, rather than a patch, because no further sub-division is required. In such examples, the patch data that is output via the second output 224 may omit various attributes or parameters (e.g. such as TFs) to form the output primitive.

The sub-division logic block 208 comprises an input 226 configured to receive patch data from the sub-division decision logic block 206. The sub-division logic block 208 further comprises hardware logic arranged to sub-divide the patch for which patch data is received via one of the inputs and an output 230 configured to output patch data for each of the sub-patches formed by the sub-division to the patch stack (via input 216). As described above, the patch data for an initial patch or a sub-patch comprises three tessellator vertices and optionally other parameters.

As described above, the sub-division logic block 208 is functionally similar to the pre-processing block 202, as can be seen by comparing the structure of an example pre-processing block 202 shown in FIG. 3B and the structure of an example sub-division logic block 208 shown in FIG. 4B. As shown in FIG. 4B, the hardware logic in the sub-division logic block 208 comprises a middle vertex logic block 404 (which may alternatively be referred to as an averaging logic block), a TF reduction logic block 406 and a sub-patch assembly block 407. The middle vertex logic block 404 generates a middle vertex, M, as shown graphically in FIG. 4C bisecting an edge between two vertices of the patch, that has a tessellation factor that is an average of the vertices at the two ends of the edge that is sub-divided, i.e. L and R. Any averaging function may be used and an example function described in GB2533443 which may be used is:

MEAN(TF1,TF2, . . . )=MIN(AVG(TF1, TF2, . . . ),MIN(TF1,TF2, . . . )+Δ)

where AVG( ) is the arithmetic mean of a list of values within the parentheses (e.g. vertex TF1, vertex TF2, . . . in the example above), MIN( ) is the minimum of a list of values within the parentheses (e.g. vertex TF1, vertex TF2, . . . in the example above) and Δ is a pre-determined interval value. The middle vertex logic block 404 comprises an input 408 configured to receive a subset of the tessellator vertices for the patch being sub-divided (e.g. tessellator vertices L and R) and an output 410 configured to output the tessellator vertex for the newly formed middle vertex (e.g. M).

An example of the TF reduction logic block 406 in the sub-division logic block 208 is shown in more detail in FIG. 4D. The TF reduction logic block 406 comprises two inputs: a first input 412 that is configured to receive tessellator vertices for the vertices in the patch (e.g. T, L, R) and a second input 414 that is configured to receive the tessellator vertex for the newly formed middle vertex (e.g. M) from the averaging logic block 404. The TF reduction logic block 406 further comprises an output 416 configured to output patch data for two or more sub-patches. As shown in FIG. 4D, the TF reduction logic block 406 may comprise a logic block 418 that compares each of the vertex TFs to a pre-determined interval value, Δ. That comparator logic block 418 has two outputs, one connected to a logic block 420 that sets the TF value to zero and the other connected to a logic block 422 that subtracts the interval value from the input TF. In response to the comparator logic block 418 determining that a TF is less than the interval value, the TF is output to the logic block 420 that sets the TF value to zero and in response to the comparator logic block 418 determining that a TF is not less than the interval value, the TF is output to the logic block 422 that subtracts the interval value from the input TF. The reduced TF is then output (via output 416) from the TF reduction logic block 406.

By using a patch stack 204, as described above, the efficiency of the hardware tessellation unit is increased and the overall memory requirements for storing primitive data are reduced. As described above, the use of a patch stack enables multiple levels of subdivision to be performed using duplicates of the same subdivision block. Furthermore, although FIG. 2 (and the other example hardware tessellation units described below) only show a single sub-division logic block 208, the use of a patch stack enables the inclusion of additional sub-division logic blocks in a variation on the examples described herein. By including more than one sub-division logic block in a hardware tessellation unit, multiple patches from the patch stack can be processed in a single cycle, thereby increasing the throughput of the hardware tessellation unit.

Figure 5:
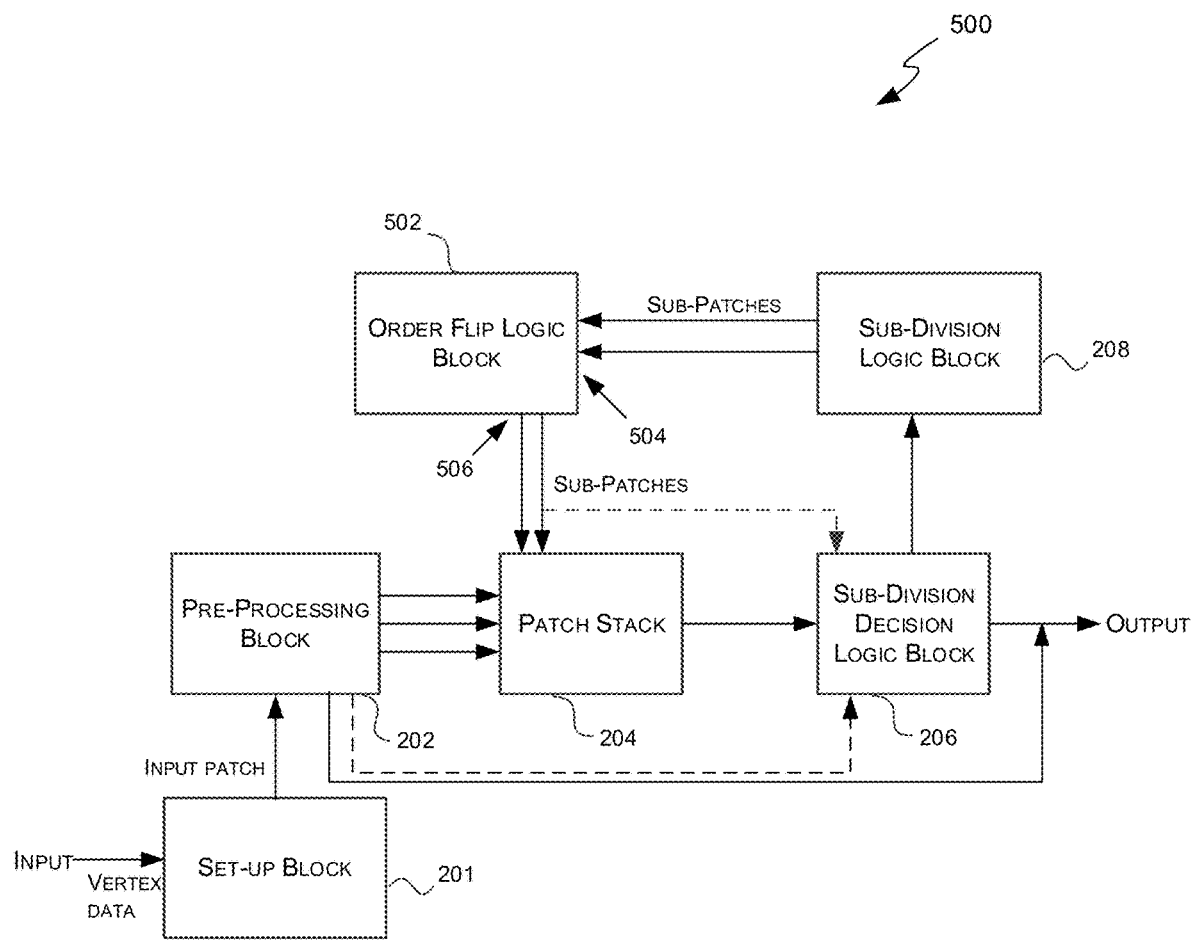
FIG. 5 is a schematic diagram of a second example hardware tessellation unit.
Figure 6:
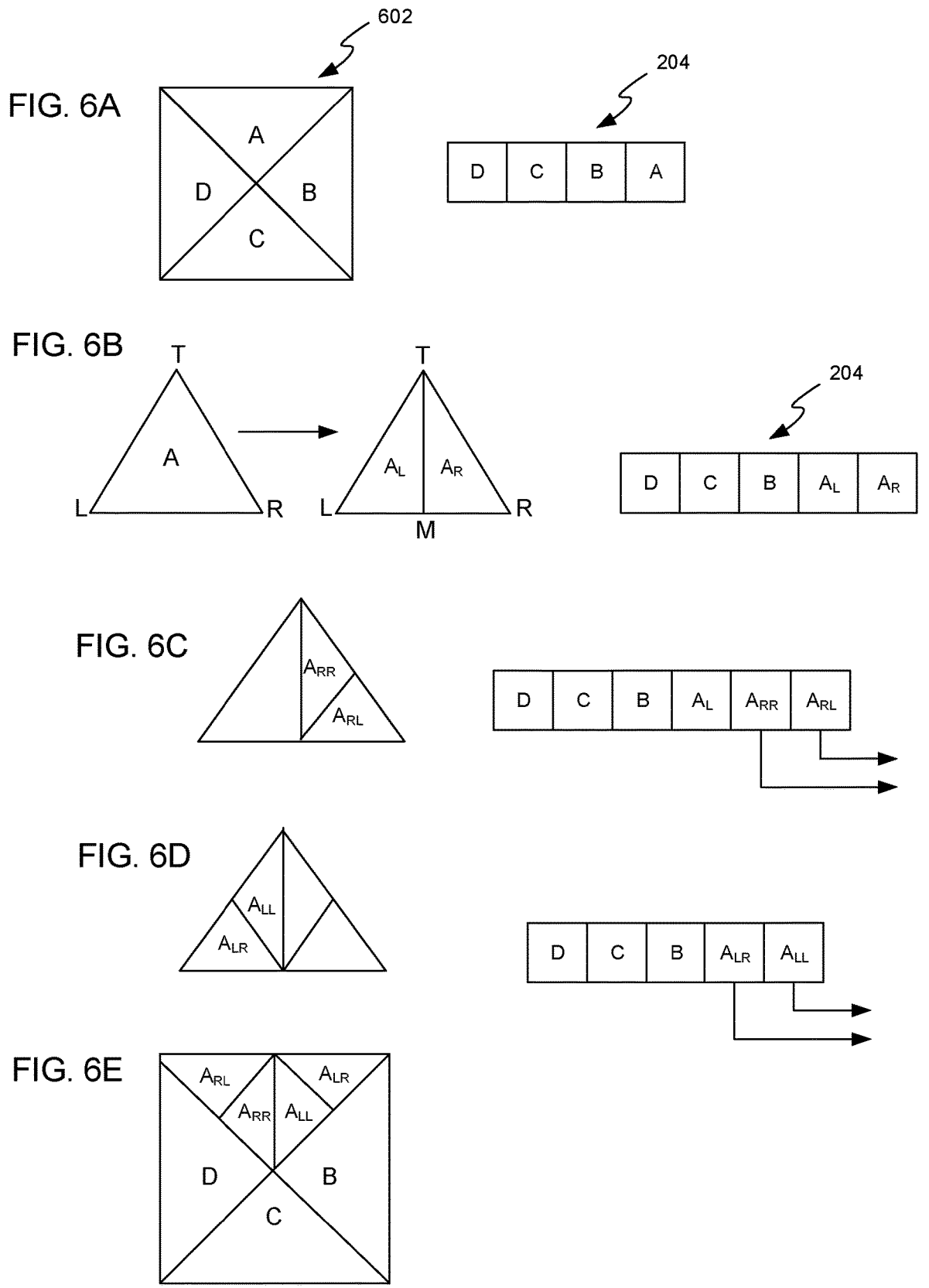
FIGS. 6A-6E are schematic diagrams showing the operation of the hardware tessellation unit in FIG. 5.

FIG. 5 is a schematic diagram of a second example hardware tessellation unit 500. Such a hardware tessellation unit 500 does not generate primitive IDs and so is not suitable for use in the GPU pipeline 101 shown in FIG. 1B; however, it may be used as the tessellation unit 104 in the GPU pipeline 100 shown in FIG. 1A, or in a non tile-based system. It can be seen by comparing the first example hardware tessellation unit 200 shown in FIG. 2 and the second example hardware tessellation unit 500 shown in FIG. 5 that the second example includes an additional hardware logic block: the order flip logic block 502. The set-up block 201, pre-processing logic block 202, patch stack 204, sub-division decision logic block 206 and sub-division logic block 208 are substantially as described above with reference to FIGS. 2-4.

The order flip logic block 502 comprises an input 504 configured to receive sub-patch data from the sub-division logic block 208, an output 506 and hardware logic that controls the order in which sub-patch data is output via the output 506. For example, if the sub-division logic block 208 divides a patch into two sub-patches, denoted sub-patch A and sub-patch B, the order flip logic block 502 receives patch data for both sub-patch A and sub-patch B (via input 504) and the hardware logic within the order flip logic block 502 determines whether to output the patch data for sub-patch A before or after the patch data for sub-patch B. This determination may, for example, be made based on the value of one or more flags or, more generally, one or more stored values. By controlling the order that the sub-patch data is output (based on the one or more stored values), the order in which the sub-patch data is stored in the patch stack 204 is controlled and as the patch stack 204 operates a FILO strategy, it also controls the order in which the sub-patches are subsequently assessed by the sub-division decision logic 206 to determine whether they should be further sub-divided. Ultimately this affects the order in which primitives are output by the tessellation unit 500.

By using the flags (or stored values) to control the order in which sub-patch data is added to the patch stack 202, the order that new sub-patches are processed for each level of sub-division within the tessellation unit can be alternated and as a consequence of this, adjacent primitives in the output ordering can be made to be neighbouring primitives in UV space and thus share two vertices, as described below with reference to FIGS. 6A-6E, making the output primitives more spatially coherent.

As described above, the pre-processing block 202 comprises hardware logic configured to sub-divide an input patch 602 into a plurality of initial patches A-D. These are either all pushed onto the patch stack 204 in reverse order (e.g. D, then C, then B, then A, as shown in FIG. 6A) or the first initial patch, A, may be input to the sub-division decision logic block 206 bypassing the patch stack and the remaining three, B-D, may be pushed to the patch stack 204 in reverse order. In the tessellation unit 500 shown in FIG. 5, the pre-processing block 202 may add a flag to the patch data for each initial patch, where the flag has one of two possible values (e.g. zero or one) and the flag value for all initial patches is the same. Alternatively, there may not be a flag per patch but only a single patch, which is set to an initial value by the pre-processing block 202 and then alternates for each level of subdivision.

The first initial patch, A, is the first initial patch from the input quad 602 to be assessed by the sub-division decision logic block 206 to determine whether sub-division of the initial patch 602 is required, either because it is the first to be popped from the patch stack 204 or because it bypasses the patch stack as described above. If it is determined by the sub-division decision logic block 206 that the initial patch A needs to be sub-divided, then left and right sub-patches, $A_L$ and $A_R$, are formed by the sub-division logic block 208 as shown in FIG. 6B. The sub-division logic block 208 also sets the flag value for each of these newly formed sub-blocks to be the opposite to that of the patch from which they were formed and the flag value of the patch from which they were formed determines the order that the sub-patches are pushed onto the patch stack 204 by the order flip logic block 502 (e.g. $A_L$ and then $A_R$ in the example shown in FIG. 6B). Alternatively, as described above, one of these patches (e.g. sub-patch $A_R$) may bypass the patch stack 204 and instead be provided straight to the sub-division decision logic block 206.

The sub-patch that was pushed second onto the patch stack 204 by the order flip logic block 502 (e.g. sub-patch $A_R$) is then popped from the patch stack 204 (unless it bypassed the patch stack) and assessed by the sub-division decision logic block 206 to determine whether sub-division of the sub-patch is required. If, for example, it is determined by the sub-division decision logic block 206 that the sub-patch $A_R$ needs to be sub-divided, then left and right sub-patches, $A_{RL}$ and $A_{RR}$, are formed by the sub-division logic block 208 as shown in FIG. 6C. The sub-division logic block 208 also sets the flag value for each of these newly formed sub-blocks to be the opposite to that of the patch from which they were formed and as described above the flag value of the patch from which they were formed determines the order that the sub-patches are output by the order flip logic block 502 (and optionally, with one patch being output directly to the sub-division decision logic block 206) and pushed onto the patch stack 204. As the flag value has been swapped, the sub-patches are pushed onto the patch stack 204 by the order flip logic block 502 in the reverse order in this next level of sub-division, e.g. $A_{RR}$ and then $A_{RL}$ in the example shown in FIG. 6C. Alternatively, where on a single flag is used (instead of a flag per patch), then the sub-division logic block 208 changes (i.e. alternates) the value of the single flag for each level of subdivision and the flag value at the time the patch from which they were formed is processed (i.e. prior to the creation of the two sub-patches) determines the order that the sub-patches are output from the order flip logic block 502 to the patch stack 204 (and optionally, with one patch being output directly to the sub-division decision logic block 206).

The sub-patch that was pushed second onto the patch stack 204 by the order flip logic block 502 (e.g. sub-patch $A_{RL}$) is then popped from the patch stack 204 or, alternatively, it may bypass the patch stack 204 and be provided directly to the sub-division decision logic block 206. The sub-patch is then assessed by the sub-division decision logic block 206 to determine whether sub-division of the sub-patch is required. If, for example, it is determined by the sub-division decision logic block 206 that the sub-patch $A_{RL}$ does not need to be sub-divided, the sub-patch is output from the tessellation unit 500.

The most recently added sub-patch remaining in the patch stack 204 (e.g. sub-patch $A_{RR}$) is then popped from the patch stack 204 and assessed by the sub-division decision logic block 206 to determine whether sub-division of the sub-patch is required. If, for example, it is determined by the sub-division decision logic block 206 that the sub-patch $A_{RR}$ does not need to be sub-divided, the sub-patch is output from the tessellation unit 500.

The most recently added sub-patch remaining in the patch stack 204 (e.g. sub-patch $A_L$) is then popped from the patch stack 204 and assessed by the sub-division decision logic block 206 to determine whether sub-division of the sub-patch is required. If, for example, it is determined by the sub-division decision logic block 206 that the sub-patch $A_L$ needs to be sub-divided, then left and right sub-patches, $A_{LL}$ and $A_{LR}$, are formed by the sub-division logic block 208 as shown in FIG. 6D. The sub-division logic block 208 also sets the flag value for each of these newly formed sub-blocks to be the opposite to that of the patch from which they were formed (i.e. opposite to their parent patch $A_L$, which is therefore the same as sub-patches $A_{RL}$ and $A_{RR}$ which were formed at the same level of sub-division). As the flag value has been swapped compared to the parent patch $A_L$, the sub-patches are pushed onto the patch stack 204 by the order flip logic block 502 in the reverse order in this next level of sub-division, e.g. $A_{LR}$ and then $A_{LL}$ in the example shown in FIG. 6D.

The sub-patch that was pushed second onto the patch stack 204 (e.g. sub-patch $A_{LL}$) is then popped from the patch stack 204 and assessed by the sub-division decision logic block 206 to determine whether sub-division of the sub-patch is required. If, for example, it is determined by the sub-division decision logic block 206 that the sub-patch $A_{LL}$ does not need to be sub-divided, the sub-patch is output from the tessellation unit 500.

The most recently added sub-patch remaining in the patch stack 204 (e.g. sub-patch $A_{LR}$) is then popped from the patch stack 204 and assessed by the sub-division decision logic block 206 to determine whether sub-division of the sub-patch is required. If, for example, it is determined by the sub-division decision logic block 206 that the sub-patch $A_{LR}$ does not need to be sub-divided, the sub-patch is output from the tessellation unit 500.

As described above, through use of the flags and the order flip logic block 502 the sub-patches are output in the order: $A_{RL}$, $A_{RR}$, $A_{LL}$, $A_{LR}$, and the next patch to be assessed will be initial patch B. As shown in FIG. 6E, this results in an output ordering in which primitives that are adjacent in the output order are guaranteed to be neighbouring primitives in UV space and thus share two vertices.

A second example, which uses an alternative tessellation method as described in GB2533444, is shown in FIGS. 23A-O. Where this tessellation method is used, there are two types of patch, type 1 and type 2, as shown in FIG. 23A. Both are quad patches, i.e. they both contain four ordered domain vertices. In UV space Patch Type 1 is in the shape of a square, Patch Type 2 is in the shape of a triangle. The four vertices of the patch are $v_0$, $v_1$, $v_2$ and $v_3$.

Both patch types are placed in the stack during subdivision, a single flag in the patch structure can be used to differentiate between the two patch types. The patch types differ in both whether subdivision occurs and how subdivision occurs, i.e. whether patches or primitives are produced. In Patch Type 1 all TFs are considered, in patch Type 2 only $TF_0$, $TF_1$ and $TF_3$ are considered in the Subdivision Logic Block.

Unlike the previous Tessellation Scheme (e.g. as shown in FIGS. 6A-E), triangle primitives can be emitted from the Subdivision Logic Block 208 as well as the Subdivision Decision Logic Block 206, so that post processing of a quad patch into triangle primitives can be performed if further subdivision into sub-patches does not occur.

For patches of type 1, If none of the TFs in Patch Type 1 exceed the threshold then two primitives are emitted in order, $(v_0,v_2,v_3)$ and $(v_0,v_1,v_2)$. If any TF exceeds the threshold then a new vertex $v_4$ is added at the middle of the patch and four Type 2 patches $patch_0=(v_0,v_1,v_4,v_3)$, $patch_1=(v_1,v_2,v_4,v_0)$, $patch_2=(v_2,v_3,v_4,v_1)$, and $patch_3=(v_3,v_0,v_4,v_2)$ are added to the patch stack in reverse order as shown in FIG. 23B.

Figure 23C:
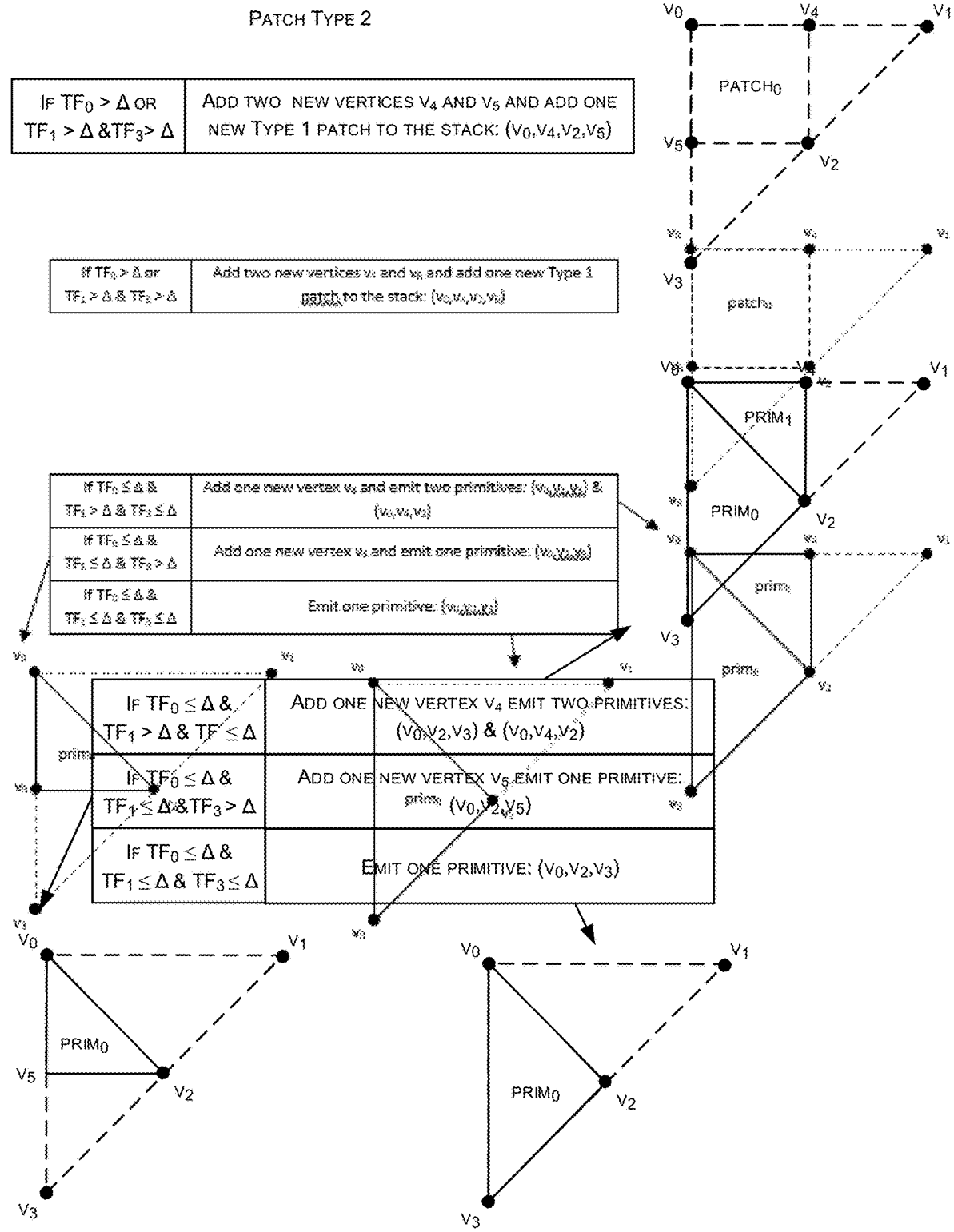
FIGS. 23A-23O are schematic diagrams showing further examples of the operation of the hardware tessellation unit in FIG. 5.

For patches of type 2, as shown in FIG. 23C, if either $TF_0$ or both $TF_1$ and $TF_3$ exceed the threshold then two new vertices $v_4$ and $v_5$ are added as the midpoints of $v_0v_1$ and $v_0v_3$ respectively. One Type 1 patch is added to the patch stack $(v_0, v_4, v_2, v_5)$. If only $TF_1$ exceeds the threshold then one new vertex $v_4$ is added as the midpoint of $v_0v_1$ and two primitives $(v_0,v_2,v_3)$ and $(v_0,v_4,v_2)$ are emitted in order. If only $TF_3$ exceeds the threshold then one new vertex $v_5$ is added as the midpoint of $v_0v_3$ and one primitive $(v_0,v_2,v_5)$ is emitted. If neither $TF_1$ nor $TF_3$ exceeds the threshold then no new vertex is added and one primitive $(v_0,v_2,v_3)$ is emitted.

Figures 23D, 23E, 23F:
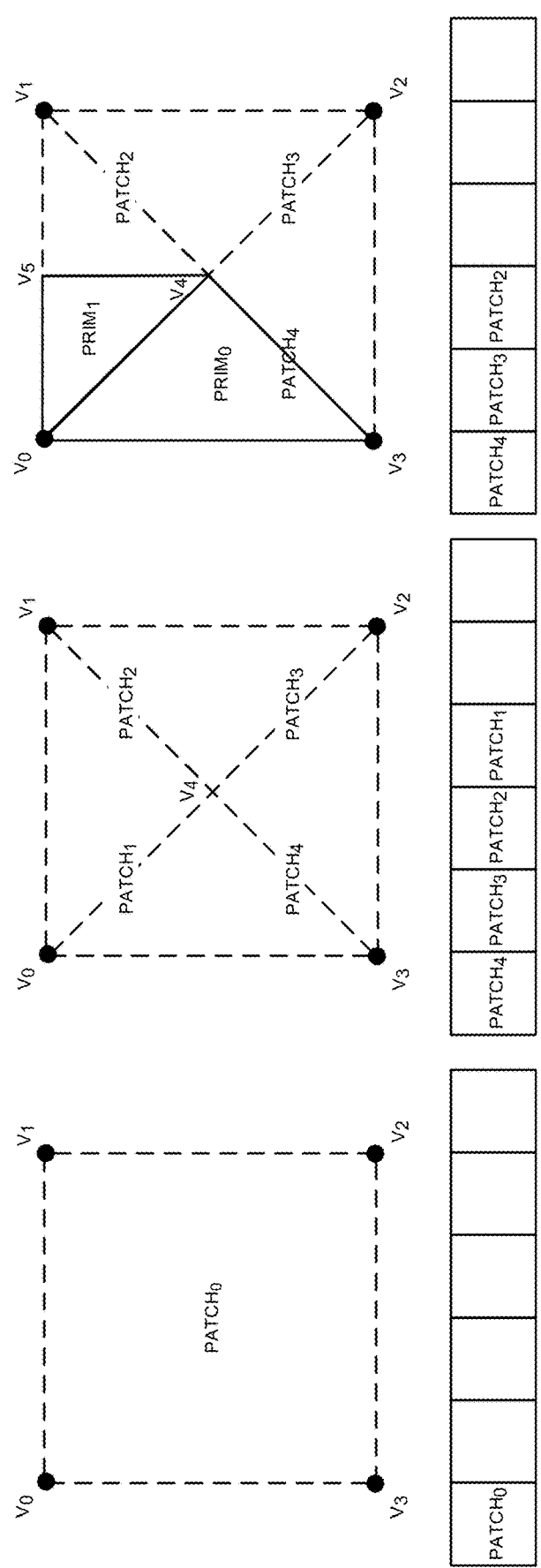

FIG. 23D-O show a tessellation sequence, including the contents of the patch stack 204 where this alternative tessellation method is used. As shown in FIG. 23D, there is initially one patch (of type 1) that is pushed onto the stack and then popped from the stack for subdivision. The patch is then subdivided into four type 1 patches that are pushed onto the stack in reverse order, as shown in FIG. 23E. The patches are then popped from the stack in turn and newly generated sub-patches pushed back onto the stack (as described above) as the tessellation progresses (as shown in FIGS. 23F-O).

By using the hardware tessellator 500 shown in FIG. 5, adjacent primitives in the ordering also neighbour in UV space and thus share two vertices. This results in a change in the order in which vertices are output and improves coherency when caching recently used vertices for the domain shader (e.g. domain shader 108). Use of the hardware tessellator 500 also makes the primitives more coherent in world space (as a consequence of the increased coherency in UV space) and this improves rasterization efficiency (e.g. texel cache look-ups).

The ordering which is produced using the hardware tessellator 500 may be referred to herein as 'improved ordering'. With the primitives in their improved order, the order of the vertices which are output, when using vertex indexing, is also modified, because the order of the vertices is, at least in part, inextricably linked to the primitive ordering.

Figure 7:
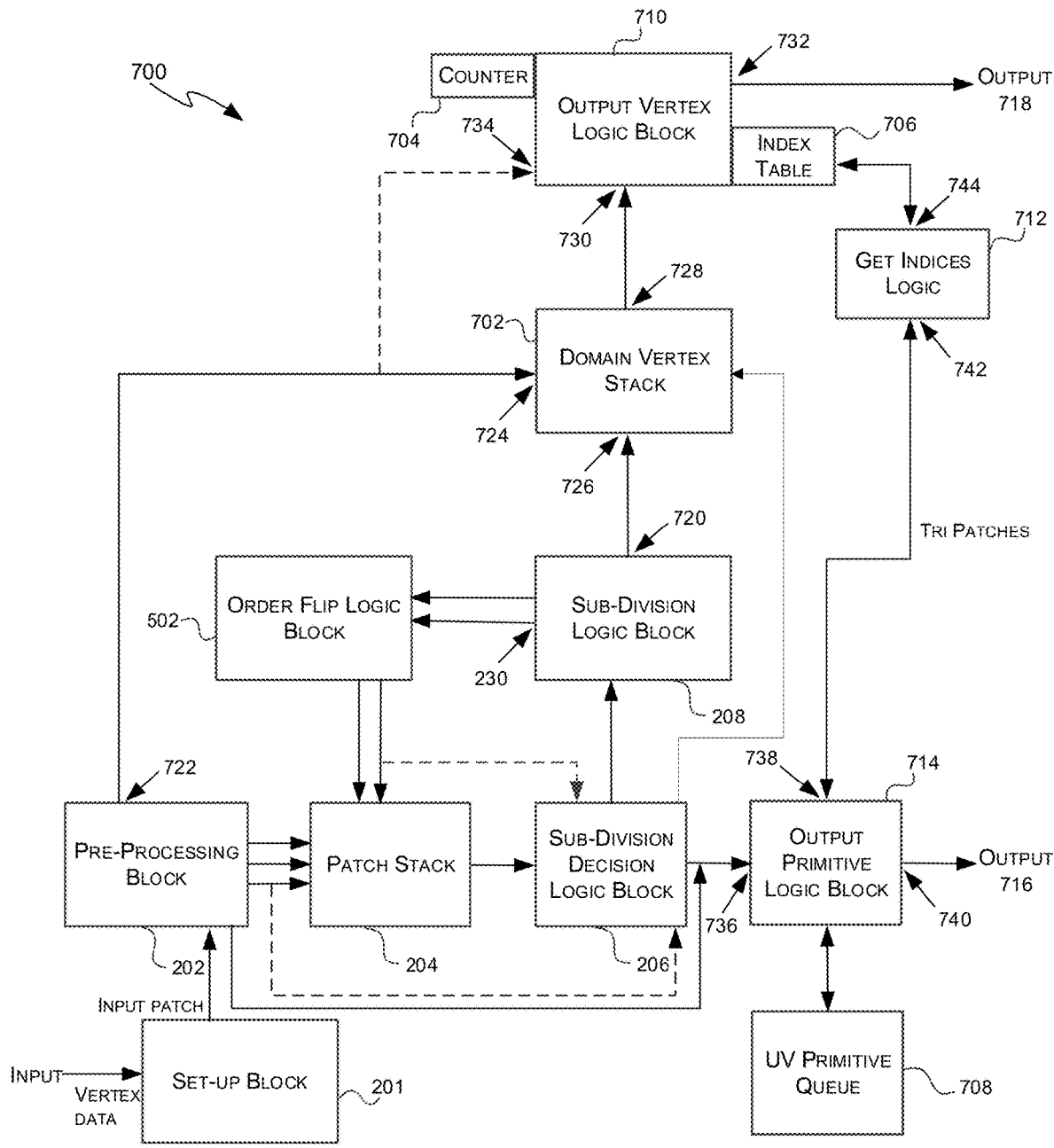
FIG. 7 is a schematic diagram of a third example hardware tessellation unit.

FIG. 7 is a schematic diagram of a third example hardware tessellation unit 700. Such a hardware tessellation unit 700 does not generate primitive IDs and so is not suitable for use in the GPU pipeline 101 shown in FIG. 1B; however, it may be used as the tessellation unit 104 in the GPU pipeline 100 shown in FIG. 1A, or in non tile-based systems. It can be seen by comparing the second example hardware tessellation unit 500 shown in FIG. 5 and the third example hardware tessellation unit 700 shown in FIG. 7 that the third example includes a plurality of additional hardware logic blocks and data structures and these are described below. The order flip logic block 502 is substantially as described above with reference to FIGS. 5-6. The set-up block 201, pre-processing logic block 202, patch stack 204, sub-division decision logic block 206 and sub-division logic block 208 are substantially as described above with reference to FIGS. 2-4.

As described above, use of the hardware tessellator 500 changes the order in which vertices are output from the tessellator (e.g. compared to the first and second example tessellators 200, 500 described above). The hardware tessellator 700 shown in FIG. 7 further modifies the order in which vertices are output (e.g. compared to the hardware tessellator 500 or any of the earlier examples described herein). By using the hardware tessellator 700, which implements both an improved primitive ordering scheme and an improved vertex ordering scheme, the caching of domain shader results is improved because, as parent and child vertices are closer together within the ordering, the likelihood that parent vertices are removed from the cache prior to their reuse is reduced.

The hardware tessellator 700 shown in FIG. 7 comprises four additional data structures compared to the hardware tessellator 500 shown in FIG. 5: a domain vertex stack 702, a counter 704, an index table 706 and a UV primitive queue 708. It also comprises three additional hardware logic blocks: an output vertex logic block 710, a get indices logic block 712 and an output primitive logic block 714. It can also be seen that the hardware tessellator 700 shown in FIG. 7 has two outputs (as vertex indexing is being used): a first output 716 that outputs primitive data in the form of indices to the rasterizer 109 and a second output 718 that outputs vertex data to the domain shader with optional blending (e.g. domain shader 103 in FIG. 1A). As vertices are allocated an index by the output vertex logic block 710 (as described below), the primitive data output via the first output 716 comprises the indices of the vertices rather than the full vertex data.

As shown in FIG. 7, the sub-division logic block 208 in the hardware tessellator 700 comprises an additional output 720 compared to earlier examples described herein. This output 720 is configured to output vertex data for the newly formed middle vertex, M, to the domain vertex stack 702. The vertex data for the original vertices of the initial patches is pushed to the domain vertex stack 702 by the pre-processing block 202 which also comprises an additional output 722 compared to earlier examples described herein and this additional output 722 is configured for this purpose (i.e. to output the vertex data for the original vertices of the initial vertices to the domain vertex stack 702). As indicated by the dotted arrow in FIG. 7, some of the vertex data relating to the initial patches may be output directly to the output vertex logic block 710, bypassing the domain vertex stack 702.

Like the patch stack 204, the domain vertex stack 702 operates a FILO scheme. The domain vertex stack 702 comprises two inputs: a first input 724 configured to receive the vertex data for the original vertices of the initial vertices from the pre-processing block 202 and a second input 726 configured to receive output vertex data for each newly formed middle vertex from the sub-division logic block 208. The domain vertex stack 702 additionally comprises storage elements for storing the vertex data according to the FILO scheme and an output 728 configured to output the most recently received vertex data to the output vertex logic block 710. Vertex data for a single vertex is popped off the domain vertex stack 702 when a patch or sub-patch is assessed by the sub-division decision logic block 206 and it is determined that no further sub-division is required. The sub-division decision logic block 206 communicates with the domain vertex stack 702 to trigger the popping of the vertex data.

Figure 8:
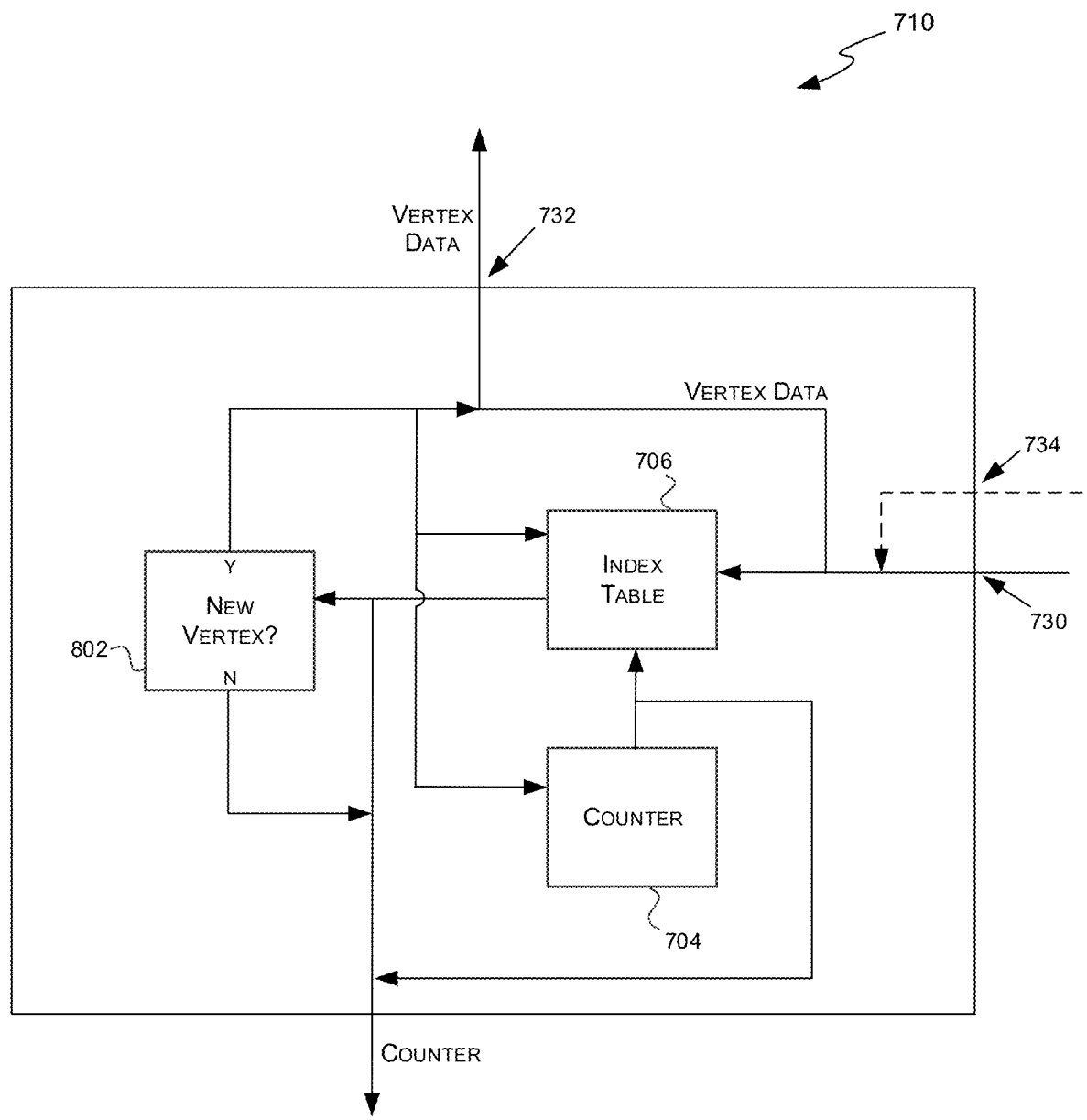
FIG. 8 is a schematic diagram showing an example implementation of the output vertex logic block in FIG. 7.

The output vertex logic block 710 comprises an input 730 configured to receive vertex data popped from the domain vertex stack 702, hardware logic arranged to determine whether the received vertex data relates to a vertex which has already been output by the tessellator 700 and an output 732 configured to output vertex data. As indicated by the dotted arrow in FIG. 7, the output vertex logic block 710 may also comprise a second input 734 configured to receive vertex data for a subset of the vertices of the initial patches from the pre-processing block 202 directly, bypassing the domain vertex stack 702. As shown in FIG. 8, which shows an example of the structure of the output vertex logic block 710, the output vertex logic block 710 may also logically comprise the counter 704 and index table 706.

In response to receiving, via input 730, vertex data for a vertex that has been popped off the domain vertex stack 702 (or vertex data received directly from the pre-processing block 202 via input 732), hardware logic 802 within the output vertex logic block 710 is configured to determine whether the vertex data for that vertex has already been output and to only output the vertex data in the event that the vertex data has not previously been output. This determination is made using the counter 704 and index table 706. The counter is initially set to zero and this counter value is used to set index values for vertices. The hardware logic 802 checks vertex data received against the index table 706. The index table 706 stores an index for each of the possible (e.g. 65 by 65) UV coordinates or an invalid value if no vertex at that UV location has been output. If the vertex has not been emitted before (e.g. as indicated by an invalid value in the index table 706), the hardware logic 802 is arranged to increment the counter 704, add an entry to the index table 706 (e.g. the newly incremented counter value as an index for that vertex, addressable within the index table by its UV coordinate) and output the vertex data via output 732. If the vertex has been emitted before, the hardware logic 802 is arranged to block output of the vertex data.

The output primitive logic block 714, in combination with the UV primitive queue 708 and get indices logic block 712, is arranged to delay the output of a primitive (via output 716) until all the vertices of the primitive have been output (via output 718). This is because there may be situations where primitives are produced with a vertex that has not yet been passed to the output vertex logic block 710, as demonstrated by the example below, and therefore will have no index available for the output primitive. The output primitive logic block 714 comprises a first input 736 configured to receive primitive data from the sub-division decision logic block 206, an input/output 738 arranged to communicate with the get indices logic block 712, and an output 740 arranged to output primitive data once all the vertices of the primitive have been output (via output 718). As described above, the primitive data that is output comprises vertex indices instead of the full vertex data (that is instead output via output 718 from the tessellator 700) and the indices may be obtained from the index table 706 by communicating with the get indices logic block 712. The output primitive logic block 714 further comprises hardware logic arranged to add primitives received from the sub-division decision logic block 206 (via input 736) to the UV primitive queue 708, to check if all the vertices of the least recently added primitive stored in the UV primitive queue 708 have been output and if so, to remove the primitive from the UV primitive queue 708 and output the primitive (via output 740). In various examples the check may be performed before adding a primitive to the UV primitive queue 708. In such examples a primitive is not added to the queue if all the vertices have already been output but the primitive is instead output directly.

The get indices logic block 712 acts as an interface between the output primitive logic block 714 and the index table 706 and enables the hardware logic in the output primitive logic block 714 to determine if all the vertices of any of the primitives stored in the UV primitive queue 708 have been output and also obtain the indices for the vertices of a primitive so that the output primitive data can comprise vertex indices instead of full vertex data. It comprises an input/output 742 configured to communicate with the output primitive logic block 714 and an input/output 744 configured to perform look-ups in the index table 706.

Figure 9:
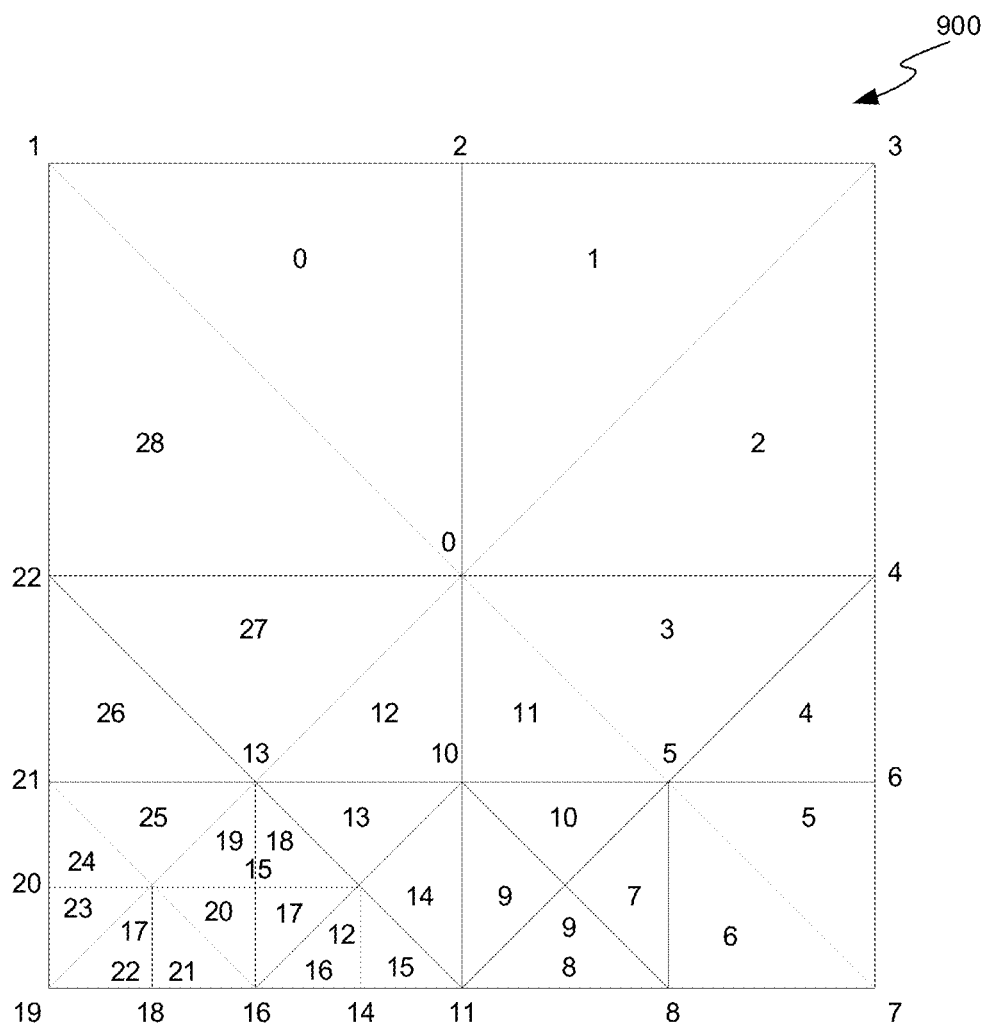
FIG. 9 shows an example ordering in which both the vertices and the primitives are numbered in order.

The table below shows an example of the operation of the hardware tessellator 700 shown in FIG. 7 and in particular the operation of the domain vertex stack 702 and the UV primitive queue 708. The table shows the contents of both the stack 702 and queue 708 at each stage in the sequence for a quad input patch 900 shown in FIG. 9. As shown in the table below and described above, the stack is initialized, prior to any sub-division, when the corners of the quad input patch 900 (which are a subset of the vertices of the initial patches) are pushed onto the domain vertex stack 702 (via input 724). In this example, the middle and top left vertices of the quad input patch 900, vertices 0 and 1, bypass the domain vertex stack (as indicated by the dotted arrow in FIG. 7) and are instead provided directly to the output vertex logic block 710 by the pre-processing block 202.

As shown in FIG. 26, the Domain Vertex Stack and UV primitive queue as comprising indices/triples of indices, this is for brevity only. As described above, the indices are not determined until the vertices are output and so the Domain Vertex Stack and UV primitive queue actually store Domain Vertices and triples of UV coordinates (and may store different numbers of UV coordinates in examples where the patches are not triangular).

As shown in the table, after processing the final patch (22,1,0), the stack will be empty and so no vertex is popped off.

The table also indicates the number of entries in the domain vertex stack (2T+2) and the UV primitive queue ($2^{2T-3}$) for the quad domain. The value T is the maximum Tessellation Factor of the system, in log base 2. For the triangle domain, the size of the domain vertex stack is slightly smaller (because the domain has fewer corner vertices) and comprises 2T+1 entries.

Figure 10:
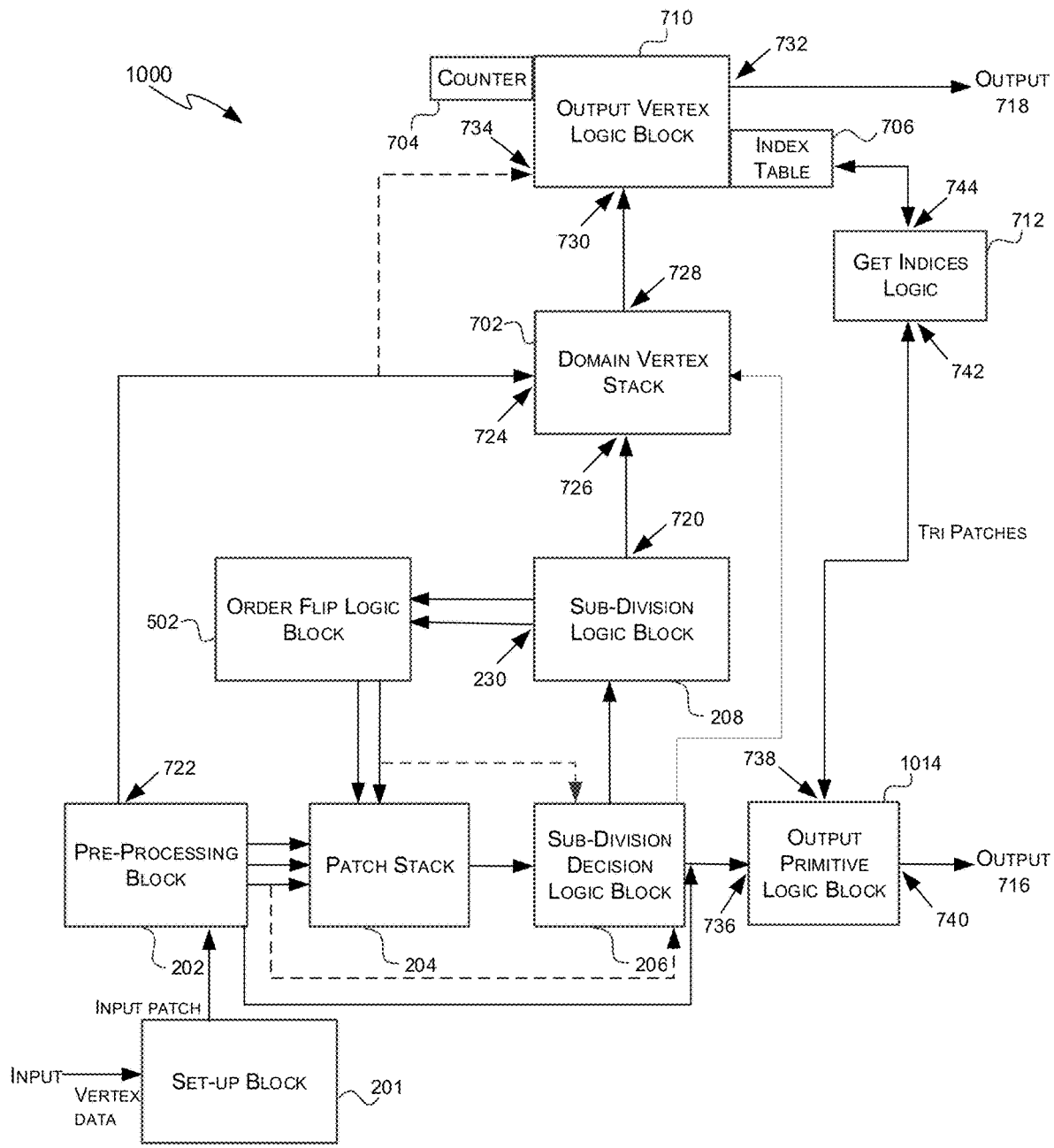
FIG. 10 is a schematic diagram of a fourth example hardware tessellation unit.

FIG. 10 is a schematic diagram of a fourth example hardware tessellation unit 1000. Such a hardware tessellation unit 1000 does not generate primitive IDs and so is not suitable for use in the GPU pipeline 101 shown in FIG. 1B; however, it may be used as the tessellation unit 104 in the GPU pipeline 100 shown in FIG. 1A, or in a non tile-based system. It can be seen by comparing the third example hardware tessellation unit 700 shown in FIG. 7 and the fourth example hardware tessellation unit 1000 shown in FIG. 10 that the fourth example omits one data structure—the UV primitive queue 708. The domain vertex stack 702, counter 704, index table 706, output vertex logic block 710 and get indices logic block 712 are substantially as described above with reference to FIGS. 7-9. The order flip logic block 502 is substantially as described above with reference to FIGS. 5-6. The set-up block 201, pre-processing logic block 202, patch stack 204, sub-division decision logic block 206 and sub-division logic block 208 are substantially as described above with reference to FIGS. 2-4.

The output primitive logic block 1014 is similar to the output primitive logic block 714 as described above with reference to FIGS. 7-9 except that it does not comprise an output to a UV primitive queue and therefore does not store any primitives in a queue. This is because with the revised ordering scheme implemented by the tessellator 1000 (as described in detail below) there is no possibility that a primitive will be output before all of its vertices and hence no primitive queue is required. The output primitive logic block 1014 comprises a first input 736 configured to receive primitive data from the sub-division decision logic block 206, an input/output 738 arranged to communicate with the get indices logic block 712, and an output 740 arranged to output primitive data (via output 718). As described above, the primitive data that is output comprises vertex indices instead of the full vertex data (that is instead output via output 718 from the tessellator 1000) and the indices may be obtained by hardware logic within the output primitive logic block 1014 that is arranged to communicate with the get indices logic block 712.

As described above, use of the hardware tessellator 500 changes the order in which primitives are output from the tessellator (e.g. compared to the first example tessellator 200 described above). The hardware tessellator 700 shown in FIG. 7 further modifies the order in which vertices are output (e.g. compared to the hardware tessellator 500 or any of the earlier examples described herein) when using indexed geometry, and may be known as an improved ordering scheme. The hardware tessellator 1000 shown in FIG. 10 also further modifies the order in which vertices are output (e.g. any of the earlier examples described herein) when using indexed geometry and this revised ordering may be referred to as a triangle strip ordering scheme.

This modified ordering in the tessellator 1000 shown in FIG. 10 is achieved through a different sequence of pushing and popping of vertices into and from the domain vertex stack 702. Unlike the example shown in FIG. 7, in the tessellator 1000 shown in FIG. 10, the sub-division logic block 208 does not just push the newly formed vertex M onto the stack 702 (via output 720), but instead the sub-division logic block 208 in FIG. 10 comprises hardware logic arranged to pop the top vertex off the stack 702 (and temporarily store the popped vertex) before pushing the newly formed middle vertex onto the stack followed by the popped vertex and a copy of the newly formed middle vertex. For example, if the most recently added vertex on the domain vertex stack 702 is vertex X, this vertex is popped from the stack and the follow sequence of vertices are pushed to the stack: M, X, M. Additionally, instead of popping vertex data for a single vertex off the domain vertex stack 702 when a patch or sub-patch is assessed by the sub-division decision logic block 206 and it is determined that no further sub-division is required, two vertices are popped off the stack (as triggered by the sub-division decision logic block 206).

Figure 11:
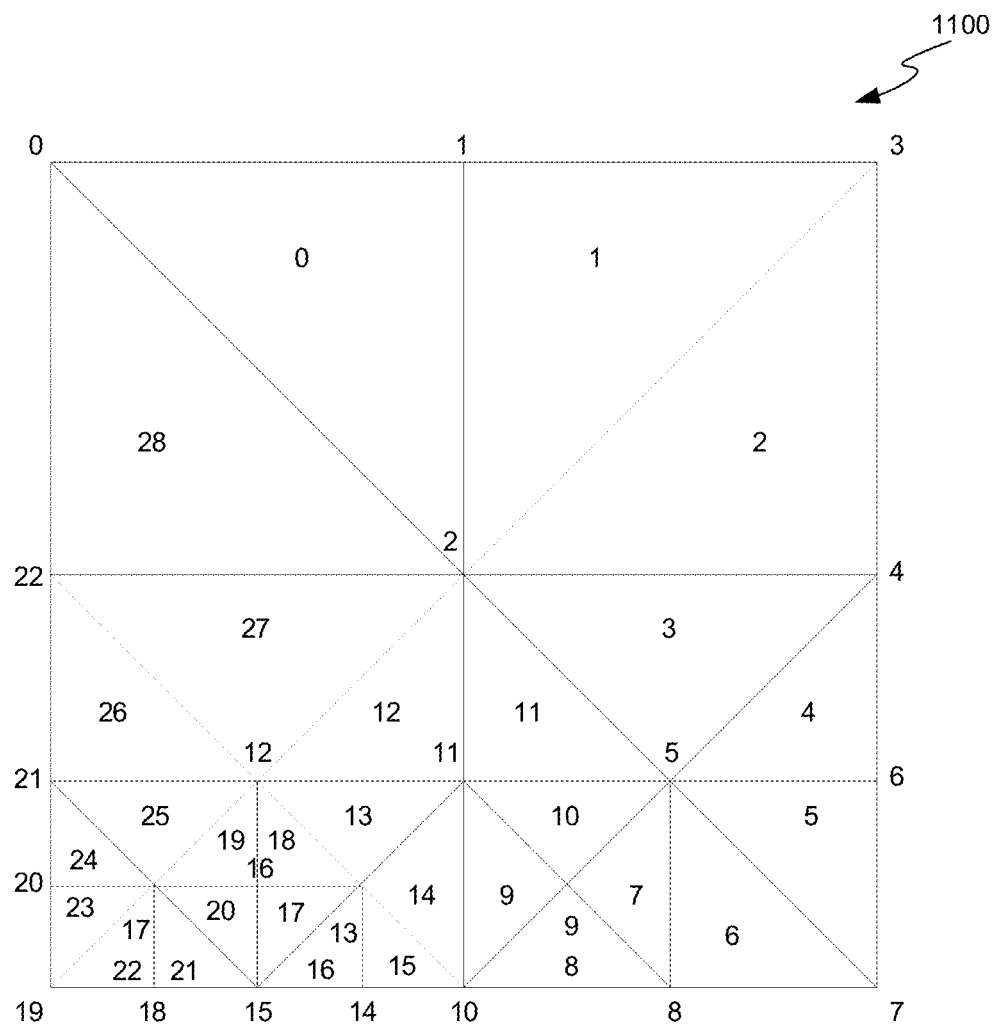
FIG. 11 shows a further example ordering in which both the vertices and the primitives are numbered in order.

FIG. 27 shows an example of the operation of the hardware tessellator 1000 shown in FIG. 10 and in particular the operation of the domain vertex stack 702. The table shows the contents of the stack 1002 at each stage in the sequence for a quad input patch 1100 shown in FIG. 11. As shown in the table, the stack is initialized, prior to any sub-division, when the corners of the quad input patch 1100 (which are a subset of the vertices of the initial patches) are pushed onto the domain vertex stack 702 (via input 724). Compared to the previous example hardware tessellator 700, shown in FIG. 7, the order in which vertices are pushed to the domain vertex stack 702 to initialize it is different. In this example, the middle vertex, vertex 2, is pushed to the stack 702 followed by the other corners of the quad 1100 in reverse order and alternated with three copies of the middle vertex, e.g. 2, 19, 2, 7, 2, 3, 2. Furthermore, in this example, the top left vertex of the quad input patch 900, vertex 0, bypasses the domain vertex stack (as indicated by the dotted arrow in FIG. 10) and is instead provided directly to the output vertex logic block 710 by the pre-processing block 202.

Whilst the table shows the domain vertex stack as comprising a single index, this is for brevity only—as described above, the index is not determined until the vertex is output and so the domain vertex stack actually stores domain vertices with all attributes.

The table also indicates the number of entries in the domain vertex stack for the quad domain (4T+5), where, as described above, T is the maximum Tessellation Factor of the system, in log base 2. For the triangle domain, the size of the domain vertex stack is slightly smaller (because the domain has fewer corner vertices) and comprises 4T+3 entries.

Both the improved vertex ordering (implemented by tessellator 700 shown in FIG. 7) and the triangle strip vertex ordering (implemented by tessellator 1000 shown in FIG. 10) provide a coherent ordering for vertices in UV space and for primitives. Whilst the improved vertex ordering requires two additional data structures—one to store vertices (the domain vertex stack 702) and the other to store primitive data (the UV primitive queue 708), the triangle strip vertex ordering only requires a single data structure (to store vertices, the domain vertex stack 702) and the triangle strip vertex ordering is more coherent than the improved vertex ordering. As demonstrated by the tables above for the two different ordering schemes, the size of the domain vertex stack 702 that is required for triangle strip vertex ordering is larger than for improved vertex ordering. Although the two ordering schemes described herein do require additional data structures, the size of the vertex cache that stores post domain shader vertices can be reduced (as a consequence of the coherency, as described above) and as each entry in the vertex cache is large (e.g. up to 128 floats), a single entry in that cache can be larger than the size of the additional data structures and hence there is a significant overall saving in the amount of data that is stored.

Whilst the vertex ordering methods are described above with reference to the quad domain (i.e. a quad input patch), the methods are also applicable to the triangle domain and to the isoline domain or any other polygonal domain. In the case of the triangle domain, the pre-processing block 202 sub-divides the triangle input patch into three initial triangle patches. Additionally, only two corner vertices are pushed to the domain vertex stack 702 to initialize it in the case of the improved ordering and only two corner vertices and three copies of the middle vertex are pushed onto the domain vertex stack 702 to initialize it in the case of triangle strip ordering. The triangle domain also requires a smaller domain vertex stack 702 than the quad domain (as described above). In the case of the isoline domain, the two orderings are equivalent and order the vertices in left to right order and no pre-processing block is required. No UV primitive queue is required and the domain vertex stack 702 can be smaller than for the triangle domain (e.g. just T+1 entries). Any other polygonal domain (e.g. hexagon, octagon) behaves analogously to the quad or triangle domain but more initial triangle patches are formed in the pre-processing block 202 and it requires a larger domain vertex stack 702 and UV primitive queue 708 (where required).

Figure 12:
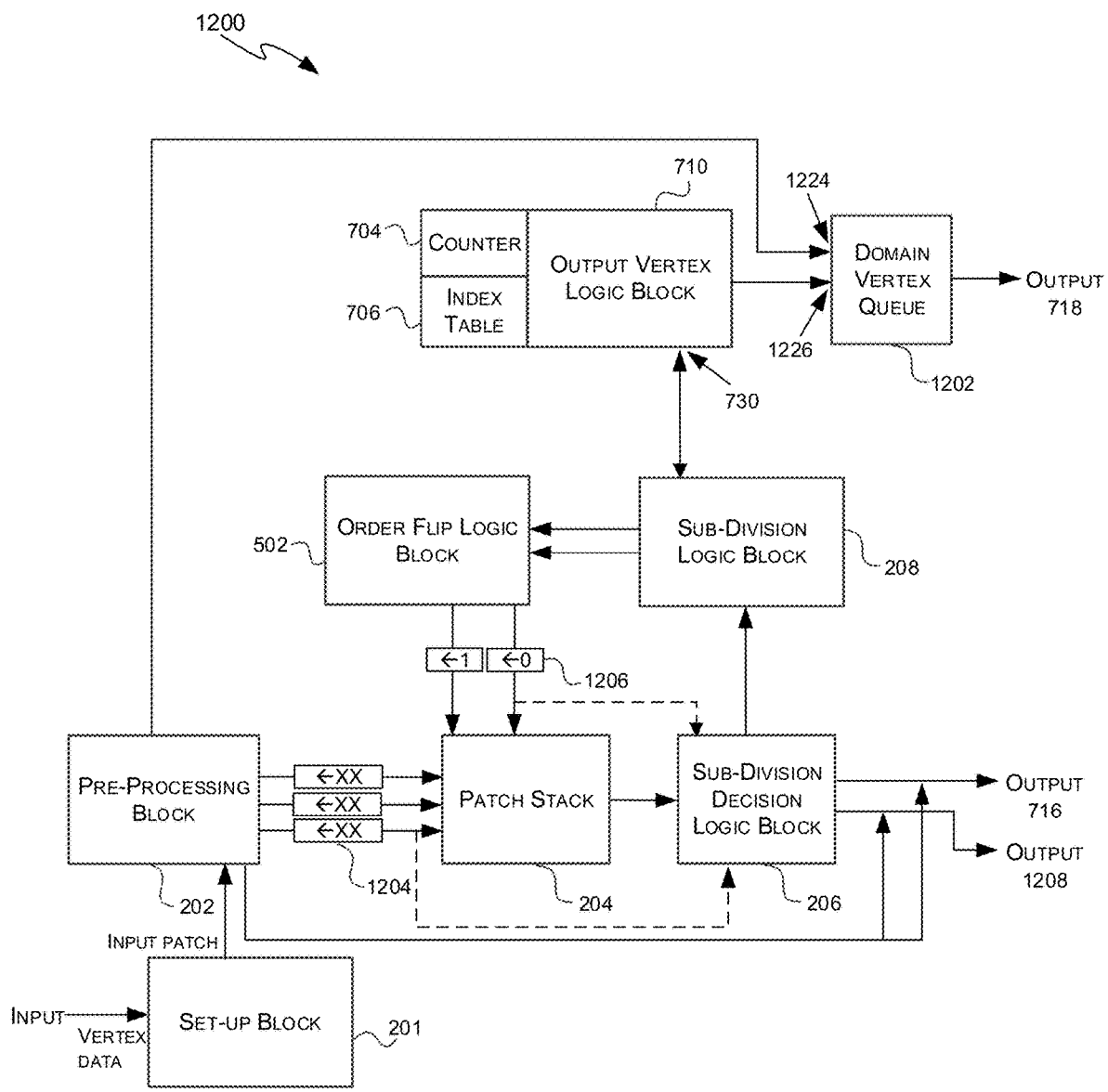
FIG. 12 is a schematic diagram of a fifth example hardware tessellation unit.

FIG. 12 is a schematic diagram of a fifth example hardware tessellation unit 1200. Such a hardware tessellation unit 1200, unlike the examples described above, does generate primitive IDs and so is suitable for use in the GPU pipeline 101 shown in FIG. 1B; however, it may also be used as the tessellation unit 104 in the GPU pipeline 100 shown in FIG. 1A. After output these primitive IDs relate to primitives, but within the tessellation unit 1200 they relate to patches (i.e. initial patches or sub-patches) that may, or may not, ultimately be output as primitives; however, they are still referred to herein as primitive IDs.

It can be seen by comparing this fifth example hardware tessellation unit 1200 shown in FIG. 12 to the earlier examples, that there are many common elements. The output vertex logic block 710 is substantially as described above with reference to FIGS. 7-9 (although the vertex data is received directly from the sub-division logic block 208 (via input 730) and there is no domain vertex stack. The order flip logic block 502 is substantially as described above with reference to FIGS. 5-6. The set-up block 201, pre-processing logic block 202, patch stack 204, sub-division decision logic block 206 and sub-division logic block 208 are substantially as described above with reference to FIGS. 2-4 and 10.

In addition, the fifth example hardware tessellation unit 1200 comprises a plurality of additional logic blocks 1204-1206 that generate the primitive IDs and may also comprise a new, optional, data structure, the domain vertex queue 1202 (alternatively buffering of the geometry may be performed further down the pipeline and not as part of the tessellator). The fifth example hardware tessellation unit 1200 also comprises a third output 1208. The first output 718 is configured to output vertex data to the domain shader (with optional blender), the second output 716 is configured to output primitive data in the form of three primitive IDs to the rasterizer and the third output 1208 is configured to output the primitive ID and optionally the DFs of each vertex in the primitive to a primitive ID buffer.

Unlike the patch stack 204 and the domain vertex stack 702, the optional domain vertex queue 1202 operates a FIFO scheme and buffers vertices output by the tessellator for later stages of the pipeline. The domain vertex queue 1202, where provided, comprises two inputs: a first input 1224 configured to receive the vertex data for the original vertices of the initial patches from the pre-processing block 202 and a second input 1226 configured to receive output vertex data for each newly formed middle vertex from the sub-division logic block 208 (although as shown in FIG. 12, the output vertex data may not be received directly from the sub-division logic block 208). The domain vertex queue 1202 additionally comprises storage elements for storing the vertex data according to the FIFO scheme and an output 718 configured to output the least recently received vertex data from the tessellator. Vertex data for a single vertex may then be emitted from the domain vertex queue 1202 at regular intervals, e.g. once per cycle.

Figure 13A:
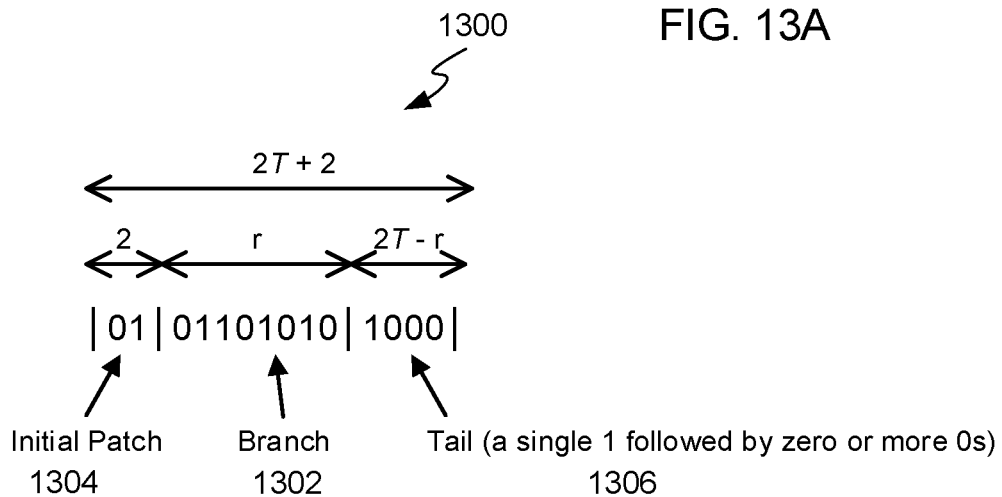
FIGS. 13A and 13B show schematic diagrams of two example primitive IDs.
Figure 13B:
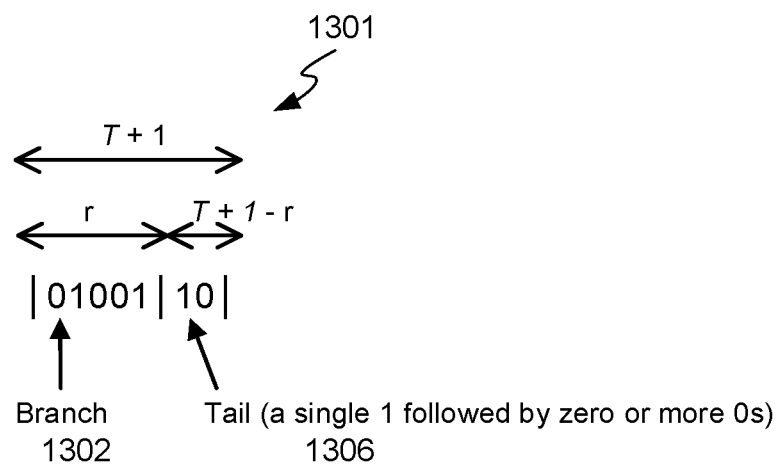

The plurality of additional logic blocks 1204-1206 in the hardware tessellator 1200 generate the primitive IDs. The structure of these primitive IDs can be described with reference to FIGS. 13A and 13B. FIGS. 13A and 13B show schematic diagrams of two example primitive IDs 1300, 1301 which are generated using the methods described herein. As shown in FIGS. 13A and 13B, the primitive ID 1300, 1301 comprises a sequence of r bits 1302 that specifies the recursive sequence taken during the tessellation process (as the patches are sub-divided by the sub-division logic block 208 and re-ordered by the order flip logic block 502). Bits in the sequence are added by the additional logic blocks 1206, which may be referred to as ID sequence generation logic blocks, and each bit in the sequence 1302 indicates whether, following any sub-division (in the sub-division logic block 208), the sub-patch from which the primitive was formed was either pushed onto the patch stack 204 (by the order flip logic block 502) first (e.g. as indicated by a 0) or second (e.g. as indicated by a 1). As the order in which sub-patches are pushed onto the patch stack 204 controls the order in which they are tessellated, each bit therefore indicates whether the sub-patch from which the primitive was formed was either tessellated first or second and this may also be described in terms of a branching algorithm, with the sequence of bits 1302 indicating whether the first branch was taken (i.e. the patch was selected first for tessellation because it was added to the patch stack 204 second) or the second branch was taken (i.e. the patch was tessellated second because it was added to the patch stack 204 first).

In addition to the sequence of r bits 1302 that specifies the recursive sequence taken during the tessellation process, the primitive ID 1300, 1301 may comprise one or more additional bits or bit sequences. Whilst the first example 1300 shown in FIG. 13A comprises both a header portion 1304 and a tail portion 1306, in other examples, the primitive ID may comprise only one or neither of the header portion 1304 and the tail portion 1306 and/or may comprise other portions. The header portion 1304 is added to the primitive ID by the additional hardware logic blocks 1204, which may be referred to as the ID header generation logic blocks, after the initial patches are output by the pre-processing block 202. In examples where pre-processing is not required (e.g. for isoline input patches), the header may be omitted, as in the second example 1301 in FIG. 13B. In the example shown in FIG. 13A and FIG. 12, the header portion 1304 comprises two bits that indicate which of those initial sub-patches (formed from the input patch) the primitive is in. In other examples, the header portion 1304 may comprise a single bit or more than two bits.

In various examples, the primitive ID may comprise a tail portion 1306 that is used to provide fixed length primitive IDs 1300, 1301. Without such a tail portion 1306, the length of the primitive ID 1300, 1301 will depend on the length of the recursive sequence (i.e. the value of r) and this may result in ambiguities if the IDs are concatenated (e.g. because the codes are not prefix-free, where the term 'prefix-free' refers to the fact that there are pairs of codes c, d, where c is a prefix of d and hence a parser cannot determine whether they have reached the end of code c or are in the middle of code d). By including a variable length tail portion 1306, the length of the primitive ID is fixed, irrespective of the value of r, and the tail portion may comprise a predefined bit sequence (e.g. a single 1 followed by zero or more 0, as in the examples in FIGS. 13A and 13B) that enables the tail portion 1306 to be identified and distinguished from the sequence of bits 1302 that specify the recursive sequence taken.

When sub-dividing a patch, the sub-division logic block 208 generates an initial ID for each of the newly formed sub-patches. These initial IDs match the ID of the parent patch, i.e. the patch that was sub-divided to form the sub-patches. These initial IDs are then updated to generate the final output primitive IDs for each patch by the additional logic blocks 1206.

As shown in FIG. 12, the ID header generation logic blocks 1204 comprise an input arranged to receive patch data for the initial patches from the pre-processing block 202, hardware logic arranged to generate at least the header portion of the ID for each initial patch (and in various examples, to generate the entire ID for the initial patch where this comprises a header portion 1304 and optionally a tail portion 1306) and an output arranged to output the initial patch data (including the initial patch ID) to the patch stack 204. The ID sequence generation logic blocks 1206 comprise an input arranged to receive sub-patch data from the order flip logic block 502, hardware logic arranged to append a bit onto the ID of the sub-patch and an output arranged to output the sub-patch data (included the updated ID) to the patch stack 204.

Where the hardware tessellator 1200 shown in FIG. 12 is used, finding where/whether a primitive with a certain ID is present can be performed efficiently. Furthermore, the differences between adjacent IDs will be small (as a consequence of the improved ordering of primitives) and this may be used to compress blocks of IDs in memory.

In addition to the generation of primitive IDs as described above in the additional logic blocks 1204-1206, in the special case where there is no subdivision performed at all and only a single primitive is output (which corresponds to the input patch), an unused primitive ID (e.g. such as 000 . . . 0, 010 . . . 0, 100 . . . 0 and anything beginning with 11) may be assigned to the primitive by the pre-processing block 202 and this may be passed directly to the output.

Whilst the additional logic blocks 1204-1206 are only shown and described with reference to FIG. 12, it will be appreciated that they may be included in any of the other examples described herein (e.g. added to the hardware tessellator 700 shown in FIG. 7). Similarly, further examples may be provided which combine different aspects of any of the examples described herein, e.g. any of the additional logic blocks shown as additions in any of FIGS. 5, 7, 10 and 12 may be added to the hardware tessellator 200 shown in FIG. 2 without necessarily adding the additional logic blocks from any others of the examples described herein. An example of such a further combination is shown in FIG. 24 which shows a further example hardware tessellator 2400.

Whilst the domain vertex queue 1202 is only shown and described with reference to FIG. 12, it will be appreciated that it may be included in any of the other examples described herein with indexed geometry (i.e. vertex indexing, e.g. the hardware tessellation units 700, 1000 shown in FIGS. 7 and 10).

Figure 24:
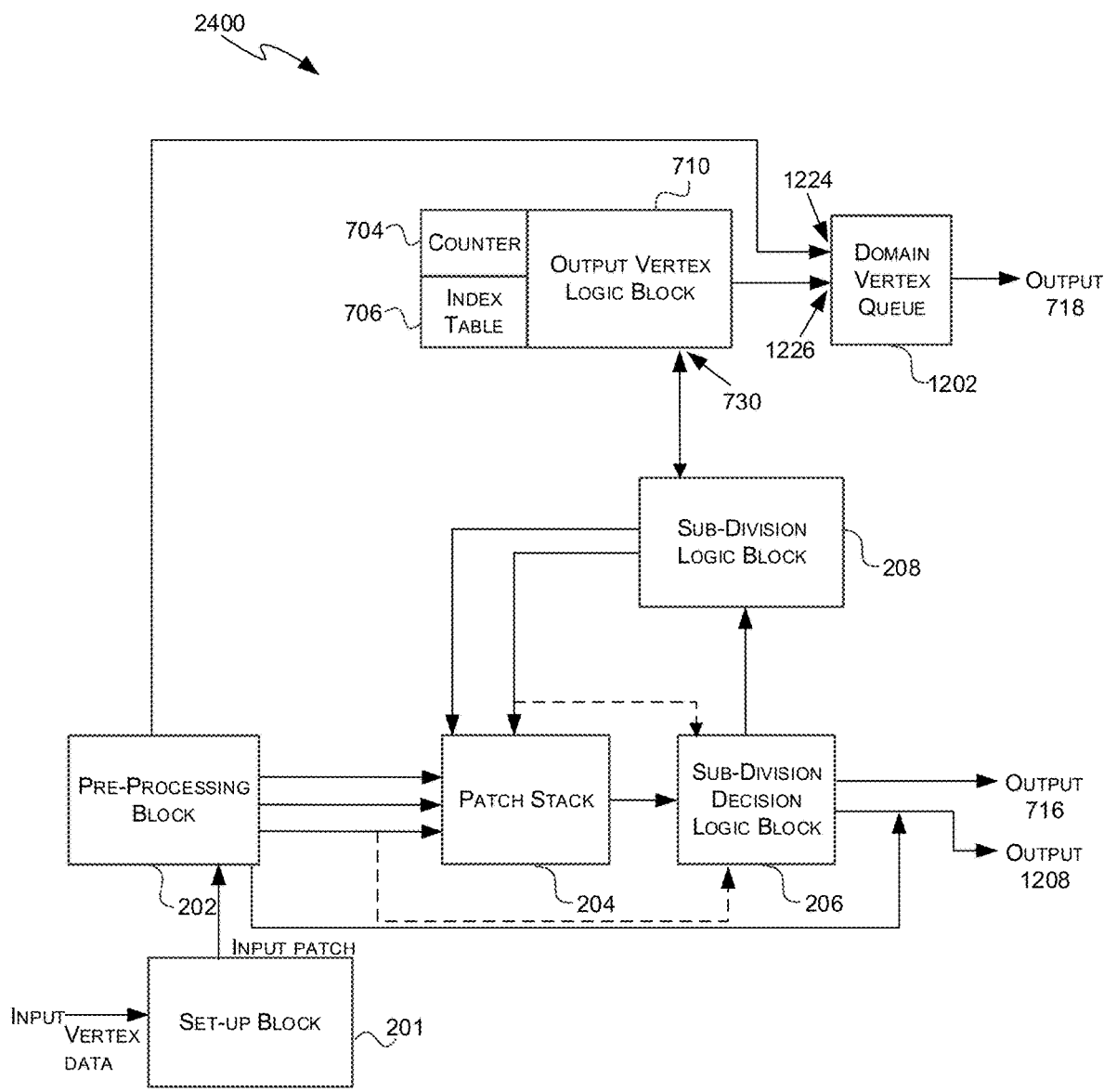
FIG. 24 is a schematic diagram of a twelfth example hardware tessellation unit.

The hardware tessellator 2400 shown in FIG. 24 provides vertex indexing without changing the vertex ordering or outputting IDs and hence is a variant on the hardware tessellator 1200 shown in FIG. 12 without an order flip logic block 502 or additional hardware elements 1204-1206.

FIGS. 14-19 show variations on the hardware tessellator 1200 shown in FIG. 12. In the examples shown in FIGS. 14, 16 and 18 the set-up block and pre-processing blocks 201, 202 are not shown as a single logic blocks but is instead shown as its separate elements (e.g. as shown in FIG. 3 and described above).

Figure 14:
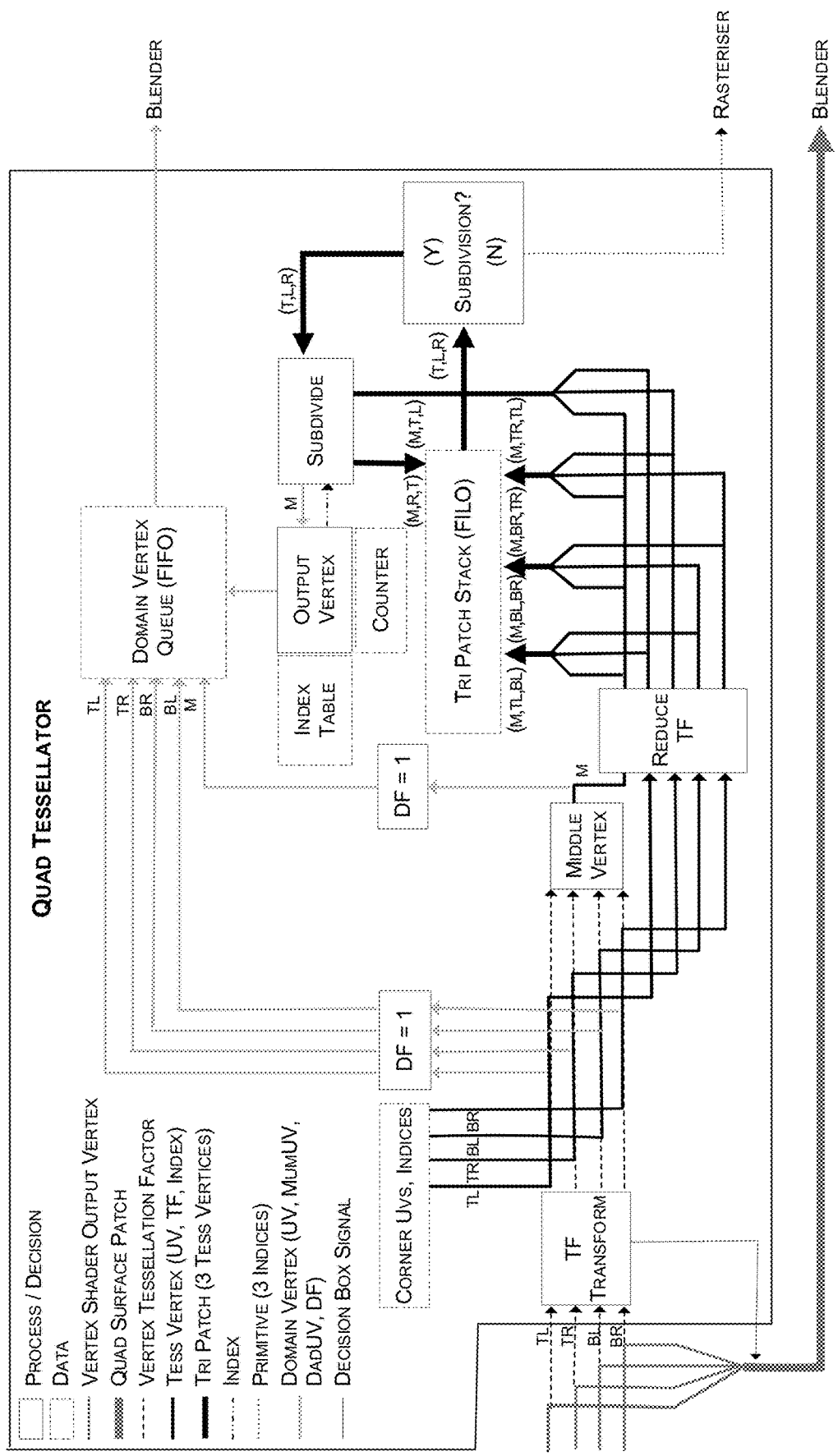
FIG. 14 is a schematic diagram of a sixth example hardware tessellation unit.
Figure 15A:
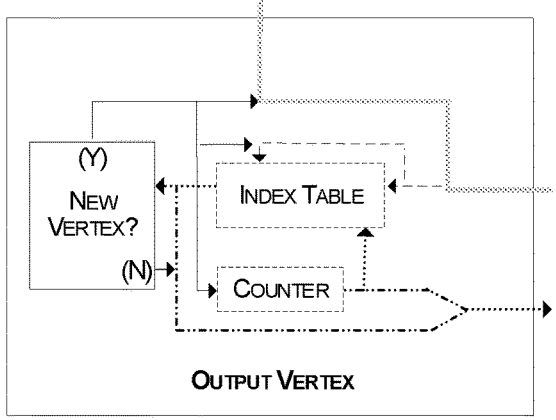
FIGS. 15A-15G are schematic diagrams showing example implementations of elements in FIG. 14.
Figure 15B:
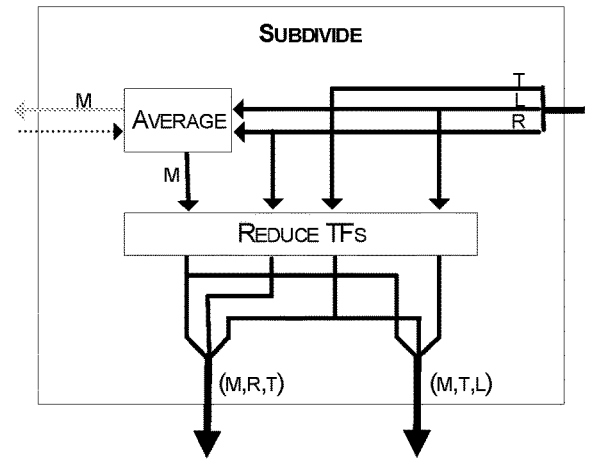
Figure 15C:
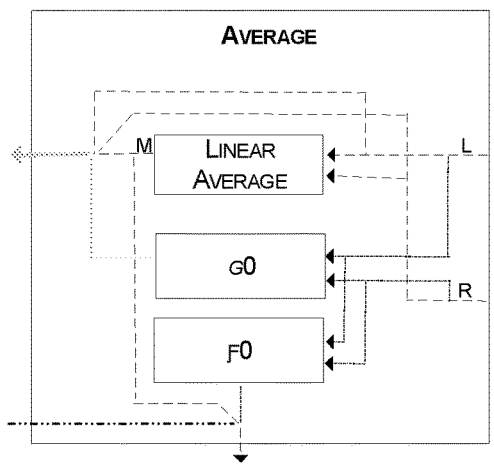
Figure 15D:
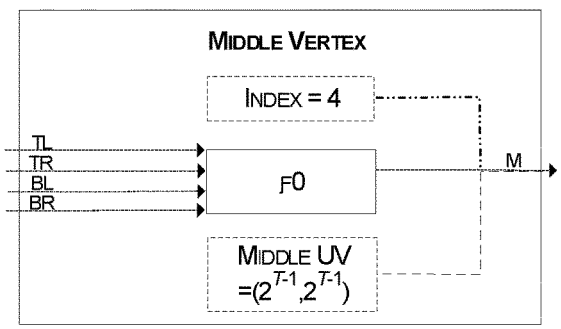
Figure 15E:
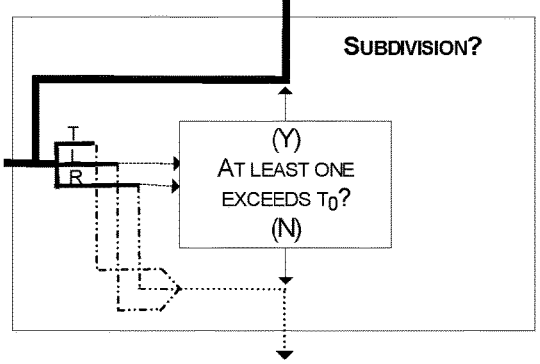
Figure 15F:
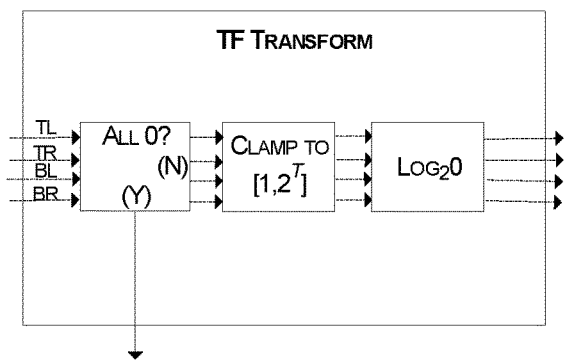
Figure 15G:
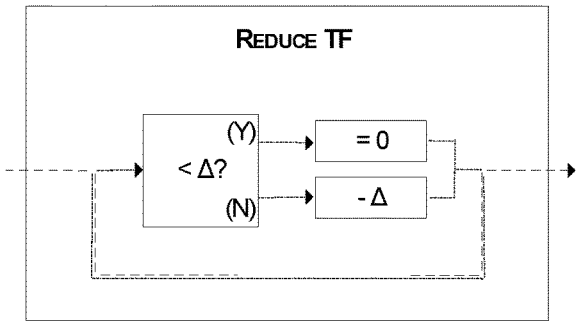

The hardware tessellator 1400 shown in FIG. 14 is specific to the quad domain and FIGS. 15A-15G show elements from the hardware tessellator 1400 in more detail. The tables below list the processes/decision logic blocks shown in FIG. 14 along with the inputs and outputs to the particular blocks in the diagram.

| Process/Decision | Input | # Inputs | Output | # Outputs | Max # Calls Per Domain | Max # Calls, T = 6 |
|---|---|---|---|---|---|---|
| TF Transform | Tessellation Factor | 1 | Tessellation Factor | 1 | 4 | 4 |
| DF = 1 | Domain Vertex | 1 | Domain Vertex | 1 | 5 | 5 |
| Middle Vertex | Tessellation Factor | 4 | Tess Vertex | 1 | 1 | 1 |
| Reduce TF | Tess Vertex | 1 | Tess Vertex | 1 | 5 | 5 |
| Subdivision? | Tri Patch | 1 | Tri Patch xor Primitive | 1 | $4(2^{2T} - 1)$ | 16,380 |
| Subdivide | Tri Patch and Index | 1/1 | Tri Patch and Domain Vertex | 2/1 | $4(2^{2T-1} - 1)$ | 8,188 |
| Output Vertex | Domain Vertex | 1 | Domain Vertex and Index | 1/1 | $4(2^{2T-1} - 1)$ | 8,188 |

| Cache | Cache Type | Entry Type | Max Entries | Max Size bits, T = 6 |
|---|---|---|---|---|
| Domain vertex queue | FIFO | Domain Vertex | 6 | 252 + 6b |
| Tri Patch Stack | FILO | Tri Patch | 2T + 2 | 1260 + 42b |
| Index Table | Table | Index | $(2^T + 1)^2$ | 54,925 |
| Counter | Counter | Index | 1 | 13 |
| Corner UVs, Indices | Static | UV + Index | 4 | 108 |

| Max Domain Vertices | Max Primitives |
|---|---|
| $(2^T + 1)^2$ | $2^{2T} + 1$ |

Figure 16:
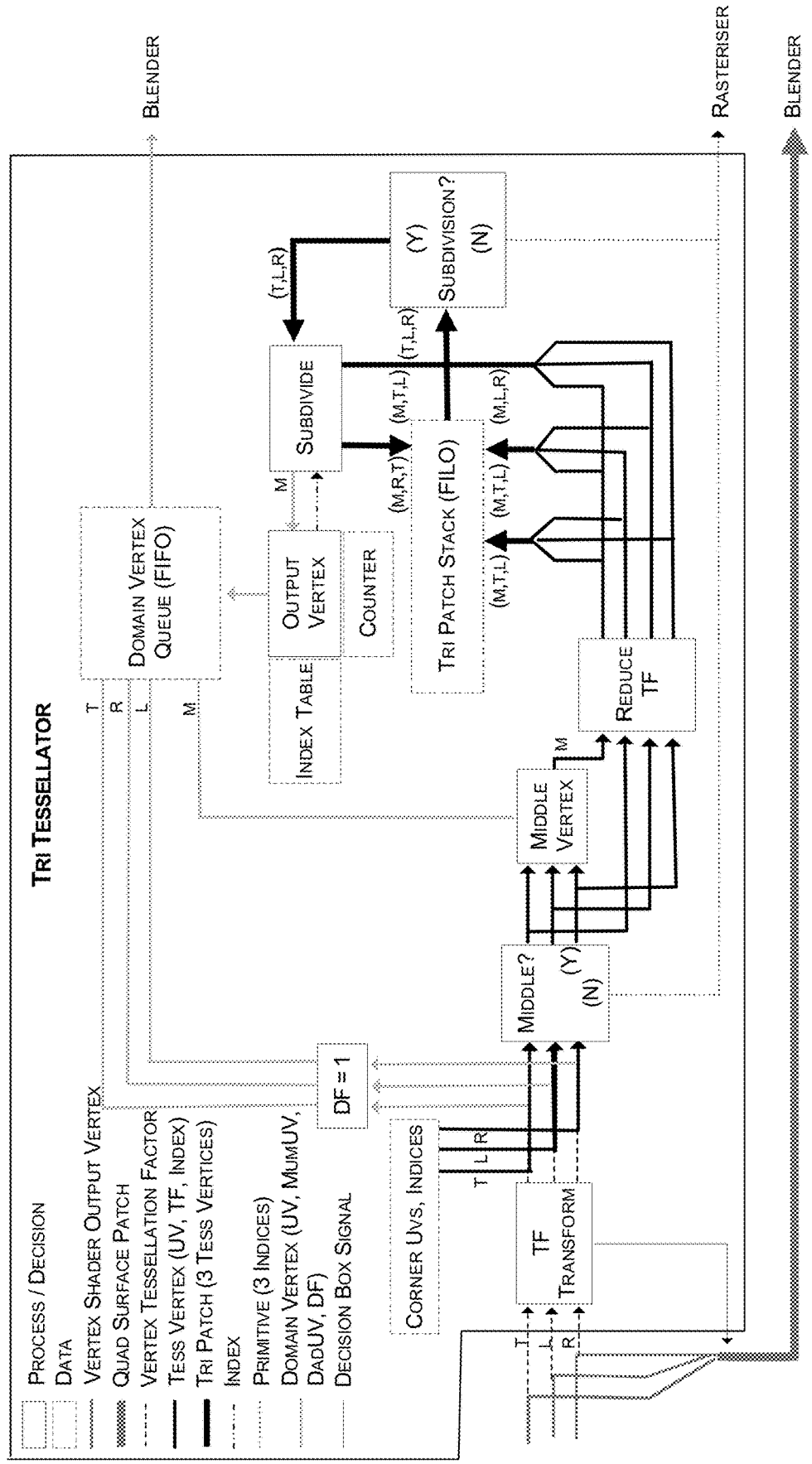
FIG. 16 is a schematic diagram of a seventh example hardware tessellation unit.
Figure 17A:
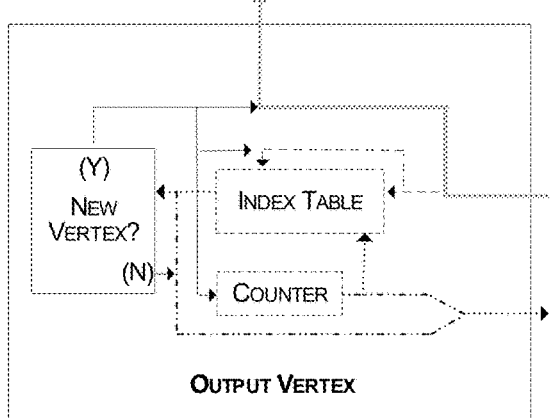
FIGS. 17A-17H are schematic diagrams showing example implementations of elements in FIG. 16.
Figure 17B:
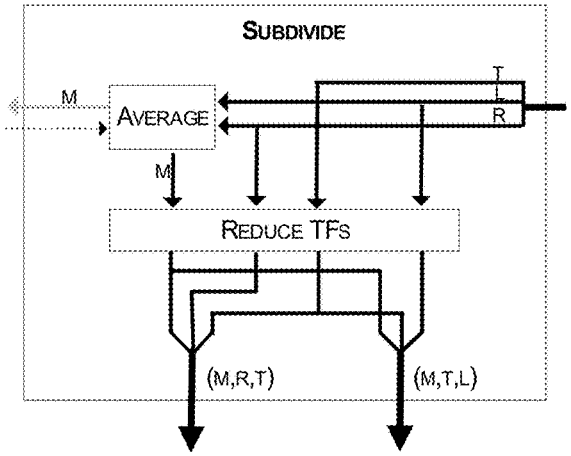
Figure 17C:
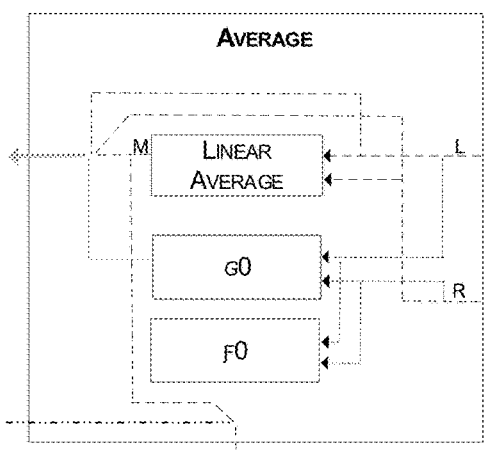
Figure 17D:
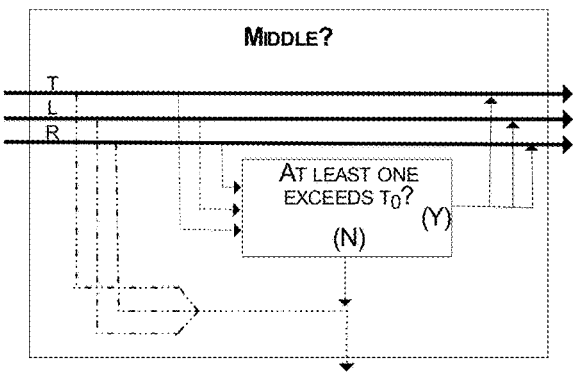
Figure 17E:
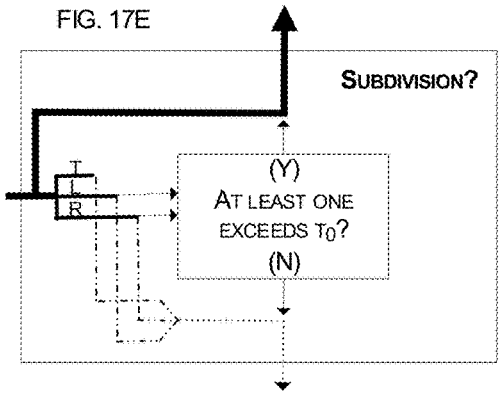
Figure 17F:
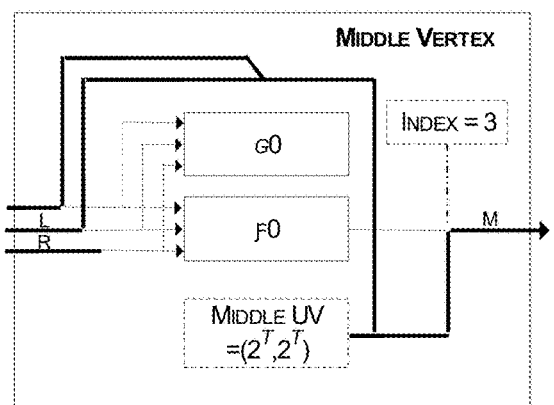
Figure 17G:
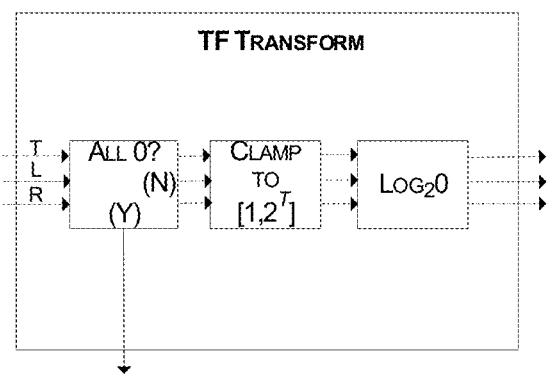
Figure 17H:
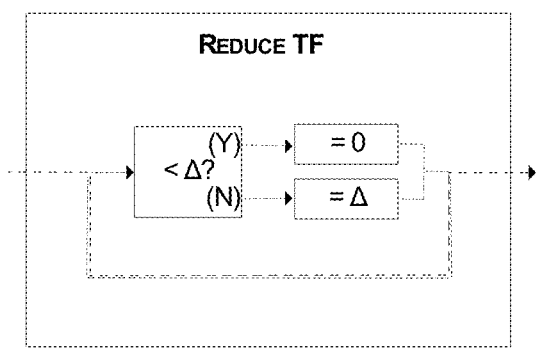

The hardware tessellator 1600 shown in FIG. 16 is specific to the triangle domain and FIGS. 17A-17H show elements from the hardware tessellator 1600 in more detail. The tables below list the processes/decision logic blocks shown in FIG. 16 along with the inputs and outputs to the particular blocks in the diagram.

| Process/Decision | Input | # Inputs | Output | # Outputs | Max # Calls Per Domain | Max # Calls, T = 6 |
|---|---|---|---|---|---|---|
| TF Transform | Tessellation Factor | 1 | Tessellation Factor | 1 | 3 | 3 |
| DF = 1 | Domain Vertex | 1 | Domain Vertex | 1 | 4 | 4 |
| Middle? | Tess Vertex | 3 | Tess Vertex xor Primitive | 3/1 | 1 | 1 |
| Middle Vertex | Tess Vertex | 3 | Tess Vertex and Domain Vertex | 1/1 | 1 | 1 |
| Reduce TF | Tess Vertex | 1 | Tess Vertex | 1 | 4 | 4 |
| Subdivision? | Tri Patch | 1 | Tri Patch xor Primitive | 1/1 | $3(2^{2T} - 1)$ | 12,285 |

-continued

| Process/Decision | Input | # Inputs | Output | # Outputs | Max # Calls Per Domain | Max # Calls, T = 6 |
|---|---|---|---|---|---|---|
| Subdivide | Tri Patch and Index | 1/1 | Tri Patch and Domain Vertex | 2/1 | $3(2^{2T-1} - 1)$ | 6,141 |
| Output Vertex | Domain Vertex | 1 | Domain Vertex and Index | 1/1 | $3(2^{2T-1} - 1)$ | 6,141 |

| Cache | Cache Type | Entry Type | Max Entries | Max Size bits, T = 6 |
|---|---|---|---|---|
| Domain vertex queue | FIFO | Domain Vertex | 5 | 252 + 5b |
| Tri Patch Stack | FILO | Tri Patch | 2T + 1 | 1,248 + 39b |
| Index Table | Table | Index | $(3 \cdot 2^T + 1)^2$ | 484,237 |
| Counter | Counter | Index | 1 | 13 |
| Corner UVs, Indices | Static | UV + Index | 3 | 87 |

| Max Domain Vertices | Max Primitives |
|---|---|
| $3(2^{2T-2} + 2^{T-1}) + 1$ | $3 \cdot 2^{2T-1}$ |

Figure 18:
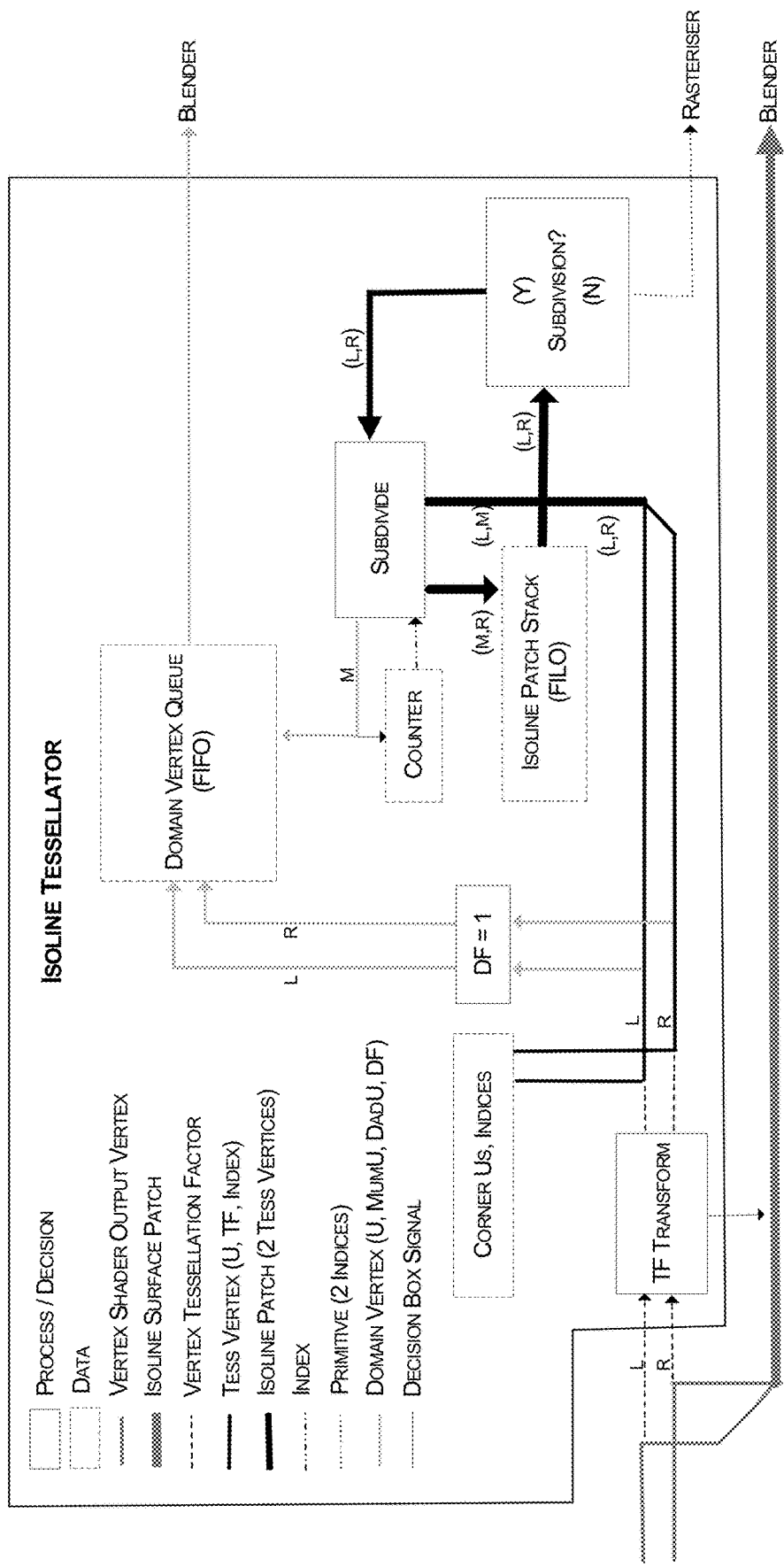
FIG. 18 is a schematic diagram of an eighth example hardware tessellation unit.

The hardware tessellator 1800 shown in FIG. 18 is specific to the isoline domain and FIGS. 19A-19E show elements from the hardware tessellator 1800 in more detail. The tables below list the processes/decision logic blocks shown in FIG. 18 along with the inputs and outputs to the particular blocks in the diagram.

| Process/Decision | Input | # Inputs | Output | # Outputs | Max # Calls Per Domain | Max # Calls, T = 6 |
|---|---|---|---|---|---|---|
| TF Transform | Tessellation Factor | 1 | Tessellation Factor | 1 | 2 | 2 |
| DF = 1 | Domain Vertex | 1 | Domain Vertex | 1 | 2 | 24 |
| Subdivision? | Isoline Patch | 1 | Isoline Patch xor Primitive | 1 | $2^{T+1} - 1$ | 127 |
| Subdivide | Tri Patch and Index | 1/1 | Isoline Patch and Domain Vertex | 2/1 | $2^T - 1$ | 63 |

| Cache | Cache Type | Entry Type | Max Entries | Max Size bits, T = 6 |
|---|---|---|---|---|
| Domain vertex queue | FIFO | Domain Vertex | 3 | 66 + 3b |
| Isoline Patch Stack | FILO | Isoline Patch | T | 204 + 12b |
| Counter | Counter | Index | 1 | 7 |
| Corner UVs, Indices | Static | U + Index | 2 | 28 |

| Max Domain Vertices | Max Primitives |
|---|---|
| $2^T + 1$ | $2^T$ |

The primitive IDs described above and generated by a tessellator such as those shown in FIGS. 12, 14, 16 and 18 may also be used to provide vertex IDs (e.g. for the vertices output via output 718). In the subdivision logic block 208, every subdivided initial patch, e.g. (T,L,R), creates a new vertex M (e.g. as shown in FIG. 4C). The ID of the patch given by (T,L,R) is assigned to the vertex M. The patch given by (T,L,R) is not considered a primitive because it is further sub-divided and hence not output by the tessellator; however, it will have an ID, referred to herein as a primitive ID. As the primitive ID encodes the sequence of branching to reach the patch, it also encodes the sequence of branching to reach the vertex M. As subdivision does not occur on the smallest primitives, every vertex ID will end in a 0 (when using a tail portion), so in various examples it may be removed to make a single bit saving (i.e. 2T+1 bits for the Quad/Tri domains and T bits for the Isoline domain).

These vertex IDs may, for example, be used to regenerate a single vertex at random in a similar way to using a primitive ID to generate the vertex data for the primitive, e.g. by inputting the vertex ID to the tessellation unit (e.g. to the Single Primitives Tessellator 114) and following the same sequence of branches through the tessellator as was originally followed when the vertex was generated; however, the method for generating a primitive from its primitive ID is modified by making one final sub-division of the generated primitive between its left and right vertices (to generate the vertex M) and this is the desired vertex.

It can be seen from FIG. 12 that the vertices from the initial patches bypass all the additional logic blocks 1204-1206 in the hardware tessellator 1200 that generate the primitive IDs (as shown in FIG. 12, they are output from the pre-processing block 202 and input to the domain vertex queue 1202 via input 1224). Furthermore as vertices are allocated the ID of the primitive which, when sub-divided, results in the generation of the vertex, the operation of the hardware, as described above, does not result in generation of vertex IDs for the initial corner and middle vertices which form the initial patches. Where vertex IDs are generated by the hardware tessellator, dedicated vertex IDs may be allocated to each of these vertices from the initial patches and these may be allocated by the pre-processing block 202 or by an additional logic block (not shown in FIG. 12) between the pre-processing block 202 and the domain vertex queue 1202.

For example, as IDs 000 . . . 0, 010 . . . 0,100 . . . 0,110 . . . 0 are unused for the 2D domains and 000 . . . 0 is unused for the Isoline Domain, these may be assigned to the corner vertices in a clockwise fashion (e.g. to UV coordinates (0,0), (1,0), (1,1) and (0,1)) and the leftmost vertex, respectively. This leaves the middle vertex for the 2D Domains and the right vertex in the Isoline Domain. For the Quad and Isoline Domains an extra bit is required to allocate a new ID. In various examples, the ID given by a single 1 followed by (2T+1 or 7) 0s, denoted by 1000 . . . 0 and 10 . . . 0 respectively, may be used. For the Triangle Domain the ID 110 . . . 0 may be used for the middle vertex. These IDs make these extraordinary vertices last when ordered by their IDs lexicographically.

Figure 20:
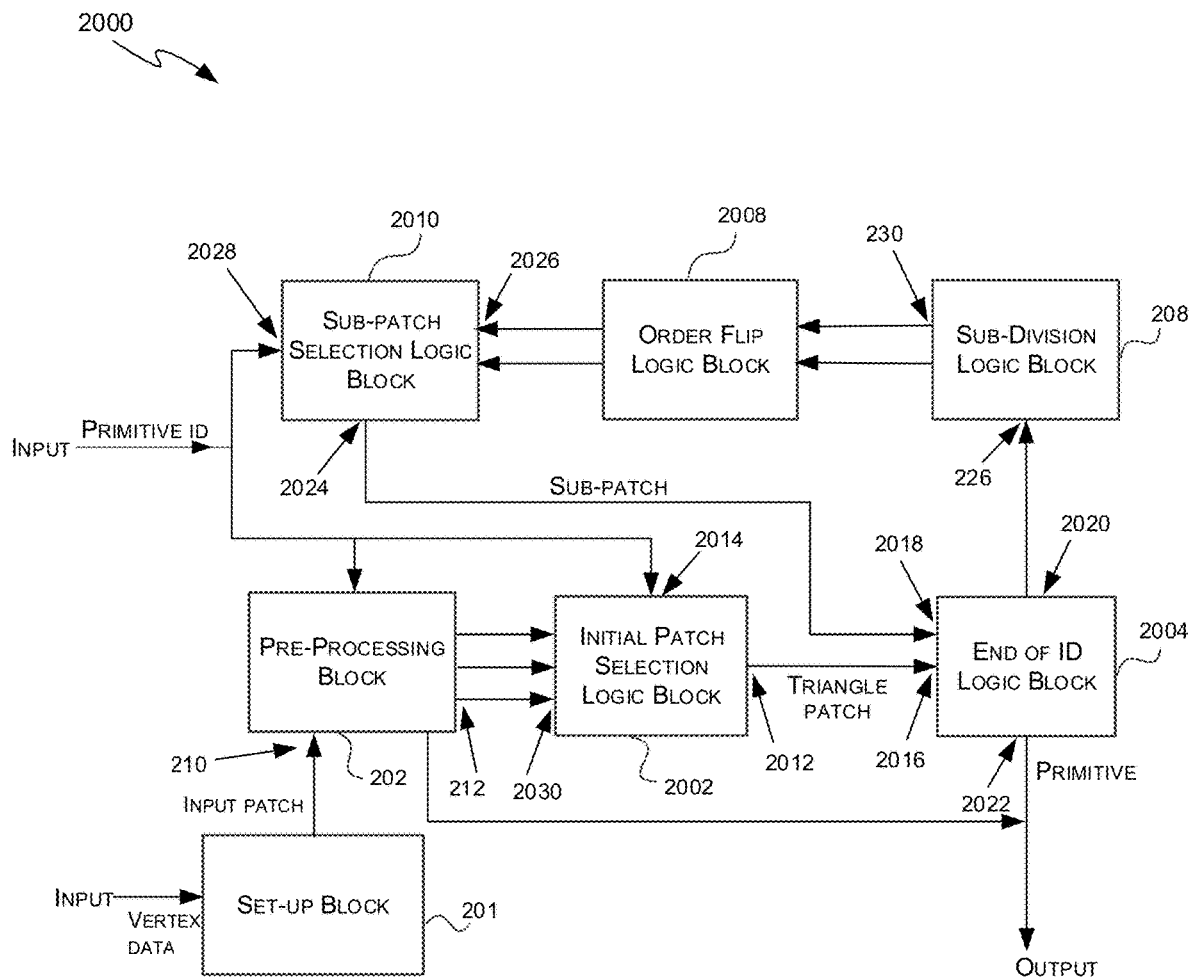
FIG. 20 is a schematic diagram of a ninth example hardware tessellation unit.

FIG. 20 is a schematic diagram of a first example single primitives tessellator 2000 that may be used in the GPU pipeline 101 shown in FIG. 1B. As described above, a single primitives tessellator is configured to generate vertex data for a primitive (i.e. for each vertex in the primitive) from an input primitive ID (e.g. as generated by a tessellator such as those shown in FIGS. 12, 14, 16 and 18).

As shown in FIG. 20, the single primitives tessellator 2000 comprises a set-up block 201, pre-processing block 202, an initial patch selection logic block 2002, an end of ID logic block 2004, a sub-division logic block 208, an order flip logic block 2008 and a sub-patch selection logic block 2010. The pre-processing block 202 and the sub-division logic block 208 both perform sub-division of patches and these blocks operate substantially as described above with reference to the example hardware tessellation units (e.g. as shown in any of FIGS. 2, 3, 5, 7, 10, 12, 14, 16 and 18). However, the pre-processing block 202 is further arranged to identify those special cases where no subdivision is performed and hence the primitive ID has a predefined value (e.g. one of the unused primitive IDs, as described above). In the event that such a primitive ID is identified by the pre-processing block 202 in FIG. 20, the input patch is output as a primitive.

As described above, the sub-division logic block 208 receives three vertices (via input 226) that define a patch (e.g. vertices T, L, R as shown in FIG. 4C), generates a fourth vertex (e.g. the new vertex M, as shown in FIG. 4C) and then outputs (via output 230) the four vertices (e.g. vertices T, L, R, M as shown in FIG. 4C).

As shown in FIG. 20, the output of the pre-processing block 202 (which comprises the initial patches, e.g. tessellator vertices for the vertices in the initial patches) is received by the initial patch selection logic block 2002. The end of ID logic block 2004 receives the output from the initial patch selection logic block 2002. The sub-division logic block 208 receives the output from the end of ID logic block 2004. The order flip logic block 2008 receives the output from the sub-division logic block 208. The sub-patch selection logic block 2010 receives the output from the order flip logic block 2008 and outputs sub-patch data to the end of ID logic block 2004, thereby completing an iterative loop by which the sub-division is performed (blocks 2004, 208, 2008 and 2010 in that order).

Unlike the hardware tessellation units described earlier, the single primitives tessellator 2000 does not comprise a patch stack 204 but instead comprises an initial patch selection logic block 2002 and a sub-patch selection logic block 2010. This is because to generate a single primitive only one of the initial patches (generated by the pre-processing block 202) is required and the other initial patches can be discarded. Similarly, after sub-division by the sub-division logic block 208, only one of the sub-patches is required and the other one can be discarded.

The initial patch selection logic block 2002 comprises hardware logic arranged to determine which of the plurality of initial patches to retain and output (via output 2012) to the end of ID logic block 2004. The initial patch selection logic block 2002 receives (via input 2030) three vertices for each of the initial patches (e.g. 4 or 5 distinct vertices depending upon whether patch input to the pre-processing block 202 is a triangle or a quad patch respectively) and the hardware logic within the initial patch selection logic block 2002 is arranged to select three of the received vertices based on one or more bits the primitive ID (as received via input 2014). If the primitive ID has the format as shown in FIG. 13A, the patch (and hence vertex) selection is made by the initial patch selection logic block 2002 based on the bits in the header portion 1304. The initial patch selection logic block 2002 may additionally comprise hardware logic arranged to remove those bits from the primitive ID that were used to make the initial patch selection and in such examples the truncated primitive ID is output with the initial patch data (via output 2012) to the end of ID logic block 2004.

Referring back to the example shown in FIG. 13A, if the input primitive ID is 01011010101000, the truncated primitive ID output by the initial patch selection logic block 2002 is 011010101000, since the header portion 1304 '01' has been removed.

The sub-patch selection logic block 2010 comprises hardware logic arranged to determine which of the two sub-patches formed by sub-division to retain and output (via output 2024) to the end of ID logic block 2004. The sub-patch selection logic block 2010 receives (via input 2026) four vertices (e.g. vertices T, L, R, M as shown in FIG. 4C) which together define the two sub-patches and the hardware logic within the sub-patch selection logic block 2010 is arranged to select three of the four received vertices based on one or more bits from the primitive ID and in various examples the selection is made based on a single bit from the primitive ID. The primitive ID may be received in truncated form with the sub-patch data (via input 2026) or may be received in its full form (via input 2028).

In various examples, the selection is made based on the value of a bit in the branching sequence 1302 that corresponds to the particular iteration, e.g. the first bit in the branching sequence 1302 for the first selection operation, the second bit for the second selection operation, etc. Referring to the example shown in FIG. 13A, where the primitive ID is 01011010101000, the first selection that is made when generating a single primitive is made based on the value of the first bit in the branching sequence, e.g. 01011010101000 (where the particular bit is shown underlined), and the second selection is made based on the value of the second bit in the branching sequence, e.g. 01011010101000, and the third selection is made based on the value of the third bit in the branching sequence, e.g. 01011010101000 etc. The loop will iterate until there are no further bits in the branching sequence 1302 and at that point, the end of ID logic block 2004 will exit from the loop, as described below.

In examples where the primitive ID is received by the sub-patch selection logic block 2010 in truncated form, the bit that corresponds to the particular iteration will be the leading bit in the truncated primitive ID and the sub-patch selection logic block 2010 further comprises hardware logic to further truncate the primitive ID by removing this leading bit and output the newly truncated primitive ID with the sub-patch data to the end of ID logic block 2004 (via output 2024). Referring back to the example shown in FIG. 13A, if the input primitive ID is 01011010101000, the truncated primitive ID output by the initial patch selection logic block 2002 is 011010101000, since the header portion 1304 '01' has been removed. The sub-patch selection logic block 2010 selects one of the two sub-patches (received via input 2026) based on the value of the leading bit, i.e. '0' in this example, and then removes this bit and outputs the updated truncated primitive ID 11010101000. In the next iteration, the sub-patch selection logic block 2010 selects one of the two sub-patches (received via input 2026) based on the value of the new leading bit, i.e. '1' in this example, and then removes this bit and outputs the updated truncated primitive ID 1010101000.

Unlike the hardware tessellation units described earlier, the single primitives tessellator 2000 does not comprise a sub-division decision logic block 206 that comprises hardware logic arranged to determine, based on the patch data, whether to sub-divide a patch or not. Instead, the single primitives tessellator 2000 comprises an end of ID logic block 2004 that makes a similar decision (i.e. whether to sub-divide a patch or not) but based on different information, e.g. based on the primitive ID or a truncated version of the primitive ID. The primitive ID is, in the first iteration, received via input 2016 from the initial patch selection logic block 2002 (where this may be the full ID or a truncated version of the ID) and this ID, or a truncated version thereof, may be stored for use in subsequent iterations. Alternatively, the truncated primitive ID may, in subsequent iterations, be received via input 2018 from the sub-patch selection logic block 2010.

In examples where truncation is used, the hardware logic is arranged to determine whether to sub-divide the patch or sub-patch based on whether the truncated primitive ID (which may be received from the sub-patch selection logic block 2010 or stored within the end of ID logic block 2004) comprises any bits from the branching sequence 1302. If there are any remaining bits from the branching sequence 1302, then the patch or sub-patch is output (via output 2020) to the sub-division logic block 208 and if there are no remaining bits from the branching sequence 1302 (e.g. the truncated primitive ID comprises only the tail portion or comprises no bits at all), the patch or sub-patch is output (via output 2022) from the single primitives tessellator 2000 as the output primitive that corresponds to the input primitive ID.

In examples where truncation is used but the truncated primitive ID is stored, instead of being received from the sub-patch selection logic block 2010, the hardware logic in the end of ID logic block 2004 is also arranged to further truncate the primitive ID by removing the leading bit and storing the updated truncated primitive ID for use in subsequent iterations.

Referring back to the example shown in FIG. 13A, if the input primitive ID is 01011010101000, the truncated primitive ID output by the initial patch selection logic block 2002 is 011010101000, since the header portion 1304 '01' has been removed. The end of ID logic block 2004 determines whether sub-division is necessary (i.e. whether the patch is to be output to the sub-division logic block 208 via output 2020) based on whether the leading bit, i.e. '0' in this example, is part of the branching sequence 1302 (which it is in this example). For the next iteration, this bit '0' has been removed so that the truncated primitive ID is 11010101000 and the end of ID logic block 2004 determines whether sub-division is necessary based on whether the new leading bit, i.e. '1' in this example, is part of the branching sequence 1302 (which it is in this example). In the ninth iteration the truncated primitive ID is 1000 and the end of ID logic block 2004 determines whether sub-division is necessary based on whether the new leading bit, i.e. '1' in this example, is part of the branching sequence 1302. This bit is not part of the branching sequence 1302 but is instead part of the tail sequence 1306 and so the patch is output as a primitive (via output 2022).

In examples where truncation is not used, the hardware logic is arranged to determine whether to sub-divide the patch or sub-patch (i.e. whether the patch is to be output to the sub-division logic block 208 via output 2020 or output as a primitive via output 2022) based on whether the bit in the primitive ID that corresponds to that iteration is part of the branching sequence 1302 or not. Referring to the example shown in FIG. 13A, where the primitive ID is 01011010101000, the first decision that is made when generating a single primitive is made based on the first bit after the header portion 1304, e.g. 01011010101000 (where the corresponding bit is shown underlined), and the second decision is made based on the second bit after the header portion 1304, e.g. 01011010101000, and the third decision is made based on the third bit after the header portion 1304, e.g. 01011010101000 etc. In all these decisions, the particular bit is part of the branching sequence 1302; however, when the hardware logic reaches the ninth decision, the relevant bit, i.e. the ninth bit after the header portion 1304, e.g. 01011010101000, the bit is not part of the branching sequence 1302 but is instead part of the tail 1306 and so the patch is output as a primitive (via output 2022).

The order flip logic block 2008 operates in the same way as described earlier (e.g. in the same way as order flip logic block 502 in hardware tessellator 500). If a decision in the all primitives tessellator 112 about which patch to further subdivide is made based on an order of sub-patches, the order used in the single primitives tessellator 2000 must match. Consequently, if the all primitives tessellator 112 comprises an order flip logic block 2008, the single primitives tessellator 114 also comprises this logic block.

Figure 21:
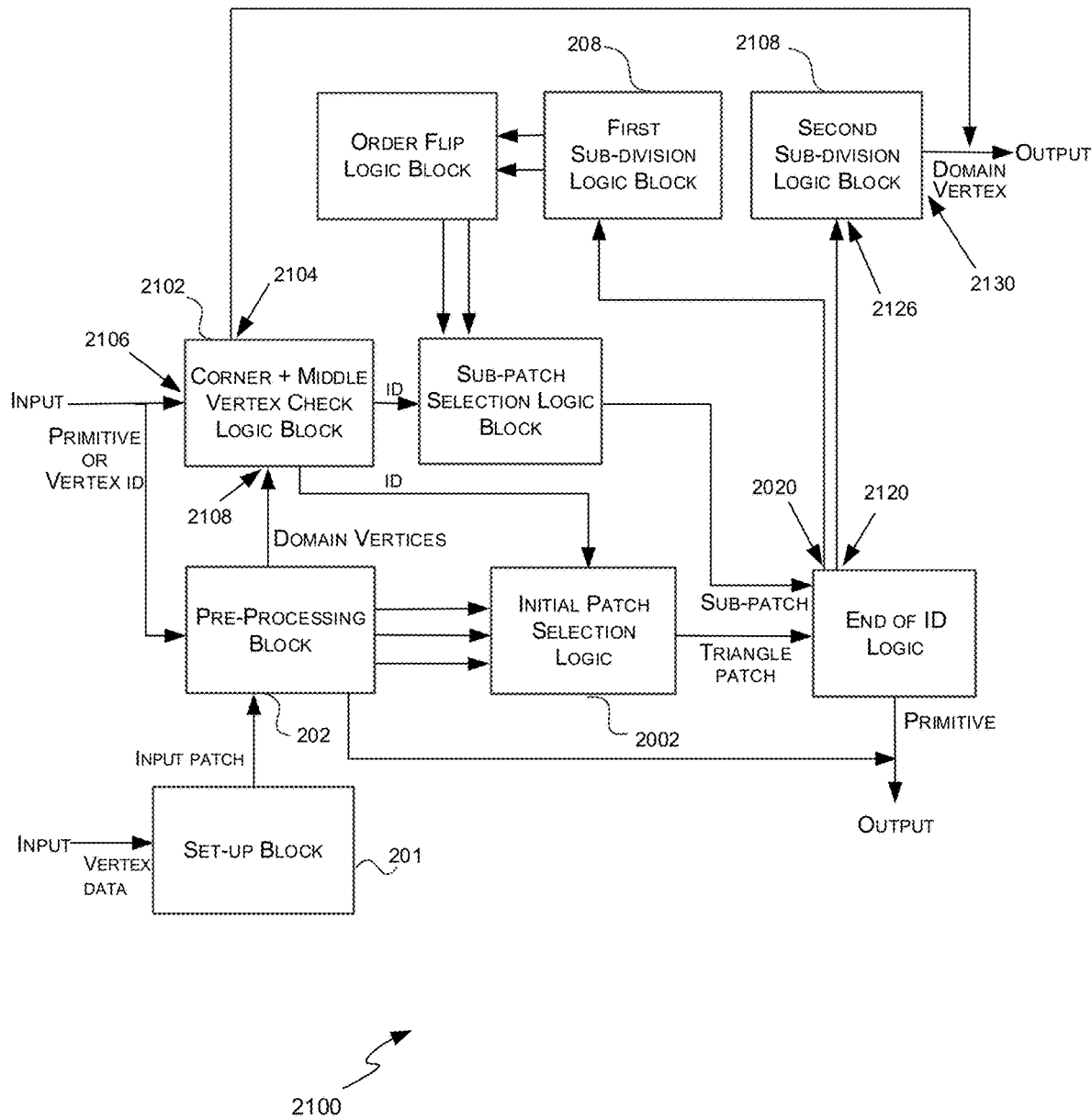
FIG. 21 is a schematic diagram of a tenth example hardware tessellation unit.

FIG. 21 is a schematic diagram of a second example single primitives tessellator 2100 that may be used in the GPU pipeline 101 shown in FIG. 1B. As described above, a single primitives tessellator is configured to generate vertex data for a primitive (i.e. for each vertex in the primitive) from an input primitive ID (e.g. as generated by a tessellator such as those shown in FIGS. 12, 14, 16 and 18). The single primitives tessellator 2100 shown in FIG. 21 is, in addition (or instead) configured to generate vertex data for a single vertex from an input vertex ID (e.g. as generated by a tessellator such as those shown in FIGS. 12, 14, 16 and 18).

As described above, in most cases the ID of a vertex is the ID of the patch that, when sub-divided, resulted in the generation of the vertex. Referring back to FIG. 4C, the ID of the patch comprising vertices T, L, R is also the ID of the vertex M that is formed by the sub-division of the patch comprising vertices T, L, R. As described above, however, special IDs are allocated to those vertices in the initial patches (as these vertices are not formed by sub-division of an initial patch). Consequently whilst the single primitives tessellator 2100 shown in FIG. 21 comprises the same blocks as the single primitives tessellator 2000 shown in FIG. 20, it additionally comprises an additional logic block 2102 that is configured to identify if the input ID, which in this case may be a primitive ID or a vertex ID, is one of these special cases. This logic block 2102 may be referred to as the corner and middle vertex check logic block 2102 and comprises hardware logic arranged to compare the received ID to a known set of IDs corresponding to the vertices of the initial patches and determine if there is a match. In the event of a match, the corner and middle vertex check logic block 2102 is arranged to output the domain vertex (via output 2104). As shown in FIG. 21, the corner and middle vertex check logic block 2102 comprises a first input 2106 for receiving the primitive/vertex ID and a second input 2108 for receiving domain vertices from the pre-processing block 202. In examples where the hardware tessellator 2100 is only being used to produce primitives and not vertices, then the corner and middle vertex check logic block 2102 may be omitted.

Compared to the single primitive tessellator 2000 shown in FIG. 20, the single primitive tessellator 2100 shown in FIG. 21 also comprises a second sub-division logic block 2108. As described above, to generate a vertex from its vertex ID, the method for generating a primitive from its primitive ID is modified by making one final sub-division of the generated primitive between its left and right vertices (to generate the vertex M) and this is the desired vertex. This additional sub-division is performed by the second sub-division logic block 2108 which comprises hardware logic that operates in a very similar way to the first sub-division logic block 208 in FIG. 21 and the sub-division logic block 208 shown in FIG. 20 as well as the sub-division logic blocks 208 in the other tessellation units described above. However, unlike the sub-division logic blocks 208 described earlier, the second sub-division logic block 2108 only outputs the new vertex (e.g. vertex M in FIG. 4C) that is generated by the sub-division of the initial patch or sub-patch and does not perform sub-patch assembly. When outputting a vertex, either as part of a primitive or as a single vertex, some of the vertex attributes may not be output (e.g. TFs may not be output) and the attributes may undergo conversions (e.g. fixed-point to floating-point conversions).

For the Quad/Triangle Domains the vertex IDs that are generated using the methods and hardware described above are not unique in general: any non-boundary, non-middle vertex is produced twice by the hardware tessellation unit, as a subdivided edge is shared by two triangle patches, so there are two possible sequences of branches that reach it and hence such vertices have two different vertex IDs; however, either ID may be used to generate the vertex data using the single primitives tessellator 2100 shown in FIG. 21.

Figures 1, 22:
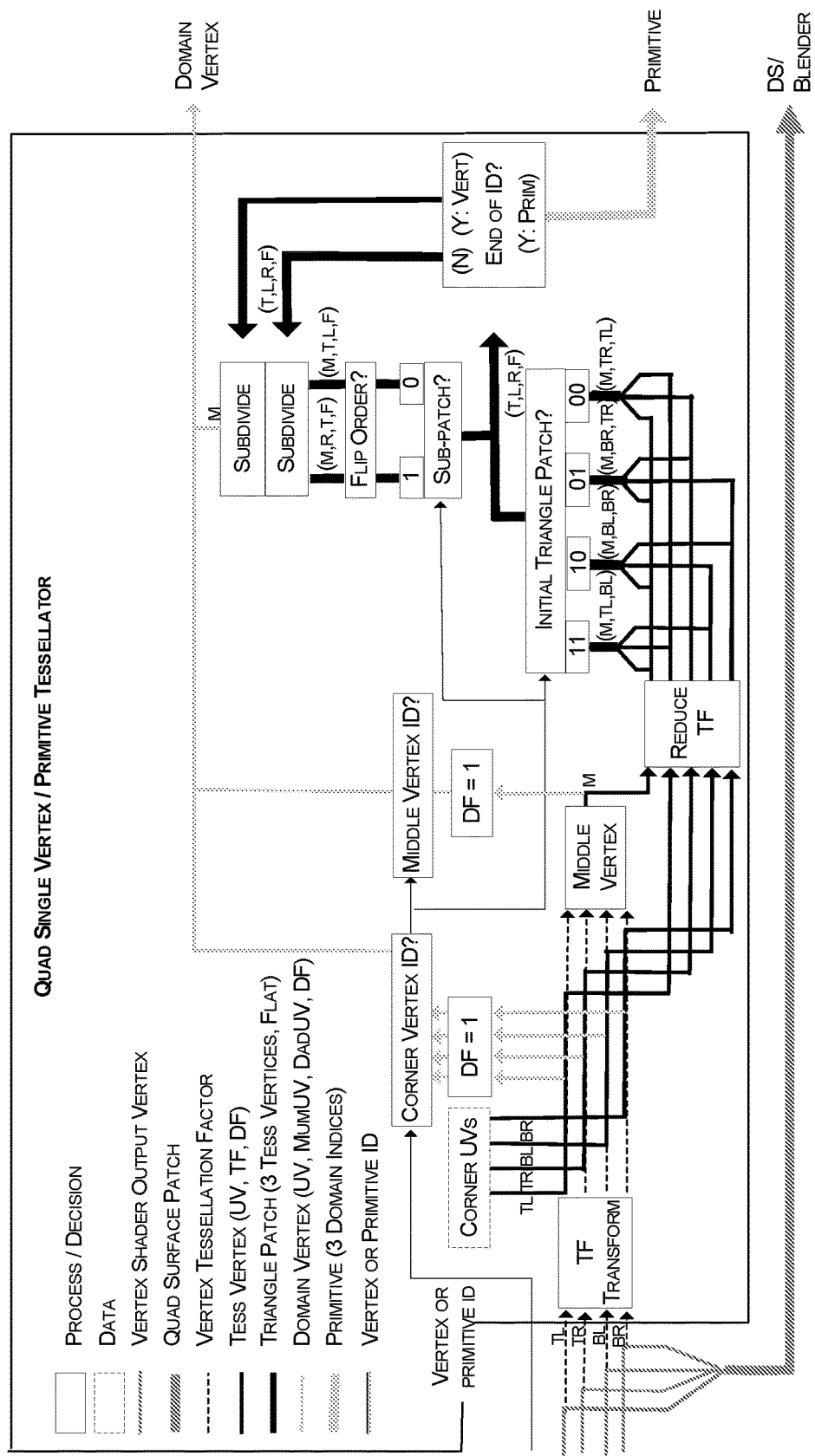
FIG. 22-1 is a schematic diagram of an eleventh example hardware tessellation unit.

FIG. 22-1 is a schematic diagram of a third example single primitives tessellator 2200 that may be used in the GPU pipeline 101 shown in FIG. 1B. As described above, a single primitives tessellator is configured to generate vertex data from an input primitive ID (e.g. as generated by a tessellator such as those shown in FIGS. 12, 14, 16 and 18). The single primitives tessellator 2200 shown in FIG. 22-1 is, like the single primitives tessellator 2100 shown in FIG. 21, configured to generate either or both primitive data from an input primitive data and vertex data from an input vertex ID. FIG. 22-2 lists the processes/decision logic blocks shown in FIG. 22-1 along with the inputs and outputs to the particular blocks in the diagram.

Although the examples described above all use vertex tessellation factors and make a decision regarding sub-division based on the values of these vertex TFs, in variations of any of the examples described herein, edge tessellation factors may alternatively be used. In such examples, a tessellation factor may be assigned to each pair of vertices (and hence to the edge connecting those vertices) of a patch and one or more of these TFs may then be used to determine subdivision of a patch.

Although the examples described above refer to provision of displacement factor data and the use of this data in blending, in variations of any of the examples described herein, DF data may not be provided (or otherwise available)

and hence blending would be omitted and the tessellation scheme would provide discrete levels of detail (LODs) rather than continuous ones.

The tessellator units described herein and shown in the accompanying figures may be embodied in hardware on an integrated circuit. Generally, any of the functions, methods, techniques or components described above can be implemented in firmware, hardware (e.g., fixed logic circuitry), or any combination thereof. The terms "module," "functionality," "component", "element", "unit", "block" and "logic" may be used herein to generally represent firmware, hardware, or any combination thereof.

The tessellator units described herein are also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a tessellation unit configured to perform any of the methods described herein, or to manufacture a tessellation unit comprising any apparatus described herein. An integrated circuit definition dataset may be, for example, an integrated circuit description.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a tessellation unit will now be described with respect to FIG. 25.

Figure 25:
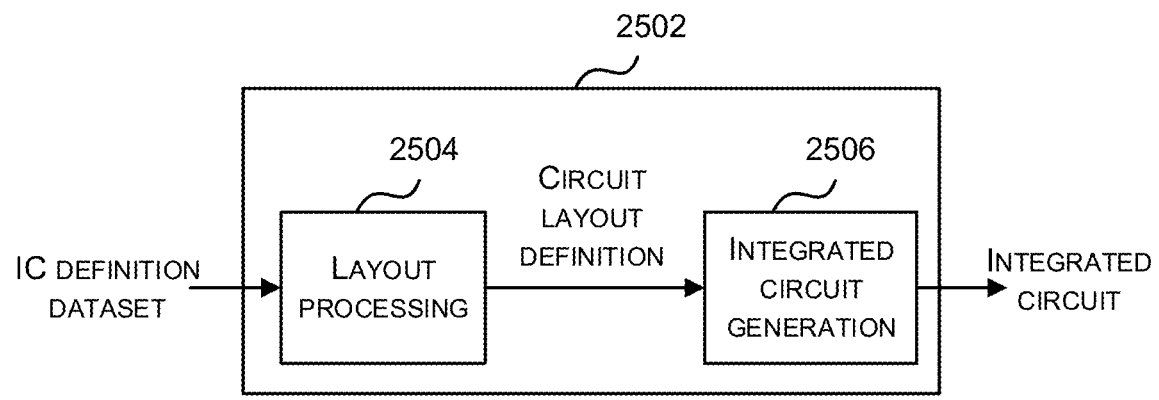
FIG. 25 shows an integrated circuit manufacturing system for generating an integrated circuit embodying a tessellation unit configured to perform an ordering method as described herein.

FIG. 25 shows an example of an integrated circuit (IC) manufacturing system 2502 which comprises a layout processing system 2504 and an integrated circuit generation system 2506. The IC manufacturing system 2502 is configured to receive an IC definition dataset (e.g. defining a tessellation unit configured to implement an ordering method as described herein), process the IC definition dataset, and generate an IC according to the IC definition dataset (e.g. which embodies a tessellation unit configured to implement an ordering method as described herein). The processing of the IC definition dataset configures the IC manufacturing system 2502 to manufacture an integrated circuit embodying a tessellation unit configured to implement an ordering method as described herein.

The layout processing system 2504 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 2504 has determined the circuit layout it may output a circuit layout definition to the IC generation system 2506. A circuit layout definition may be, for example, a circuit layout description.

The IC generation system 2506 generates an IC according to the circuit layout definition, as is known in the art. For example, the IC generation system 2506 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 2506 may be in the form of computer-readable code which the IC generation system 2506 can use to form a suitable mask for use in generating an IC.

The different processes performed by the IC manufacturing system 2502 may be implemented all in one location, e.g. by one party. Alternatively, the IC manufacturing system 2502 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a tessellation unit configured to implement an ordering method as described herein without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 25 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 25, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

What is claimed is:

1. A hardware tessellation unit comprising a patch stack, a sub-division decision logic block and a sub-division logic block, wherein:
  the patch stack is arranged to store patch data describing one or more initial patches and a plurality of sub-patches and to output the patch data;
  the sub-division decision logic block is arranged to determine, from the patch data received from the patch stack, whether an initial patch of the one or more initial patches or a sub-patch of the plurality of sub-patches for which the patch data is received is to be sub-divided, and to output the patch data to the sub-division logic block in response to determining that the initial patch or sub-patch is to be sub-divided;
  the sub-division logic block is configured to receive the patch data from the sub-division decision logic block, and arranged to sub-divide the initial patch or sub-patch for which the patch data is received; and
  an order flip logic block comprises: (i) an input configured to receive the patch data for each of the sub-patches output by the sub-division block, (ii) an output, and (iii) hardware logic arranged to control the order in which the patch data for each of the sub-patches is output via the output based on one or more stored values.

2. The hardware tessellation unit according to claim 1, further comprising:
  a pre-processing block comprising hardware logic arranged to sub-divide an input patch into a plurality of initial patches and an output configured to output patch data for the plurality of initial patches to the patch stack.

3. The hardware tessellation unit according to claim 2, further comprising:
  a set-up block comprising an input configured to receive vertex data from a subset of the vertices of a surface patch, hardware logic arranged to assemble an input patch and an output configured to output an input patch to the pre-processing block.

4. The hardware tessellation unit according to claim 3, wherein the set-up block comprises:
  a Tessellation Factor (TF) transformation logic block comprising: (i) an input configured to receive vertex tessellation factors for each vertex in an input patch, (ii) hardware logic arranged to reduce the received vertex tessellation factors using base 2, and (iii) an output configured to output reduced vertex tessellation factors; and
  an input patch assembly block comprising hardware logic arranged to assemble all vertices of an input patch.

5. The hardware tessellation unit according to claim 2, wherein the pre-processing block comprises:
  a middle vertex logic block comprising hardware logic arranged to calculate the parameters for a middle vertex of the input patch and an output arranged to output the parameters for the middle vertex;
  a Tessellation Factor (TF) reduction logic block comprising hardware logic arranged to reduce the tessellation factors of each of the vertices in each of the initial patches formed from the input patch; and
  an initial patch assembly block comprising hardware logic arranged to assemble the corner and middle vertices into the initial patches.

6. The hardware tessellation unit according to claim 1, wherein the patch stack is further arranged to output the patch data via an output according to a first-in-last-out scheme, and wherein the patch stack comprises a first input configured to receive patch data describing initial patches and a second input configured to receive patch data describing sub-patches,
  wherein the sub-division decision logic block comprises an input configured to receive the patch data from the patch stack, a first output configured to output the patch data to the sub division logic block, and a second output configured to output the patch data in response to determining that the initial patch or sub-patch is not to be sub-divided, and
  wherein the sub-division logic block comprises an input configured to receive the patch data from the sub-division decision logic block, and an output configured to output the patch data for each of the sub-patches formed by the sub-division to the patch stack.

7. The hardware tessellation unit according to claim 1, further comprising:
  a domain vertex stack arranged to store vertex data for vertices of the initial patches and vertex data for a middle vertex generated by the sub-division logic block when sub-dividing an initial patch or sub-patch and to output the vertex data, via an output according to a first-in-last-out scheme;
  a counter,
  an index table arranged to store output indices;
  a UV primitive queue arranged to store primitives;
  an output vertex logic block comprising: (i) an input configured to receive vertex data popped from the domain vertex stack, (ii) an output, and (iii) hardware logic arranged to determine whether the received vertex data relates to a vertex which has already been output by the hardware tessellation unit, and in response to determining that the received vertex data relates to a vertex that has not already been output by the hardware tessellation unit, to increment the counter, add an entry to the index table and output the vertex data via the output;
  an output primitive logic block comprising: (i) a first input configured to receive primitive data from the sub-division decision logic block, (ii) an input/output arranged to communicate with a get indices logic block, and (iii) hardware logic arranged to delay output of a primitive from the UV primitive queue until all the vertices of the primitive have been output from the hardware tessellation unit; and
  a get indices logic block arranged to act as an interface between the index table and the output primitive logic block.

8. The hardware tessellation unit according to claim 1, further comprising:
  a domain vertex stack arranged to store vertex data for vertices of the initial patches and vertex data for a middle vertex generated by the sub-division logic block when sub-dividing an initial patch or sub-patch and to output the vertex data, via an output according to a first-in-last-out scheme;
  a counter,
  an index table arranged to store output indices;
  an output vertex logic block comprising: (i) an input configured to receive vertex data popped from the domain vertex stack, (ii) an output, and (iii) hardware logic arranged to determine whether the received vertex data relates to a vertex which has already been output by the hardware tessellation unit, and in response to determining that the received vertex data relates to a vertex that has not already been output by the hardware tessellation unit, to increment the counter, add an entry to the index table and output the vertex data via the output;

an output primitive logic block comprising: (i) a first input configured to receive primitive data from the sub-division decision logic block, (ii) an input/output arranged to communicate with a get indices logic block, and (iii) an output configured to output primitive data; and a get indices logic block arranged to act as an interface between the index table and the output primitive logic block.

9. The hardware tessellation unit according to claim 1, further comprising:

a domain vertex stack arranged to store vertex data for vertices of the initial patches and vertex data for a middle vertex generated by the sub-division logic block when sub-dividing an initial patch or sub-patch and to output the vertex data, via an output according to a first-in-last-out scheme;

a counter, an index table arranged to store output indices;

an output vertex logic block comprising: (i) an input configured to receive vertex data popped from the domain vertex stack, (ii) an output, and (iii) hardware logic arranged to determine whether the received vertex data relates to a vertex which has already been output by the hardware tessellation unit, and in response to determining that the received vertex data relates to a vertex that has not already been output by the hardware tessellation unit, to increment the counter, add an entry to the index table and output the vertex data via the output; and a plurality of additional logic blocks arranged to generate IDs for each primitive.

10. The hardware tessellation unit according to claim 1, further comprising:

a plurality of additional logic blocks arranged to generate IDs for each primitive.

11. The hardware tessellation unit according to claim 10, wherein the plurality of additional logic blocks comprise:

a plurality of ID sequence generation logic blocks between the order flip logic block and the patch stack and configured to add a bit to a patch ID, wherein a value of the bit added indicates whether the sub-patch having the patch ID was pushed first or second onto the patch stack.

12. The hardware tessellation unit according to claim 11, wherein the hardware tessellation unit comprises the pre-processing block and the plurality of additional logic blocks further comprises:

one or more ID header generation logic blocks between the pre-processing block and the patch stack and configured to generate an initial patch ID for each of the initial patches.

13. A hardware tessellation unit comprising:

an initial patch selection logic block arranged to select patch data for an initial patches based on one or more bits of a primitive or vertex ID;

a sub-division logic block configured to receive patch data for the initial patch or a sub-patch, and to sub-divide the initial patch or sub-patch for which patch data is received;

a sub-patch selection logic block arranged to select patch data for one of the sub-patches formed by sub-division in the sub-division logic block based on one or more bits of the primitive or vertex ID;

an order flip logic block comprising: (i) an input configured to receive the patch data for each of the sub-patches output by the sub-division block, (ii) an output, and (iii) hardware logic arranged to control the order in which the patch data for each of the sub-patches is output via the output based on one or more stored values; and an end of ID logic block configured to receive patch data for an initial patch from the initial patch selection logic block, to receive patch data for the selected sub-patches from the sub-patch selection logic block, and to determine, from an ID for the initial patch or sub-patch, whether the initial patch or sub-patch is to be sub-divided.

14. The hardware tessellation unit according to claim 13, wherein the initial patch selection logic block comprises a first input configured to receive patch data for a plurality of initial patches, and a second input arranged to receive a primitive or vertex ID, wherein the sub-division logic block comprises an input configured to receive patch data and an output configured to output patch data for each of the sub-patches formed by the sub-division, wherein the sub-patch selection logic block comprises a first input configured to receive patch data for a plurality of sub-patches formed by sub-division in the sub-division logic block, a second input configured to receive the primitive or vertex ID and an output configured to output the selected patch data, and wherein the end of ID logic comprises a first input, a second input, a first output configured to output the patch data in response to determining that the initial patch or sub-patch is to be sub-divided, and a second output configured to output the patch data in response to determining that the initial patch or sub-patch is not to be sub-divided.

15. The hardware tessellation unit according to claim 13, further comprising:

a pre-processing block comprising hardware logic arranged to sub-divide an input patch into a plurality of initial patches, and an output configured to output patch data for the plurality of initial patches to the initial patch selection logic block.

16. The hardware tessellation unit according to claim 15, further comprising:

a set-up block comprising an input configured to receive vertex data from a subset of the vertices of a surface patch, hardware logic arranged to assemble an input patch, and an output configured to output an input patch to the pre-processing block.

17. The hardware tessellation unit according to claim 16, wherein the set-up block comprises:

a Tessellation Factor (TF) transformation logic block comprising: (i) an input configured to receive vertex tessellation factors for each vertex in an input patch, (ii) hardware logic arranged to reduce the received vertex tessellation factors using base 2, and (iii) an output configured to output reduced vertex tessellation factors; and an input patch assembly block comprising hardware logic arranged to assemble all vertices of an input patch.

18. The hardware tessellation unit according to claim 15, wherein the pre-processing block comprises:
- a middle vertex logic block comprising hardware logic arranged to calculate the parameters for a middle vertex of the input patch and an output arranged to output the parameters for the middle vertex; and
- a Tessellation Factor (TF) reduction logic block comprising hardware logic arranged to reduce the tessellation factors of each of the vertices in each of the initial patches formed from the input patch; and
- an initial patch assembly block comprising hardware logic arranged to assemble the corner and middle vertices into the initial patches.

19. The hardware tessellation unit according to claim 13, further comprising:
- a second sub-division logic block comprising: (i) an input configured to receive patch data, (ii) hardware logic arranged to sub-divide the initial patch or sub-patch for which patch data is received, and (iii) an output configured to output vertex data for a new vertex formed by the sub-division of the initial patch or sub-patch.

20. A hardware tessellation unit, comprising:
- an initial patch selection logic block arranged to select patch data for an initial patch based on one or more bits of the primitive or vertex ID;
- a sub-division logic block configured to receive patch data for the initial patch or a sub-patch, and to sub-divide the initial patch or sub-patch for which patch data is received;
- a sub-patch selection logic block arranged to select patch data for one of the sub-patches formed by sub-division in the sub-division logic block based on one or more bits of the ID;
- an end of ID logic block configured to receive patch data for the initial patch from the initial patch selection logic block, to receive patch data for the selected sub-patches from the sub-patch selection logic block, and to determine, from an ID for the initial patch or sub-patch, whether the initial patch or sub-patch is to be sub-divided; and
- a corner and middle vertex check logic block comprising: (i) a first input configured to receive a vertex ID, (ii) a second input configured to receive domain vertices from the pre-processing block, (iii) hardware logic arranged to compare the received ID to a known set of IDs corresponding to the vertices of the initial patches and determine if there is a match, and (iv) an output configured to output the domain vertex in response to determining that there is a match between the received ID and an ID in the known set of IDs.

* * * * *

UNITED STATES PATENT AND TRADEMARK OFFICE
CERTIFICATE OF CORRECTION

PATENT NO. : 11,354,859 B2
APPLICATION NO. : 17/198038
DATED : June 7, 2022
INVENTOR(S) : Peter Malcolm Lacey and Simon Fenney It is certified that error appears in the above-identified patent and that said Letters Patent is hereby corrected as shown below:

In the Specification

Column 29, Lines 48-49:

| DF = 1 | Domain Vertex | 1 | Domain Vertex | 1 | 2 | 24 |

Should read as:

| DF = 1 | Domain Vertex | 1 | Domain Vertex | 1 | 2 | 2 |

Signed and Sealed this
Thirtieth Day of May, 2023

Katherine Kelly Vidal
*Director of the United States Patent and Trademark Office*